United States Patent [19]
Furuhashi et al.

[11] Patent Number: 5,633,659
[45] Date of Patent: May 27, 1997

[54] DISPLAY UNIT HAVING A COORDINATE INPUT MECHANISM

[75] Inventors: Tsutomu Furuhashi, Yokohama; Masaaki Kitajima, Hitachiota; Satoru Tsunekawa, Higashi-murayama; Hiroyuki Mano, Chigasaki; Shigeyuki Nishitani, Ebina; Tetsuya Suzuki, Chigasaki; Isao Takita, Fujisawa; Makiko Ikeda, Yokohama; Tatsuzo Hamada, Hadano, all of Japan

[73] Assignee: Hitachi, Ltd., Tokyo, Japan

[21] Appl. No.: 308,297

[22] Filed: Sep. 19, 1994

[30] Foreign Application Priority Data

Sep. 17, 1993 [JP] Japan ................................. 5-231842

[51] Int. Cl.$^6$ ........................................................ G09G 5/00
[52] U.S. Cl. ............................ 345/173; 345/104; 178/18
[58] Field of Search ............................. 345/173, 179, 345/87, 103, 104; 178/18, 19

[56] References Cited

U.S. PATENT DOCUMENTS 5,534,892  7/1996  Tagawa ............................... 178/18

FOREIGN PATENT DOCUMENTS

0375328A3  6/1990  European Pat. Off. .
0504728A2  9/1992  European Pat. Off. .
0504728A3  9/1992  European Pat. Off. .
2-255911  10/1990  Japan .

*Primary Examiner*—Mark R. Powell
*Assistant Examiner*—Matthew Luu
*Attorney, Agent, or Firm*—Antonelli, Terry, Stout & Kraus, LLP

[57] ABSTRACT

A display unit which can detect the X coordinate of a position with which a pen is in contact more efficiently. In a non-display period, X-electrodes are grouped into N regions according to the X-electrode arrangement, each region is divided into two parts according to the X-electrode arrangement, and selection voltage is applied to the X-electrodes belonging to each part having larger X coordinates. The process is repeated in order while N is doubled from one to the half value of the number of the X-electrodes of a liquid crystal panel. If a pen coming in contact with the liquid crystal panel and detecting X-electrode selection voltage detects selection voltage with respect to each N value, the Nth most significant bit of the X coordinate of the position with which the pen is in contact is set to '1.' If the pen does not detect selection voltage, the bit is set to '0.' Thus, the X-electrode of the position with which the pen is in contact can be detected at the number of selection voltage application times equal to the minimum number of bits that can represent each of the X-electrodes.

35 Claims, 40 Drawing Sheets

FIG. 10A $y_0$
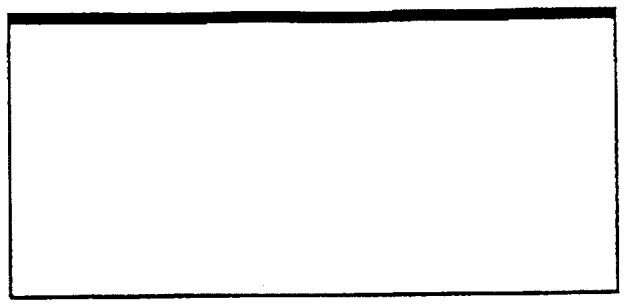
FIRST LINE PERIOD
FIG. 10B $y_1$
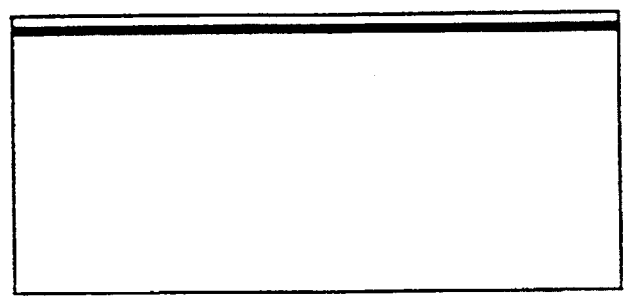
SECOND LINE PERIOD
FIG. 10C
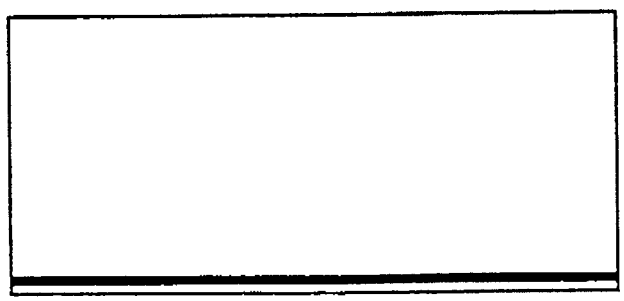
(n-1)TH LINE PERIOD
$y_{n-2}$
FIG. 10D
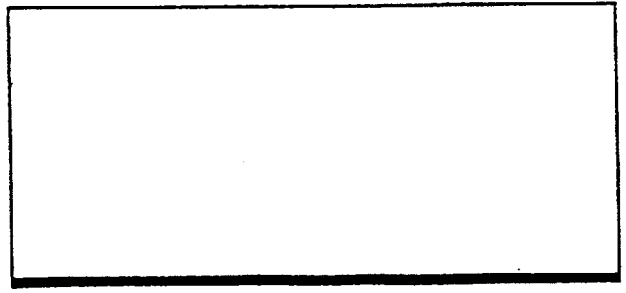
nTH LINE PERIOD
$y_{n-1}$

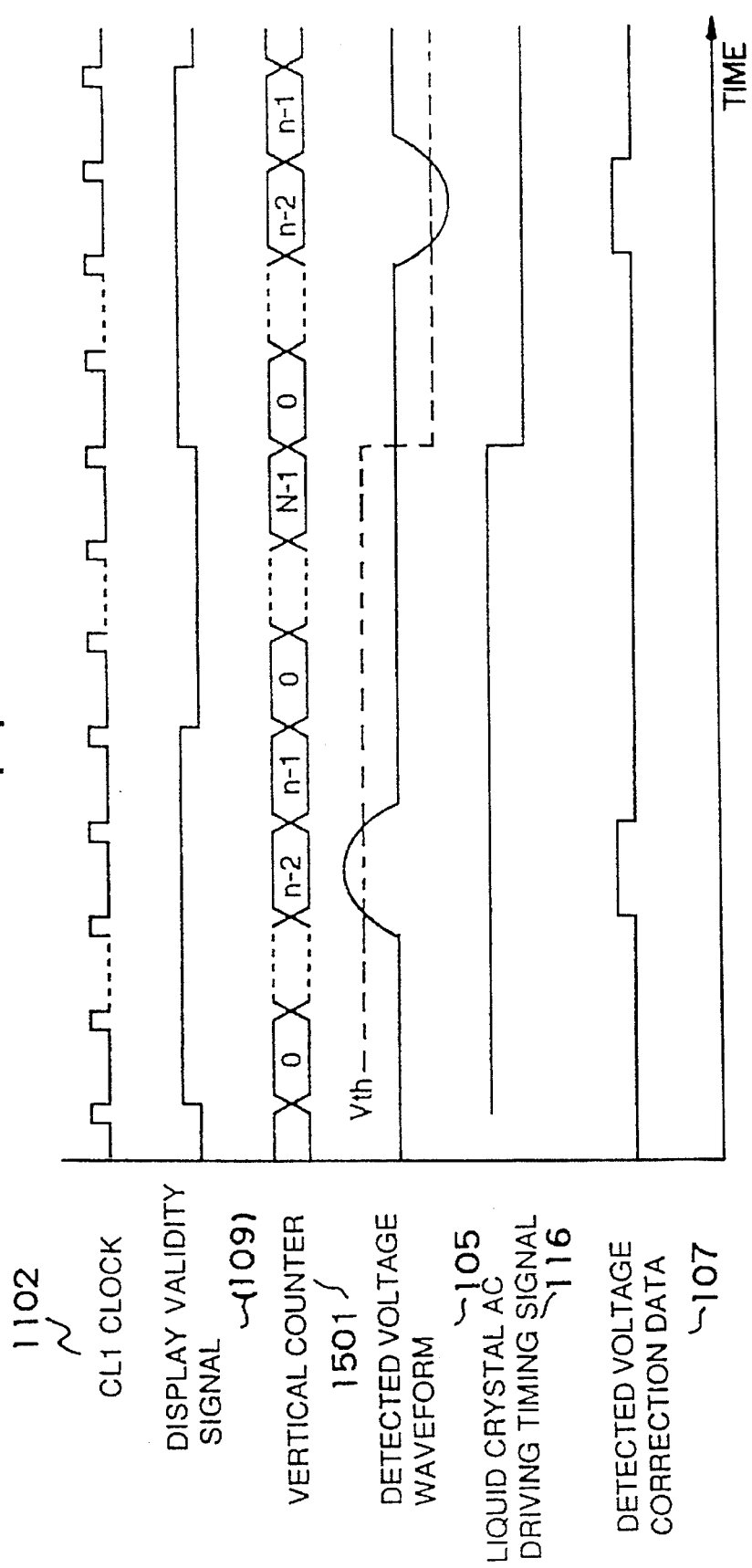

FIRST LINE PERIOD

SECOND LINE PERIOD (n-1)TH LINE PERIOD nTH LINE PERIOD

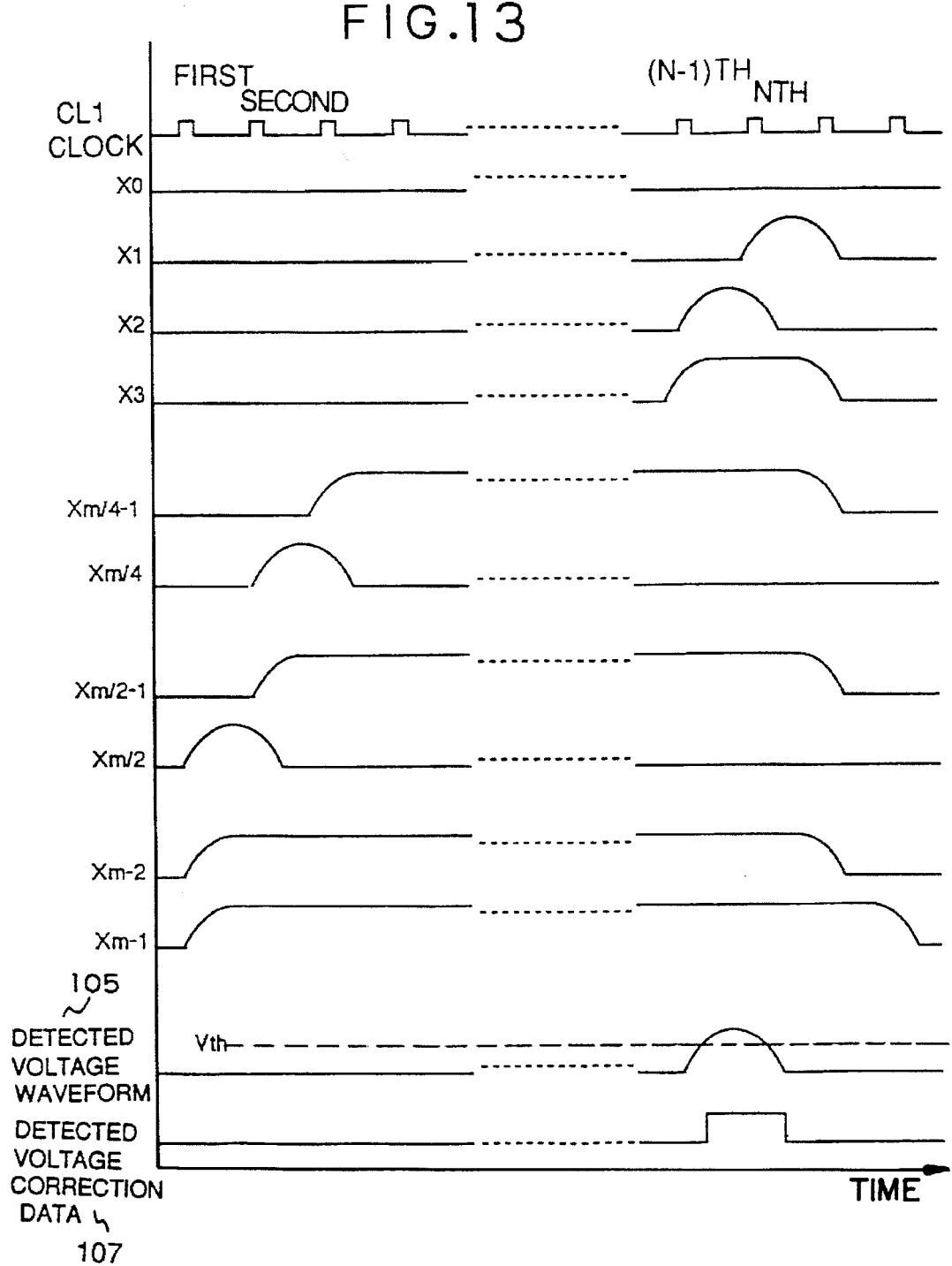

FIRST LINE PERIOD

SECOND LINE PERIOD (n-1)TH LINE PERIOD nTH LINE PERIOD

FIRST LINE PERIOD

SECOND LINE PERIOD (n-1)TH LINE PERIOD nTH LINE PERIOD

FIRST LINE PERIOD

SECOND LINE PERIOD (N-2) TH LINE PERIOD (N-1) TH LINE PERIOD

NTH LINE PERIOD (N+1)TH LINE PERIOD

FIRST LINE PERIOD (N-1)TH LINE PERIOD

SECOND LINE PERIOD

NTH LINE PERIOD (N-2)TH LINE PERIOD (N+1)TH LINE PERIOD

FIRST LINE PERIOD

SECOND LINE PERIOD (N/2-1)TH LINE PERIOD n/2TH LINE PERIOD

FIRST LINE PERIOD

SECOND LINE PERIOD nTH LINE PERIOD (N+1)TH LINE PERIOD

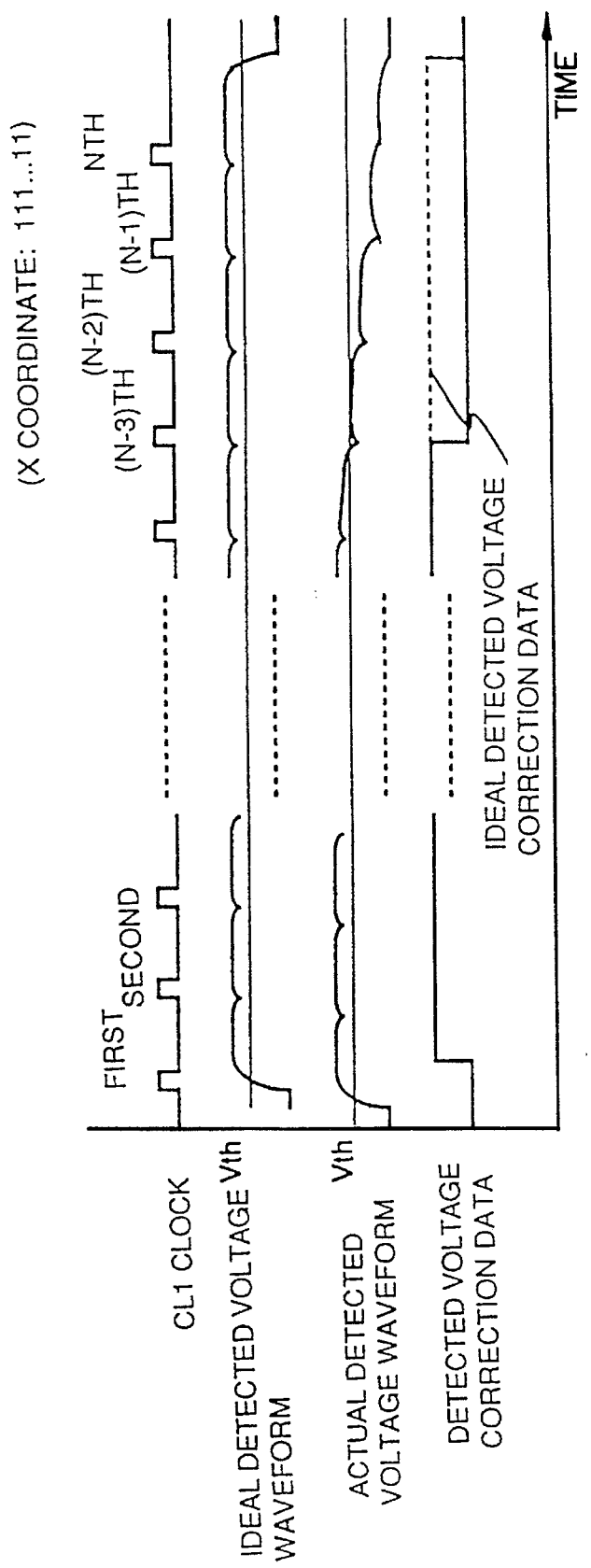

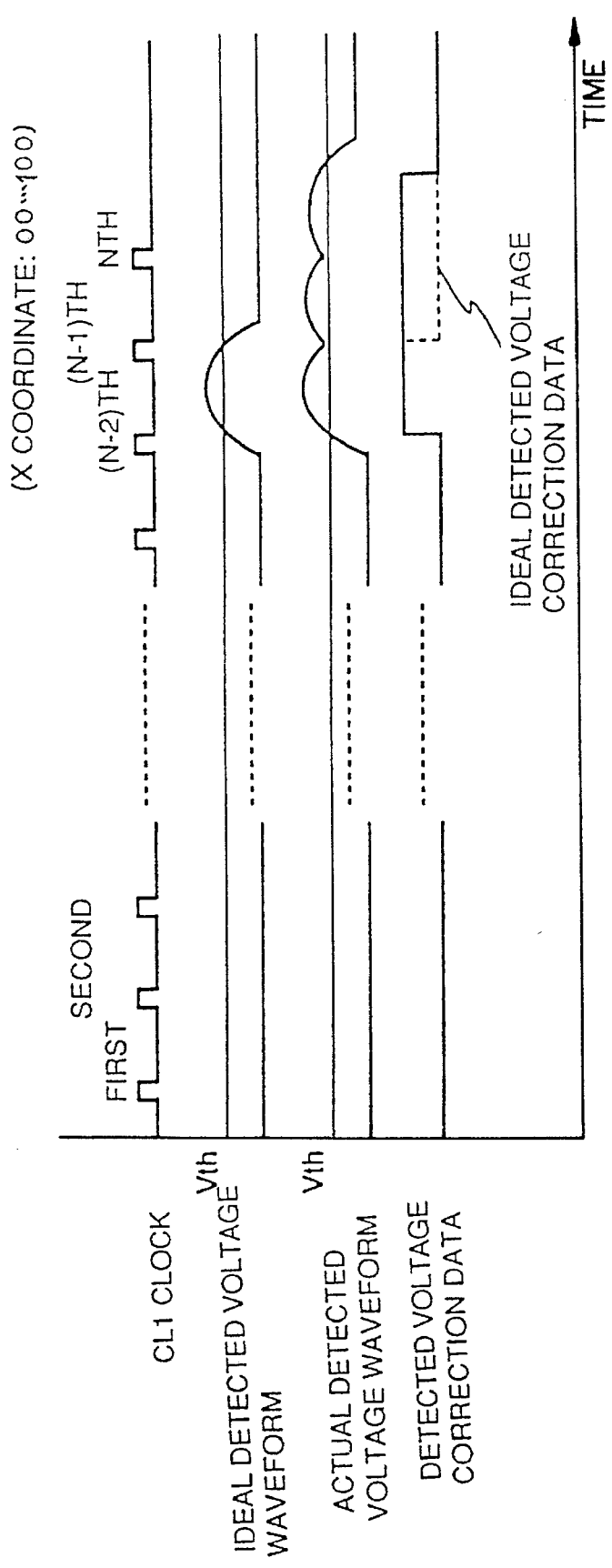

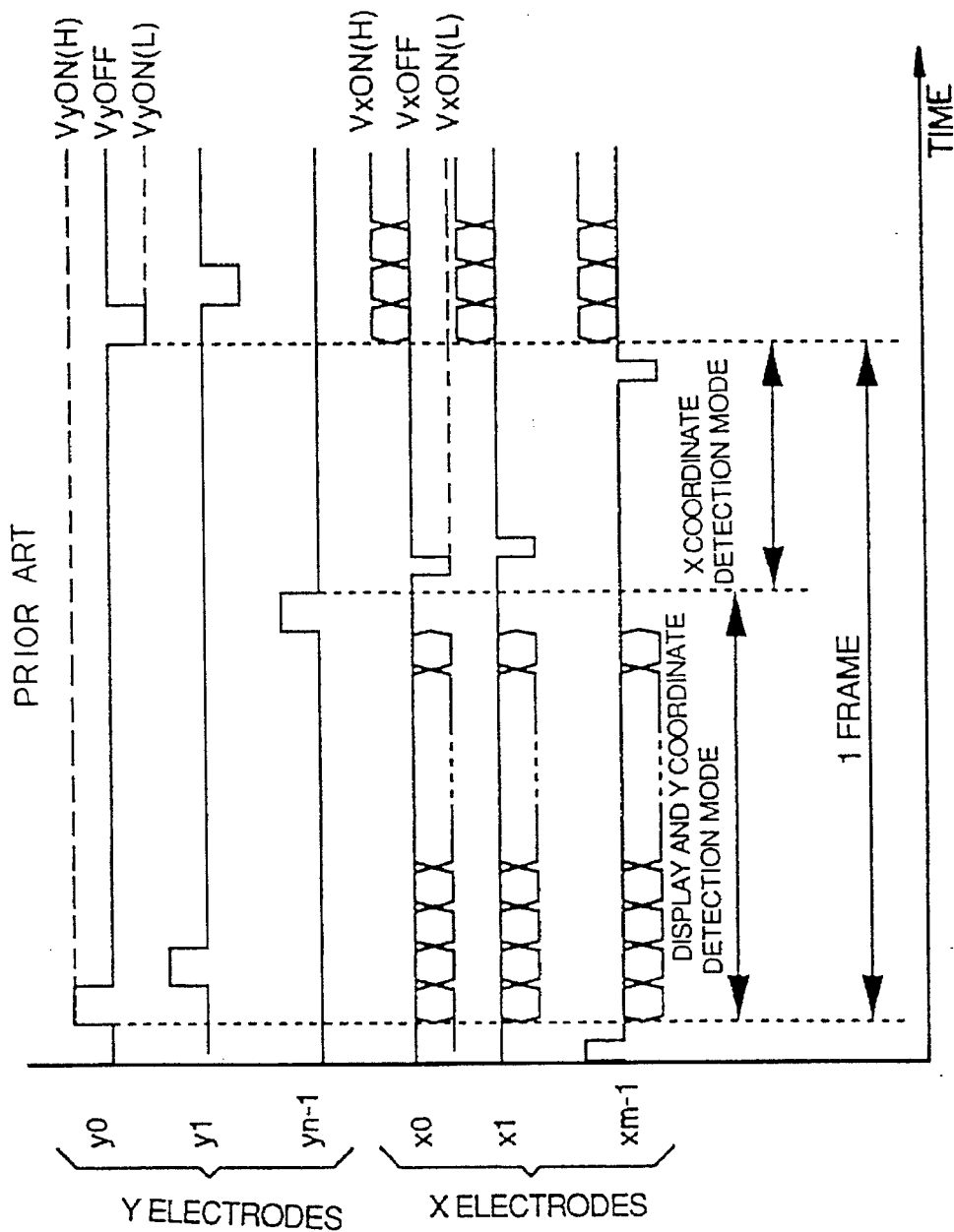

DISPLAY UNIT HAVING A COORDINATE INPUT MECHANISM

BACKGROUND OF THE INVENTION

1. Field of the Invention

This invention relates to a display unit having a coordinate input mechanism and in particular to coordinate input techniques thereof.

2. Description of the Related Art

For example, the display unit described in Japanese Patent Laid-Open No. Hei 2-255911 is known as a conventional display having a coordinate input mechanism.

According to the display unit, a drive voltage pulse of a display is detected by a pencil-like detector for finding the coordinates of the position indicated with the detector. Therefore, the display unit does not require an additional pressure-sensitive tablet or the like for inputting coordinates.

The display unit described in Japanese Patent Laid-Open No. Hei 2-255911 will be discussed.

FIG. 40 shows the configuration of the display unit.

In the figure, numeral 201 is a thin film EL panel, y0, y1, . . . , yn-1 are Y-electrodes, x0, x1, . . . , xm-1 are X-electrodes, numeral 202 is a Y-electrode driver, and numeral 203 is an X-electrode driver. Numeral 204 is a timing generator, numeral 205 is a pencil-like detector, for detecting coordinates, which will be hereinafter simply called the pen, numeral 206 is an amplifier, numeral 207 is a Y coordinate detector, and numeral 208 is an X coordinate detector. The Y coordinates or lines on a display screen of the thin film EL panel 201 are specified by the Y-electrodes and the X coordinates or columns are specified by the X-electrodes. The pixel corresponding to the X-electrode to which a selection voltage is applied, on the line corresponding to the Y-electrode to which a selection voltage is applied, on the thin film EL panel 201, goes ON (is displayed).

The operation of the display unit will be described with reference to FIG. 41.

FIG. 41 shows the timing of a drive voltage applied to the Y- and X-electrodes of the thin film EL panel 201.

As shown in FIG. 41, in the display unit, the 1-frame period required to display one screen is divided into the display and Y coordinate detection mode period, for performing display and Y coordinate detection, and the X coordinate detection mode period for detecting X coordinates. The former is a period in which voltage is applied to the X- and Y-electrodes for actual display and the latter is a period in which voltage application for display is not performed.

The operation in the Y coordinate detection mode period is as follows:

The Y-electrode driver 202 connected to the Y-electrodes y0, y1, y2, . . . , yn-1 applies a selection voltage VyON(H) or VyON(L) to the Y-electrodes y0, y1, y2, . . . , yn-1 in order, as shown in FIG. 41. On the other hand, the X-electrode driver 203 connected to the X-electrodes x0, x1, x2, . . . , xm-1 supplies a voltage corresponding to display data displayed on the corresponding pixel on the line corresponding to the Y-electrode to which the selection voltage is applied to the X-electrodes x0, x1, x2, . . . , xm-1 in synchronization with the scanning operation of the Y-electrode driver.

This operation displays one screen in the display period and the X coordinate detection mode period.

Meanwhile, if the selection voltage is applied to the line with which the pen 205 is in contact, electrostatic capacity coupling between the pen 205 and the Y-electrode y0, y1, y2, . . . , yn-1 corresponding to the line, causes a voltage pulse to be supplied via the amplifier 206 to the Y coordinate detector 207. The selection voltage VyON is applied to the Y-electrodes y0, y1, y2, . . . , yn-1 in order. If a counter or the like for counting which of the Y-electrodes y0, y1, y2, . . . , yn-1 the selection voltage VyON is applied to is provided, the Y coordinate with which the pen 205 is in contact can be detected if the counter value is stored at the timing at which the voltage pulse is input via the pen 205 and the amplifier 206.

Next, the operation in the X coordinate detection mode period is as follows:

As in the detection of the Y coordinates, a voltage pulse applied to the X-electrode x0, x1, x2, . . . , xm-1 is detected by the pen 205, thereby detecting the X coordinate indicated with the pen 205.

Then, in the display unit, the X-electrode driver 203 applies a selection voltage VxON to the X-electrode x0, x1, x2, . . . , xm-1 in order. Thus, electrostatic capacity coupling between the pen 205 and the X-electrode x0, x1, x2, . . . , xm-1 to which the selection voltage VxON is applied, causes a detection voltage pulse to be supplied via the amplifier 206 to the X coordinate detector 208.

Therefore, if like the Y coordinate detector 207, the X coordinate detector 208 is provided with a counter or the like for counting which of the X-electrodes x0, x1, x2, . . . , xm-1 the selection voltage VxON is applied to is provided, and the counter value is stored at the timing at which the voltage pulse is input via the pen 205 and the amplifier 206, the X coordinate with which the pen 205 is in contact can be detected.

According to the display unit described in Japanese Patent Laid-Open No. Hei 2-255911, the X coordinate detection mode period for detecting X coordinates is required in addition to the period in which selection voltage is applied to the X- and Y-electrodes for display.

The X coordinate detection mode period will be considered. For example, to detect an X coordinate in a personal computer operating with a frame period of 70 Hz, assuming that the resolution is 640 dots in the horizontal direction and 480 lines in the vertical direction, selection voltage VxON must be applied to the X-electrodes x0, x1, x2, . . . , x639 in order in the X coordinate detection mode. This means that a 640 selection voltage application pattern must be provided in the X coordinate detection mode period.

On the other hand, the X coordinate detection mode period is called a vertical retrace period (vertical interval). To provide good display, it must normally be suppressed to a period of about 5% of the 1-frame period. Therefore, if the 1-frame period is 70 Hz, the X coordinate detection mode period becomes about 700 μs and the period in which selection voltage is applied to one of the X-electrodes x0, x1, x2, . . . , xm-1 becomes about 1 μs.

To apply selection voltage to each of the X-electrodes x0, x1, x2 . . . , xm-1 in order every about 1 μs, the X-electrodes need to be charged with a voltage sufficient for detection by the pen in that period. However, a high-performance X-electrode driver is required to provide such high-speed charge operation.

On the other hand, such an X-electrode driver that can operate at high speed cannot be provided at low costs, leading to a high cost display unit. Such a high-speed operation would increase power consumption of the display unit.

SUMMARY OF THE INVENTION

It is therefore an object of the invention to provide a display unit which can detect the X coordinate of a position with which a detector is in contact more efficiently.

To the end, according to the invention, there is provided a display unit comprising: a flat display comprising M×N display elements placed like a matrix consisting of M rows and N columns, M pieces of Y-electrodes connected to the rows of the display elements, and N pieces of X-electrodes connected to the columns of the display elements; and a detector for detecting a voltage pulse applied to the row and column corresponding to a position on a display surface of the flat display with which the detector is in contact through an electrostatic capacity coupling; wherein each of the display elements of the flat display enters a display state when predetermined voltages are applied to both the Y- and X-electrodes connected to the display element; wherein the improvement comprises: a Y-electrode driver for applying a voltage pulse to the Y-electrodes in a row arrangement order in a display period; an X-electrode driver for applying voltage pulses to the N pieces of X-electrodes with a voltage pulse application pattern specified in a given data string; means for supplying to the X-electrode driver a data string for specifying a voltage pulse application pattern corresponding to a display pattern to be displayed on the N display elements on a row to which a voltage pulse is applied in a display period;

means for supplying L data strings for specifying L different voltage pulse application patterns to the X-electrode driver in order in a non-display period;

Y coordinate detection means for determining a Y coordinate of a position with which the detector is in contact in response to a Y-electrode to which a voltage pulse is applied at a point in time the detector detects the voltage pulse in a display period; and X coordinate detection means for determining an X coordinate of a position with which the detector is in contact in response to L detection values each indicating whether or not the detector detects a voltage pulse for each of the L voltage pulse application patterns applied to the N pieces of X-electrodes in response to L data strings in a non-display period, wherein the L voltage pulse application patterns contain H voltage application patterns each for applying a voltage pulse to X-electrodes belonging to every other region in an X-electrode arrangement direction in 2×k equal regions into which the N pieces of X-electrodes are grouped according to the X-electrode arrangement with respect to H different arbitrary values k in the range of 1 to H (where H≦L).

According to the display unit of the invention, L voltage pulse application patterns containing H voltage application patterns each for applying a voltage pulse to X-electrodes belonging to every other region in an X-electrode arrangement direction in 2×k equal regions into which the N pieces of X-electrodes are grouped according to the X-electrode arrangement with respect to H different arbitrary values k in the range of 1 to H (where H≦L) are supplied to the X-electrode driver in a non-display period. The X coordinate of the position with which the detector is in contact is determined in response to the L detection values each indicating whether or not the detector detects a voltage pulse for each of the L voltage pulse application patterns applied to the N pieces of X-electrodes in response to the L data strings in the non-display period.

According to the H voltage application patterns, the region with which the detector is in contact can be narrowed down in order for determination, so that the X coordinate of the position with which the detector is in contact can be detected at a fewer number of voltage pulse application times than the number of the X-electrodes.

BRIEF DESCRIPTION OF THE DRAWINGS

In the accompanying drawings:

FIG. 10 is an illustration showing schematic selection voltage application patterns to Y-electrodes in the display unit according to the first embodiment of the invention;

FIG. 11 is a timing chart showing the Y-electrode voltage detection timing in the display unit according to the first embodiment of the invention;

FIG. 13 is a timing chart showing the X-electrode voltage detection timing in the display unit according to the first embodiment of the invention;

FIG. 26 is a chart showing an X coordinate detection error caused by a detected voltage drop;

FIG. 27 is a chart showing an X coordinate detection error occurring due to drive voltage of contiguous X-electrode;

FIG. 41 is a timing chart showing the selection voltage application timing in the conventional display unit in FIG. 40.

DESCRIPTION OF THE PREFERRED EMBODIMENTS

Referring now to the accompanying drawings, there are shown preferred embodiments of the invention.

A first embodiment of the invention will be discussed.

The configuration of a display unit according to the first embodiment of the invention will be described.

Figure 1:
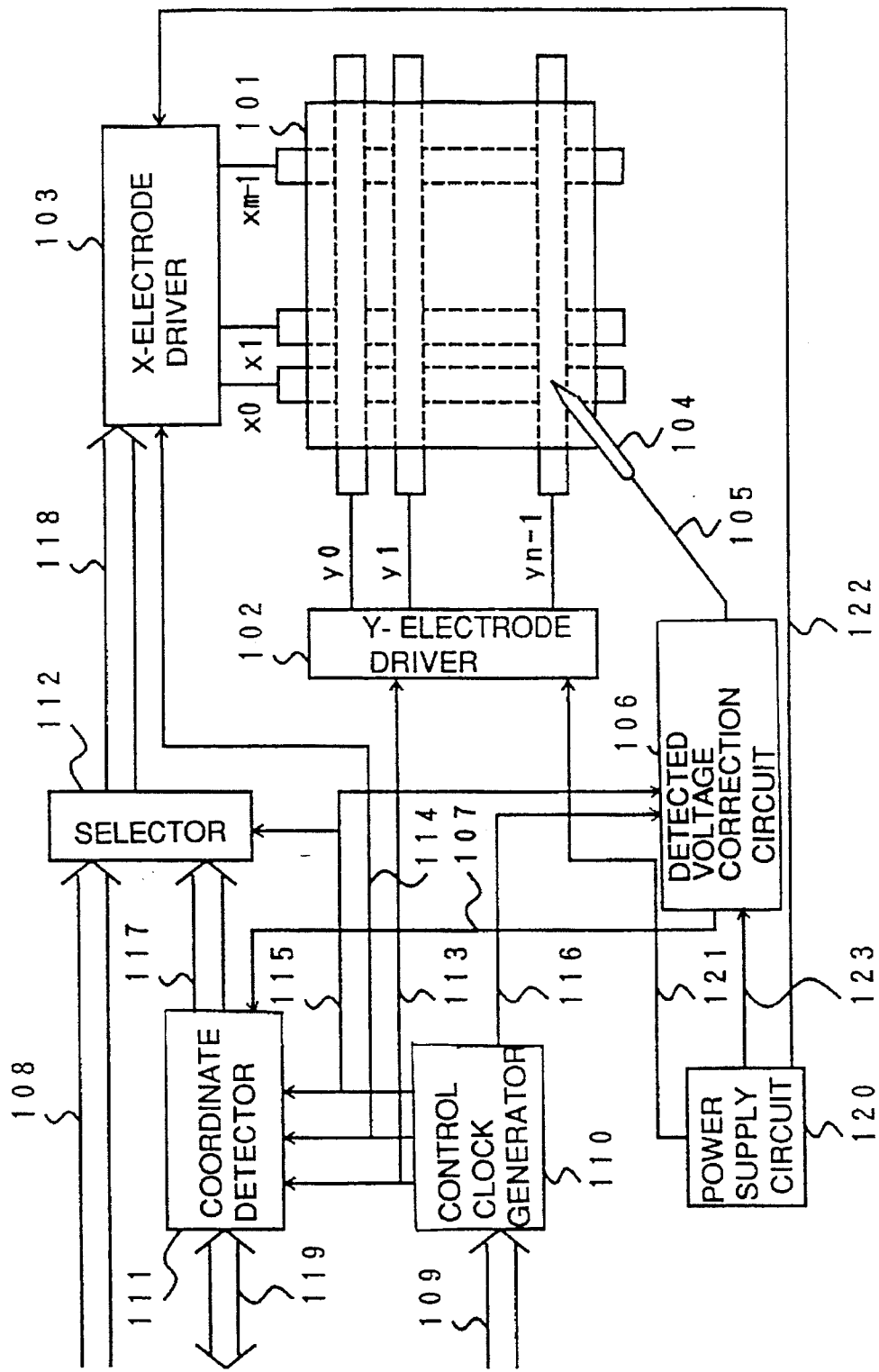
FIG. 1 is a block diagram showing the configuration of a display unit according to a first embodiment of the invention.

FIG. 1 shows the configuration of the display unit according to the first embodiment of the invention.

In FIG. 1, numeral 101 is a liquid crystal panel, y0, y1, . . . , yn-1 are Y-electrodes, x0, x1, . . . , xm-1 are X-electrodes, numeral 102 is a Y-electrode driver, and numeral 103 is an X-electrode driver. Numeral 104 is a pencil-like detector (pen) for detecting coordinates, numeral 105 is a signal line for transferring a voltage pulse detected by the pen 104, numeral 106 is a detected voltage correction circuit for correcting the detected voltage, and numeral 107 is a signal line for transferring the voltage corrected by the detected voltage correction circuit 106.

Numeral 108 is a display data bus for transferring display data and numeral 109 is a signal bus for transferring synchronizing signals. Transferred on the signal bus 109 are a vertical synchronizing signal activated every frame, a horizontal synchronizing signal activated every horizontal period, a display validity signal indicating that valid display data is transferred to the display data bus 108, and a dot clock synchronized with display data transferred on the display data bus 108.

Numeral 110 is a control clock generator, numeral 111 is a coordinate detector, and numeral 112 is a selector. Numeral 113 is a signal line for transferring a control clock to the Y-electrode driver 102 and the coordinate detector 111, numeral 114 is a signal line for transferring a control clock to the X-electrode driver 103 and the coordinate detector 111, and numeral 115 is a signal bus for transferring a control clock to the selector 112 and the coordinate detector 111 and transferring the display validity signal. Numeral 116 is a signal line for transferring a liquid crystal AC driving timing signal, which is a timing signal required for AC driving of the liquid crystal panel 101.

Numeral 117 is a data bus for transferring data used to detect an X coordinate, generated by the coordinate detector 111, numeral 118 is a liquid crystal display data bus for transferring display data and X coordinate detection data input to the X-electrode driver 103, and numeral 119 is a data bus for transferring Y coordinate detection data and X coordinate detection data. Numeral 120 is a power supply circuit, numeral 121 is a voltage line for transferring a voltage used as a source of a voltage output by the Y-electrode driver 102, numeral 122 is a voltage line for transferring a voltage used as a source of a voltage output by the X-electrode driver 103, and numeral 123 is a voltage line for transferring a threshold voltage used for comparison with the detected voltage at the detected voltage correction circuit 106.

Figure 2:
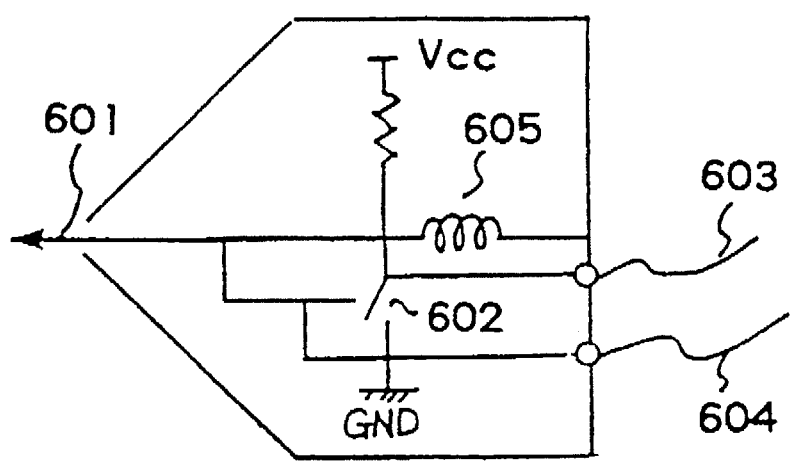
FIG. 2 is a block diagram showing the configuration of a pen according to the first embodiment of the invention.

Next, FIG. 2 shows the configuration of the pen 104.

In the figure, numeral 601 is a penpoint, numeral 602 is a switch, and numeral 605 is a spring for turning on the switch 602 if the penpoint 601 comes in contact with the liquid crystal panel 101. Numeral 603 is a signal line for transferring information detected with the switch 602 as to whether or not the penpoint 601 is in contact with the surface of the liquid crystal panel, and numeral 604 is a signal line for transferring a detected voltage pulse. In FIG. 1, the signal line 105 represents the signal lines 603 and 604 collectively.

Figure 3:
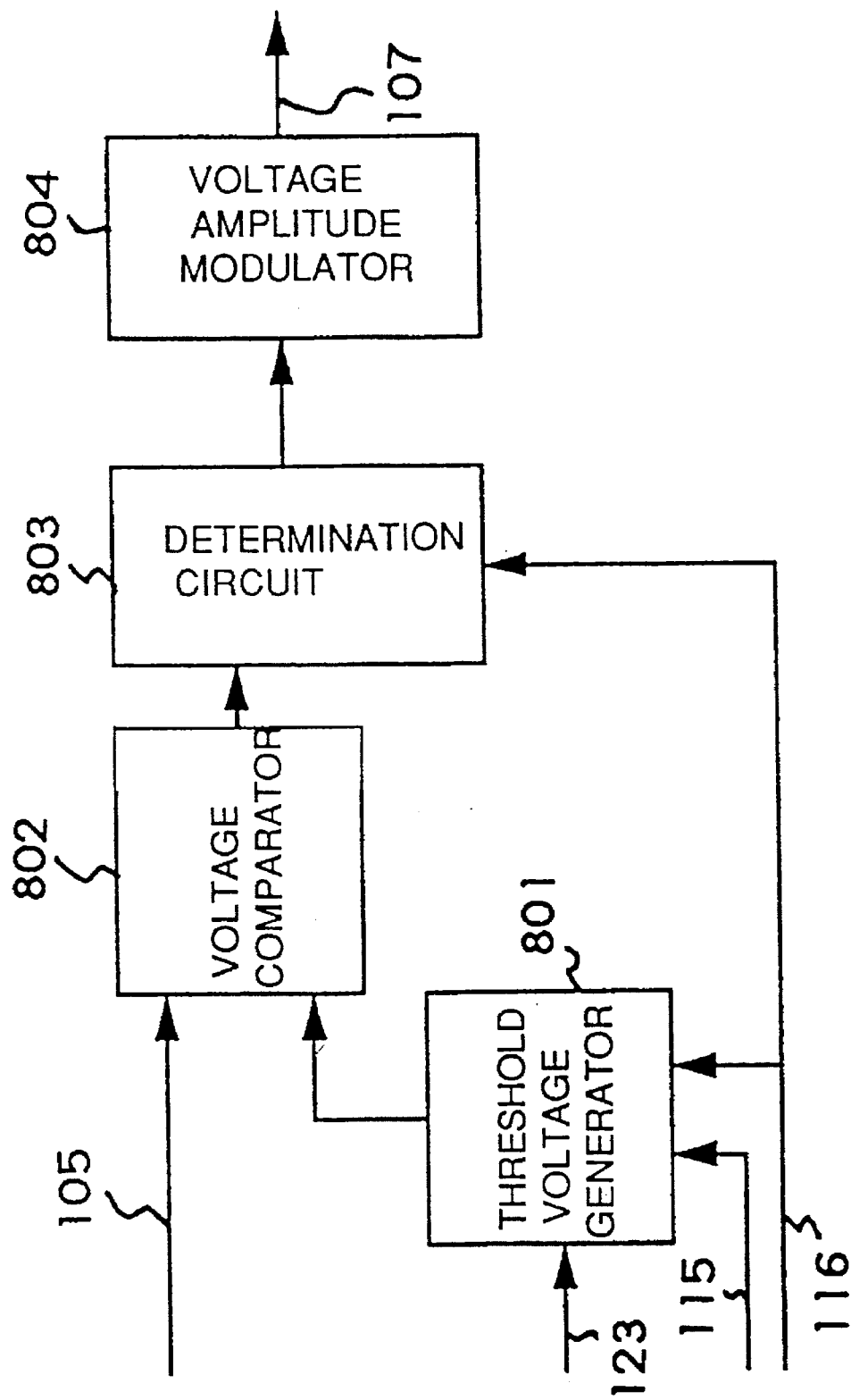
FIG. 3 is a block diagram showing the configuration of a detected voltage correction circuit according to the first embodiment of the invention.

Next, FIG. 3 shows the configuration of the detected voltage correction circuit 106 (see FIG. 1).

In the figure, numeral 801 is a threshold voltage generator which generates a threshold voltage for comparison with a detected voltage pulse transferred on the signal line 105. Numeral 802 is a voltage comparator for comparing the detected voltage pulse with the threshold voltage. Numeral 803 is a determination circuit for determining whether or not the detected voltage pulse is active according to the result of the voltage comparator 802. Numeral 804 is a voltage amplitude modulator which converts the voltage value of the determination result of the determination circuit 803 into, for example, a digital signal.

Figure 4:
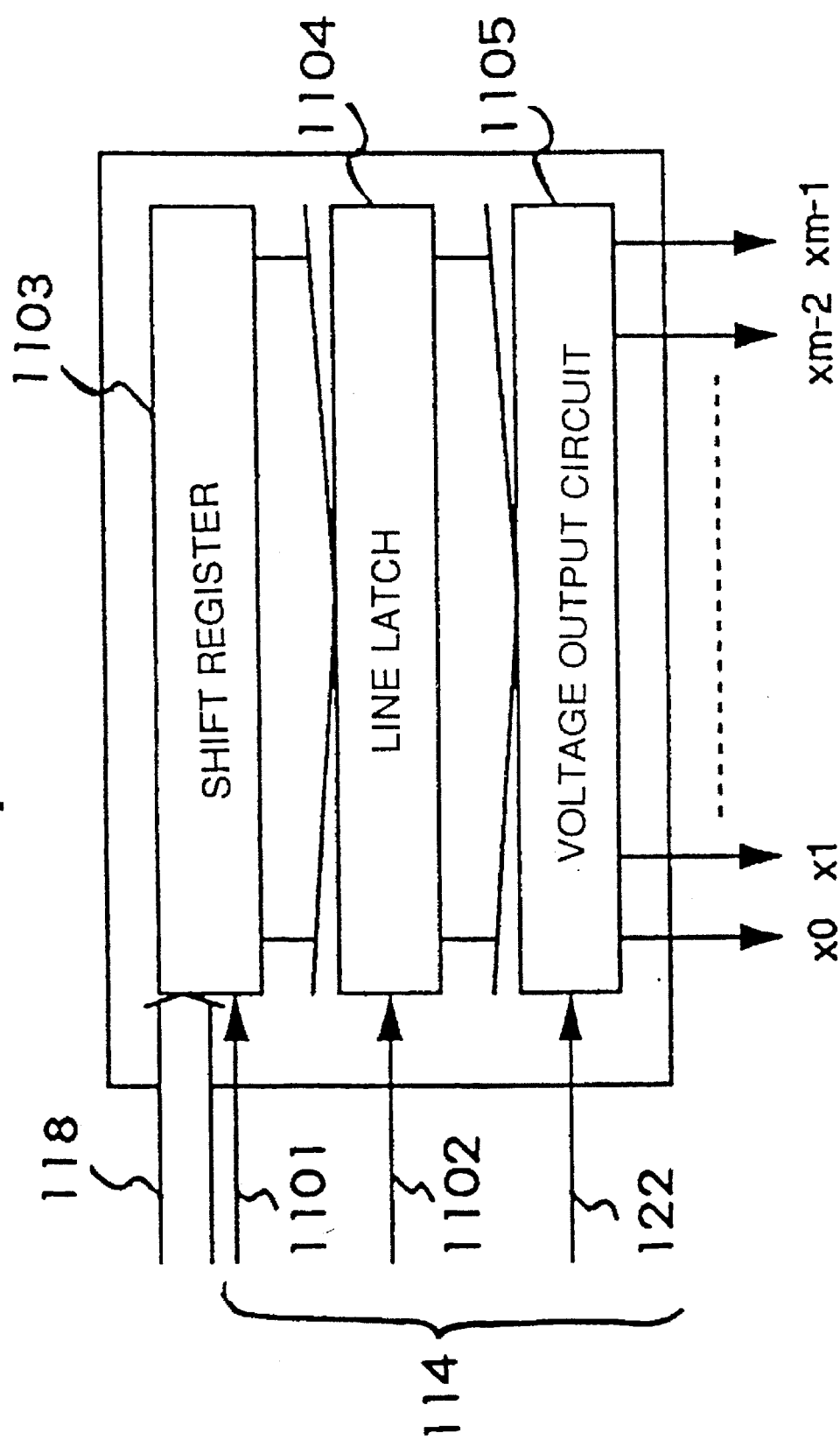
FIG. 4 is a block diagram showing the configuration of an X-electrode driver according to the first embodiment of the invention.

Next, FIG. 4 shows the configuration of the electrode driver 103 (see FIG. 1).

In the figure, numeral 1101 is a clock CL2 synchronized with data transferred on the liquid crystal display data bus 118 and numeral 1102 is a clock CL1 activated each time liquid crystal display data for one horizontal line is transferred. Numeral 1103 is a shift register which inputs data transferred on the liquid crystal display data bus 118 for one line in synchronization with the CL2 clock 1101. Numeral 1104 is a line latch which inputs the data in the shift register 1103 for one line, at the same time, in synchronization with the CL1 clock 1102. Numeral 1105 is a voltage output circuit for outputting voltages corresponding to the 1-line data in the line latch 1104 to the X-electrodes x0, x1, . . . , xm-2, xm-1, at the same time.

Figure 5:
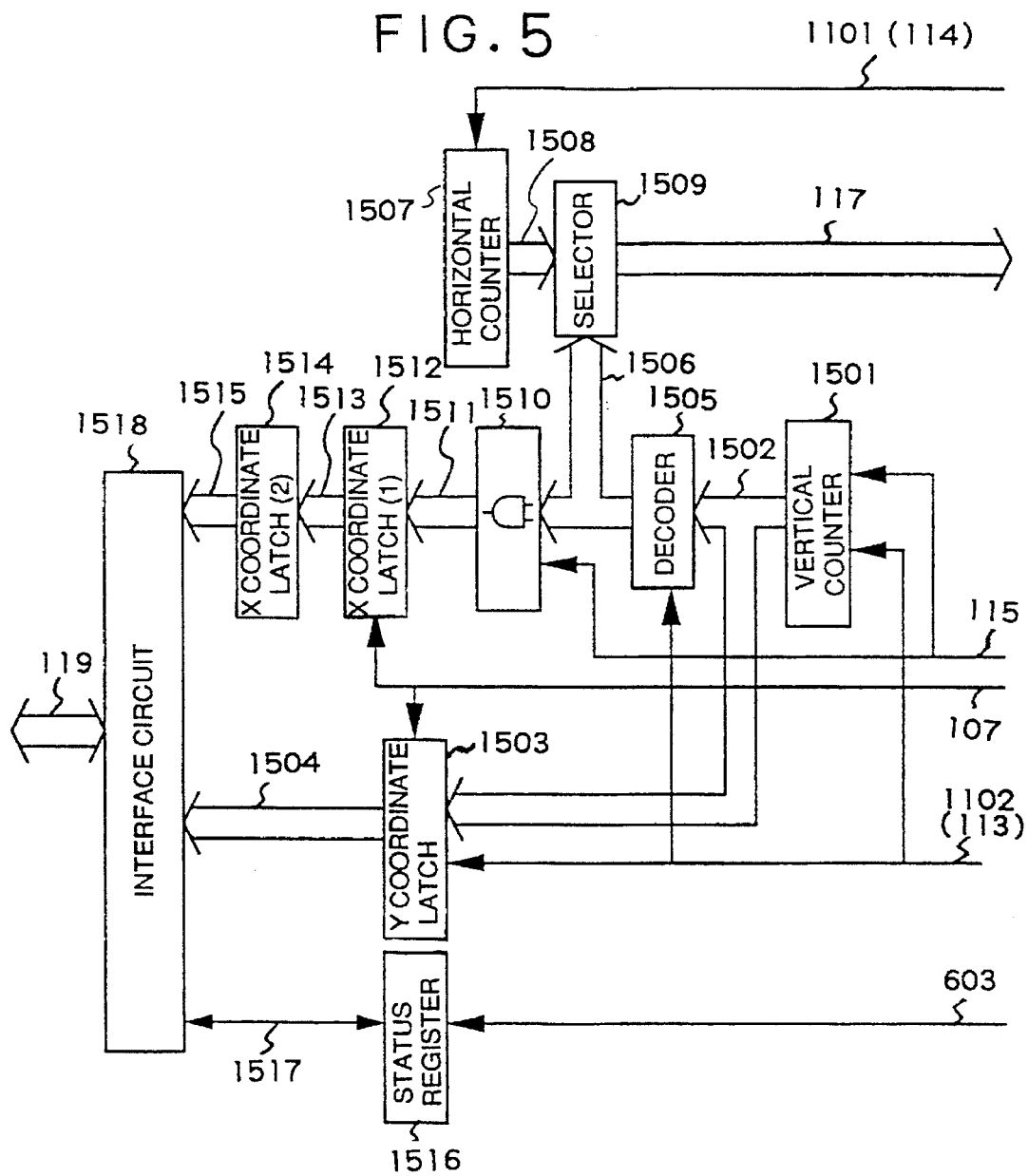
FIG. 5 is a block diagram showing the configuration of a coordinate detector according to the first embodiment of the invention.

Next, FIG. 5 shows the configuration of the coordinate detector 111 (see FIG. 1).

In the figure, numeral 1501 is a vertical counter, numeral 1502 is a signal bus for transferring an output of the vertical counter 1501, numeral 1503 is a Y coordinate latch for temporarily storing a Y coordinate, and numeral 1504 is a data bus for transferring the latch data in the Y coordinate latch 1503. Numeral 1505 is a decoder which decodes an output of the vertical counter 1501 and numeral 1506 is a signal bus for transferring the decoding result of the decoder 1505. Numeral 1507 is a horizontal counter, numeral 1508 is a signal bus for transferring an output of the horizontal counter 1507, and numeral 1509 is a selector for selecting an output of the horizontal counter 1507 according to the output result of the decoder 1505. Numeral 1510 is an AND gate circuit and numeral 1511 is a signal bus for transferring a latch pulse. Numeral 1512 is an X coordinate latch (1), numeral 1513 is a data bus for transferring output data of the X coordinate latch (1) 1512, numeral 1514 is an X coordinate latch (2), and numeral 1515 is a data bus for transferring latch data in the X coordinate latch (2) 1514. Numeral 1516 is a status register in which information as to whether or not the pen 104 is in contact with the liquid crystal panel is set. Numeral 1517 is a data bus for transferring data between the status register 1516 and an interface circuit 1518. Numeral 119 is a data bus for transferring detected X and Y coordinates.

Up to now, we have discussed the configuration of the display unit according to the first embodiment of the invention.

The operation of the display unit according to the first embodiment will be described.

Figure 6:
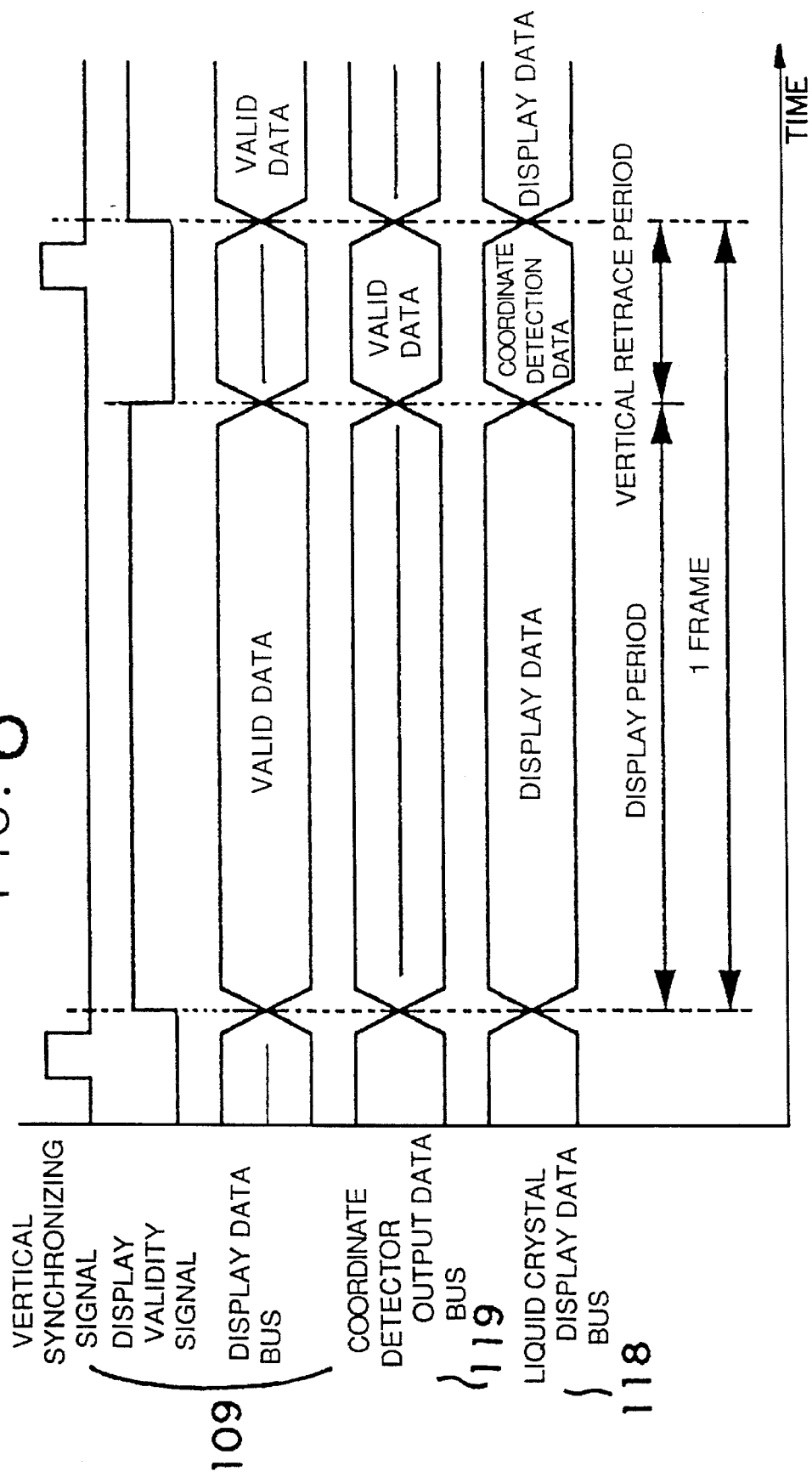
FIG. 6 is a timing chart showing the data transfer timing in the display unit according to the first embodiment of the invention.

As shown in FIG. 6, the 1-frame period is divided into a display period, in which valid display data is transferred on the display data bus 107 (see FIG. 1), and a non-display period, in which valid display data is not transferred, which will be hereinafter called a "vertical retrace period." Since the vertical retrace period is about 5% of the 1-frame period, it becomes about 700 µs because one frame in a general personal computer is about 70 Hz. As shown in FIG. 6, the display validity signal goes high in the display period and goes low in the vertical retrace period.

The display unit of the first embodiment performs the display operation and Y coordinate detection operation in the display period, and the X coordinate detection operation in the vertical retrace period.

First, the display operation performed in the display period will be described.

The Y-electrode driver 102 shown in FIG. 1, which is connected to the Y-electrodes y0, y1, y2, . . . , yn-1, applies selection voltage VyON(H) or VyON(L) to the Y-electrodes y0, y1, y2, . . . , yn-1 in order for each 1-line period in the display period, as shown in FIG. 6.

On the other hand, the selector 112 selects the liquid crystal display data bus 118 in the display period, and display data is transferred in series via the liquid crystal display data bus 118 to the X-electrode driver 103 in the display period.

In the display period, the X-electrode driver 103 reads the display data transferred in series via the liquid crystal display data bus 118 into the shift register 1103 in order, in synchronization with the CL2 clock 1101. Upon completion of inputting the 1-line data to the shift register 1103, the CL1 clock 1102 is activated, causing the 1-line data input to the shift register 1103 to be input to the line latch 1104 in parallel. Then, the voltage output circuit 1105 converts the 1-line data input to the line latch 1104 into voltages corresponding to the data and outputs the voltages through the corresponding X-electrodes x0 to xm-1 at the same time.

Figure 9:
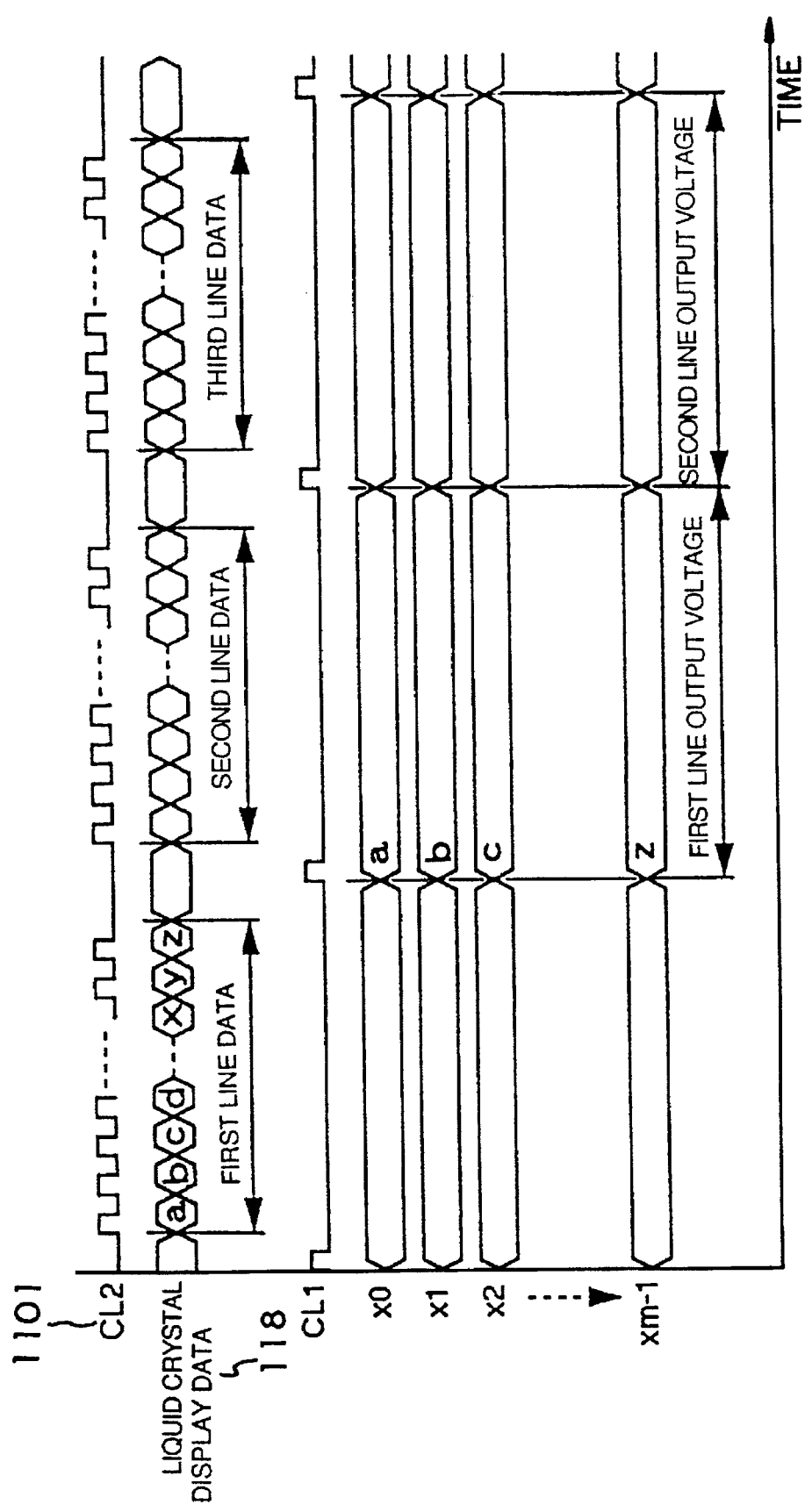
FIG. 9 is a timing chart showing the operation of the X-electrode driver according to the first embodiment of the invention.
Figure 12A:
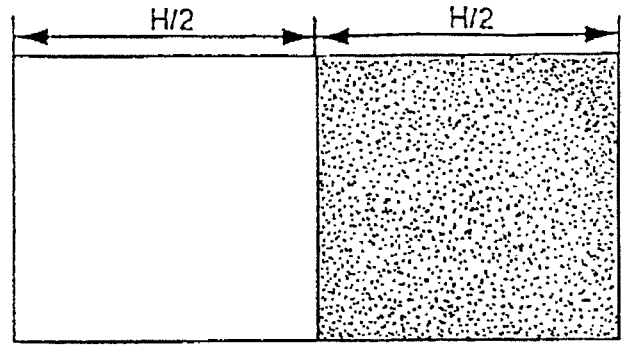
FIG. 12 is an illustration showing schematic selection voltage application patterns to X-electrodes in the display unit according to the first embodiment of the invention.
Figure 12B:
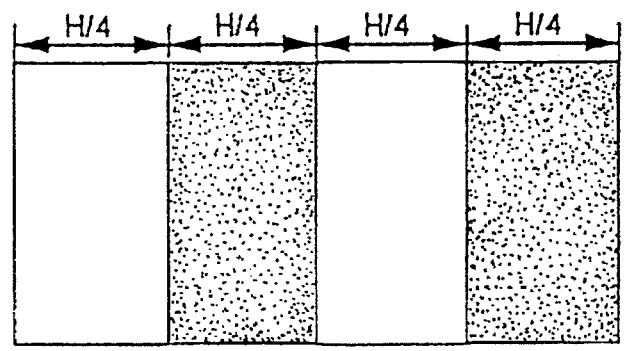
Figure 12C:
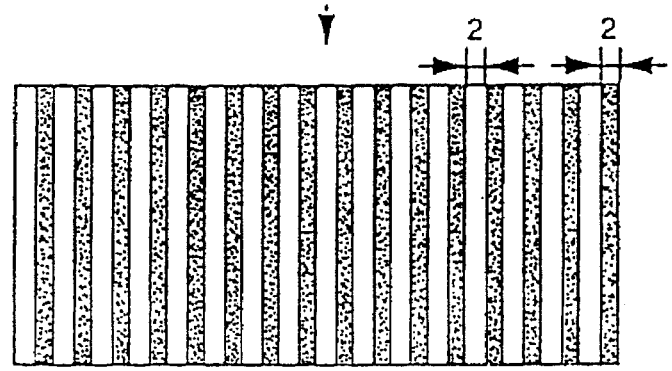
Figure 12D:
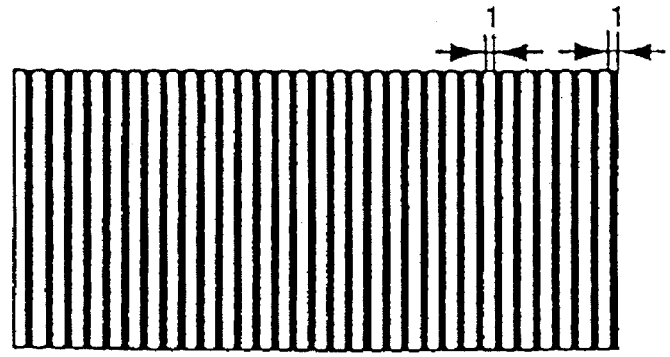

While the first line data input to the shift register 1103 is converted into voltages, and the voltages are output, as shown in FIG. 9, data for the next line is input to the shift register 1103. The X-electrode driver 103 repeats such operation for supplying the voltages corresponding to the display data to the X-electrodes x0, x1, x2, . . . , xm-1 in synchronization with the scanning operation of the Y-electrode driver in the display period.

One screen is displayed within the display period by the operation of the Y-electrode driver 102 and the operation of the X-electrode driver 103 in the display period described above.

Next, the Y coordinate detection operation performed in the display period will be described.

Figure 8:
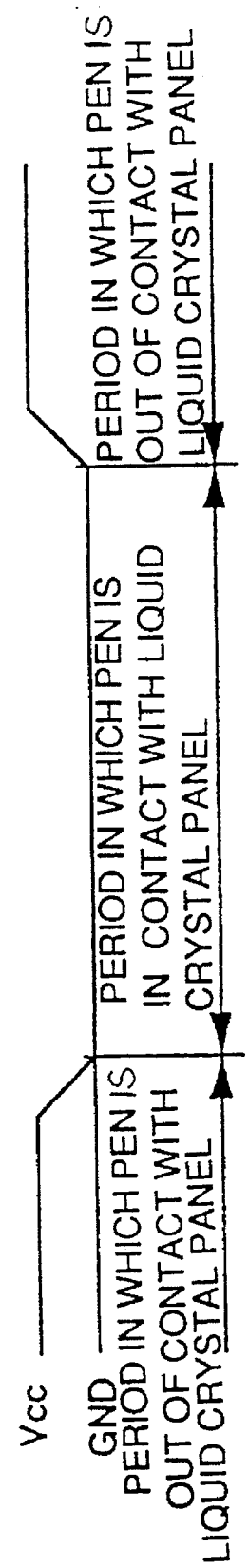
FIG. 8 is a timing chart showing the operation of the pen according to the first embodiment of the invention.

When the penpoint 601 of the pen shown in FIG. 2 comes into contact with the liquid crystal panel 101, the spring 605 is pressed, causing the switch 602 to be turned on for transferring a GND level voltage, via the signal line 603, to the detected voltage correction circuit (106 in FIG. 1). When the penpoint 601 is out of contact with the liquid crystal panel 101, the switch 602 is turned off, for transferring Vcc level voltage, via the signal line 603. FIG. 8 shows the state of the signal line 603. This enables easy detection of the pen 104 being in or out of contact with the liquid crystal panel 101. The state of the signal line 603 is sent to the coordinate detector 111 and information as to whether or not the penpoint 601 is in contact with the liquid crystal panel 101 is set in the status register 1516 of the coordinate detector 111.

As described above, a voltage pulse detected by the pen 104 is transferred via the signal line 604 to the detected voltage correction circuit (106 in FIG. 1) for correction.

Figure 7:
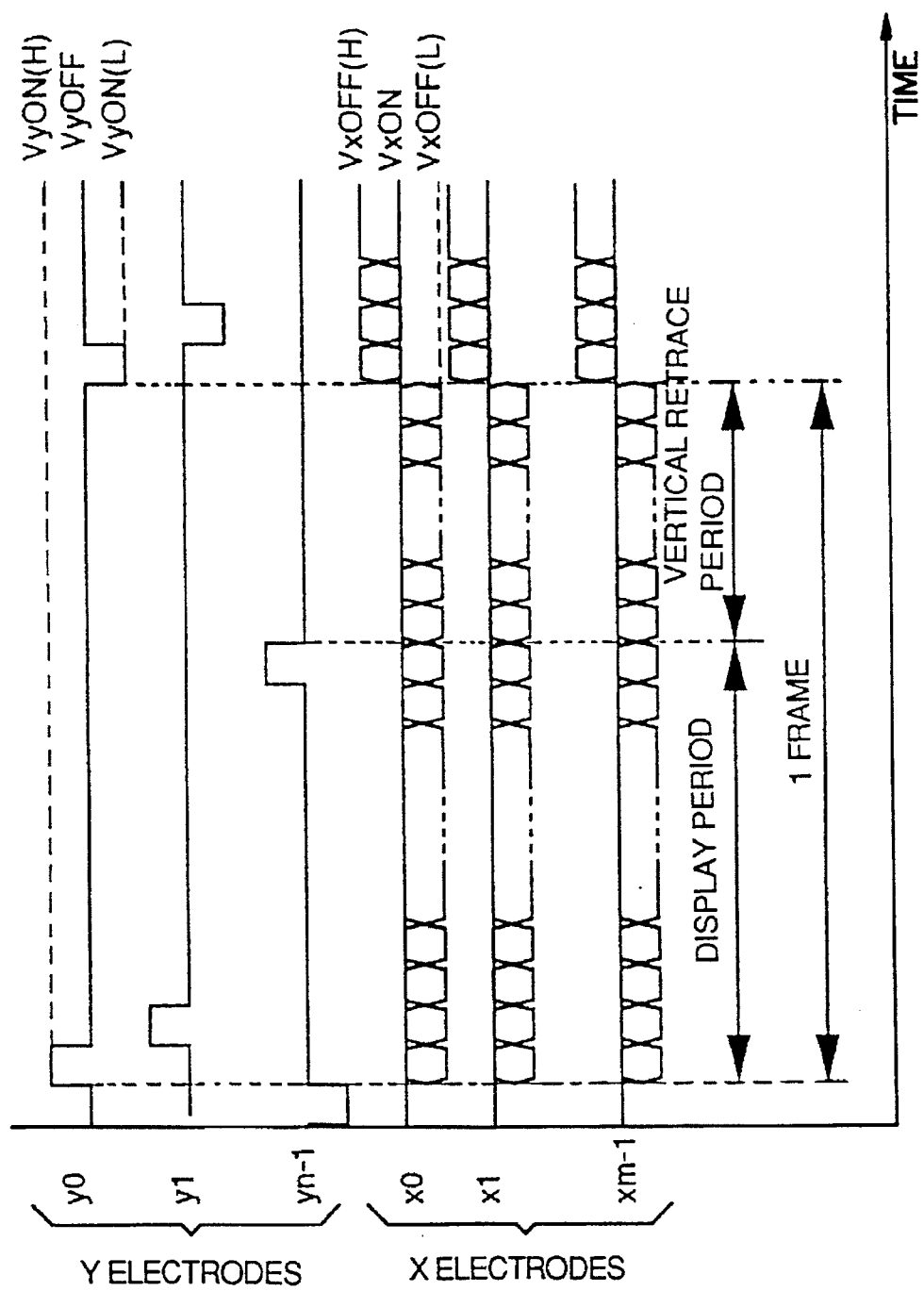
FIG. 7 is a timing chart showing the selection voltage application timing in the display unit according to the first embodiment of the invention.

The reason why the detected voltage is corrected by the detected voltage correction circuit (106 in FIG. 1) is as follows:

Since AC driving needs to be performed for the liquid crystal panel 101 and the X- and Y-electrodes differ in voltage level, as shown in FIG. 7, there are different voltage levels applied to the electrodes. It can be easily assumed that waveform distortion occurs in voltage pulses using electrostatic capacity coupling provided via the pen 104. In this case, the detected voltage needs to be corrected for determining whether or not a voltage pulse is active.

Therefore, the detected voltage correction circuit 106 corrects the detected voltage, as described below:

The threshold voltage generator 801 (see FIG. 3) of the detected voltage correction circuit 106 generates a threshold voltage (Vth) in synchronization with the display validity signal 115 and liquid crystal AC driving timing signal 116. The threshold voltage (Vth) is input to the voltage comparator 802, which then compares it with a voltage pulse detected by the pen 104. The comparison result is input to the determination circuit 803. Since the detected voltage pulse may be active when it is higher (active high) or lower (active low) than the threshold voltage (Vth) depending on a given condition, the determination circuit 803 identifies the condition to use in response to the liquid crystal AC driving timing signal and determines whether the voltage pulse is active or inactive. The voltage amplitude modulator 804 converts the determined voltage pulse into a digital signal '0' or '1', for example. In the description that follows, when the voltage pulse is active, it will be represented by '1' and when it is inactive, it will be represented by '0.'

The Y-electrode driver 102 applies a voltage to the Y-electrodes, in order, in the display period, as described above. As shown schematically in FIG. 11, the voltage is applied to the Y-electrode y0 in the first line period, to the Y-electrode y1 in the second line period, and so forth. Finally, the voltage is applied to the Y-electrode yn-2 in the (n-1)th line period and to the Y-electrode yn-1 in the nth line period.

Now, assume that the pen 104 is in contact with the Y-electrode yn-2. The voltage pulse detected by the pen 104 takes the detected voltage waveform as shown in FIG. 11. Thus, when the liquid crystal AC driving timing signal 116 is high, if the detected voltage pulse is higher than the threshold voltage (Vth), it is assumed to be active and detected voltage correction data '1' is output; when the liquid crystal AC driving timing signal 116 is low, if the detected voltage pulse is lower than the threshold voltage (Vth), it is assumed to be active and detected voltage correction data '1' is output. In any period other than the display period, detected voltage pulses are assumed to be inactive, and data '0' is output.

The detected voltage correction data is output to the coordinate detector 111. Based on the output timing of the detected voltage correction data, the coordinate detector 111 detects the Y coordinate indicated with the pen 104.

As shown in FIG. 5, the coordinate detector 111 has the vertical counter 1501 and the Y coordinate latch 1503. When the display validity signal 115 goes active high, the vertical counter 1501 counts up 0, 1, 2 . . . . in synchronization with the CL1 clock 1102, as shown in FIG. 11. At that time, the Y-electrode driver 102 also applies a selection voltage VyON(H) or VyON(L) to the Y-electrodes in order in synchronization with the CL1 clock 1102.

On the other hand, the Y coordinate latch 1503 latches the count value of the vertical counter 1501 in synchronization with the detected voltage correction data transferred on the signal line 107.

Assuming that the pen 104 is in contact with the Y-electrode yn-2, when the selection voltage VyON is applied to the Y-electrode yn-2, detected voltage correction data '1' is output and data of the Y coordinate 'n-2' is stored in the Y coordinate latch 1503.

The stored data is the Y coordinate value, and is output to the data bus 1504 on which the Y coordinate detection data is transferred.

The Y coordinate with which the pen is in contact can be detected during the display period by the above operation.

Next, the X coordinate detection operation performed in the vertical retrace period will be described.

In the vertical retrace period, the selector 112 selects data from the coordinate detector 111. The pen 104 and the detected voltage correction circuit 106 operate as in the Y coordinate detection described above.

In the vertical retrace period, the coordinate detector 111 supplies data for applying voltages to the X-electrodes x0, x1 . . . , xm-1 with a different pattern for each line period, as shown schematically in FIG. 12, via the selector 112 to the X coordinate drive 103. That is, in the first line period, the X-electrodes x0 to xm-1 are grouped into two equal parts and voltages are applied to one part (in this example, right half). In the second line period, the X-electrodes x0 to xm-1 are grouped into four equal parts and voltages are applied to the X-electrodes in the rightmost part and the right part of the left half portion. Thus, if the line number period is termed 2, the X-electrodes x0 to xm-1 are grouped into $2^2$ equal parts, and voltages are applied to the X-electrodes in the rightmost part and every other part. When the operation is repeated, in the (N-1)th line period, the X-electrodes to which voltages are applied and those to which voltages are not applied appear every two X-electrodes; in the Nth line period, voltage is applied to every other X-electrode. The N is the number of bits required to represent an X coordinate in binary notation. If the number of X-electrodes that exist is the Kth power of 2, N=K. If $\log_2 K$ is not an integer, N becomes the minimum integer among integers greater than $\log_2 K$.

FIG. 13 shows voltage waveforms and how the pen 104 detects voltage when voltages are applied to the X-electrodes, provided that the pen is in contact with the X-electrode x2.

As shown in FIG. 13, since the voltage application pattern in the first line period is to apply voltages to the X-electrodes xm/2 to xm-1, the voltage detected by the pen 104 is lower than the threshold voltage (Vth) and the detection voltage correction circuit 106 outputs detected voltage correction data '0'. For the voltage application pattern in the second line period, the voltage detected by the pen 104 is also lower than the threshold voltage (Vth) and detected voltage correction data '0' is output. When the operation is repeated in the third and later line periods, the voltage detected by the pen 104 is lower than the threshold voltage (Vth) and detected voltage correction data '0' is output until the voltage application pattern in the (N-2)th line period. For the voltage application pattern in the (N-1)th line period, the voltage detected by the pen 104 becomes higher than the threshold voltage (Vth) and detected voltage correction data '1' is output. For the voltage application pattern in the Nth line period, the voltage detected by the pen 104 becomes lower than the threshold voltage (Vth) and detected voltage correction data '0' is output.

Then, in the coordinate detector 111, the detected voltage correction data in the first line period is assigned to the most significant bit of the X coordinate value, the data in the second line period is assigned to the second most significant bit of the X coordinate value, . . . , the data in the (N-1)th line period is assigned to the second least significant bit of the X coordinate value, and the data in the Nth line period to the least significant bit of the X coordinate value. Thus, the X coordinate "2" can be detected ('00 . . . 10' in binary).

During the X coordinate detection operation, the horizontal counter 1507 (see FIG. 5) of the coordinate detector 111 counts up in synchronization with the CL2 clock 1101. On the other hand, the vertical counter 1501 is activated in the vertical retrace period by the display validity signal 115 and counts up in synchronization with the CL1 clock 1102. When the vertical counter 1501 is 0, the decoder 1505 performs control so that the selector 1509 outputs the most significant bit of the horizontal counter 1507 to the X-electrode driver as data.

The most significant bit of the horizontal counter 1507 is set to 0 in the first half of one line period and 1 in the latter half of the period. The X-electrode driver 103, which inputs the data, applies a non-selection voltage to one half of the screen and a selection voltage to the other half, as shown in the first line period in FIG. 12.

On the other hand, when the vertical counter 1501 is 0, the decoder 1505 sends a signal for selecting only the most significant bit of the X coordinate latch (1) 1512 to the AND gate circuit 1510. Then, the AND gate circuit 1510 ANDs the signal and the display validity signal 115 and sends the resultant signal to the most significant bit of the X coordinate latch (1) 1512 as a latch pulse in the vertical retrace period. The latch pulse causes the detected voltage correction data transferred on the signal line 107 from the detected voltage correction circuit 106 to be stored in the most significant bit of the X coordinate latch (1) 1512. At that time, the latch pulse is not sent to other bits of the X coordinate latch (1) 1512 and these bits maintain the value set so far.

Next, when the vertical counter 1501 is 1, the decoder 1505 performs control so that the selector 1509 outputs the second most significant bit of the horizontal counter 1507 to the X-electrode driver as data.

The second most significant bit of the horizontal counter 1507 changes in the pattern 0101 every quarter of one line period. The X-electrode driver 103 which inputs the data applies a selection voltage to the X-electrodes in the rightmost quarter and the right part of the left half area and a non-selection voltage to other quarters, as shown in the second line period in FIG. 12.

On the other hand, when the vertical counter 1501 is 1, the decoder 1505 sends a signal for selecting only the second most significant bit of the X coordinate latch (1) 1512 to the AND gate circuit 1510. Then, the AND gate circuit 1510 ANDs the signal and the display validity signal 115 and sends the resultant signal to the second most significant bit of the X coordinate latch (1) 1512 as a latch pulse in the vertical retrace period. The latch pulse causes the detected voltage correction data transferred on the signal line 107 from the detected voltage correction circuit 106 to be stored in the second most significant bit of the X coordinate latch (1) 1512. At that time, the latch pulse is not sent to other bits of the X coordinate latch (1) 1512 and these bits maintain the value set so far.

The operation is repeated until the vertical counter 1501 is set to "n-1." The bits of the X coordinate value are set in the corresponding bits of the X coordinate latch (1) 1512 in order. After all the bits are set in the X coordinate latch (1) 1512, all the bits of the X coordinate latch (1) 1512 are input to the X coordinate latch (2) 1514 at the same time, for completing the data.

The X coordinate with which the pen 104 is in contact has been stored in the X coordinate latch (2) 1514 and both the Y and X coordinates are now complete.

Thus, according to the first embodiment, an external system checks the state in the status register 1516 to ensure that the pen 104 is in contact with the liquid crystal panel 101, and can then detect the X and Y coordinates with which the pen 104 is in contact, via the data bus 119 from the interface 1518.

Also, the time for applying a voltage to the X-electrodes to detect the X coordinate can take longer than was previously possible. For example, when the frame period is 70 Hz and the number of pixels in the horizontal direction is 640 dots, the vertical counter 1501 needs only to count up to 10 in the vertical retrace period, thus the voltage may be applied to the X-electrodes 10 times. Therefore, the time of about 70 μs can be used to apply the voltage to the X-electrodes. Since the 1-line period is normally about 30 μs, the X-electrodes need to be charged at an equivalent speed to that in the display period of the conventional display unit.

In the first embodiment, the bits of the horizontal counter 1507 are output in order from the most significant bit to the least significant bit for each line under the X coordinate detection control in the vertical retrace period, but the bits may be output in any order, provided that selection of the output bits matches selection of the bits of the X coordinate latch (1) 1512.

If accuracy is not too important for the X coordinate detection operation, the operation may be terminated in an intermediate line period before reaching the Nth line period, in which case only the high-order part of the X coordinate is found.

Although the embodiment assumes that the number of X-electrodes is the Nth power of 2 in the description, it can be applied if the number of X-electrodes is any other number.

Next, a display unit according to a second embodiment of the invention will be discussed.

The display unit according to the second embodiment differs from the display unit according to the first embodiment in the configuration of a coordinate detector 111 or the X coordinate detection operation.

Figure 14:
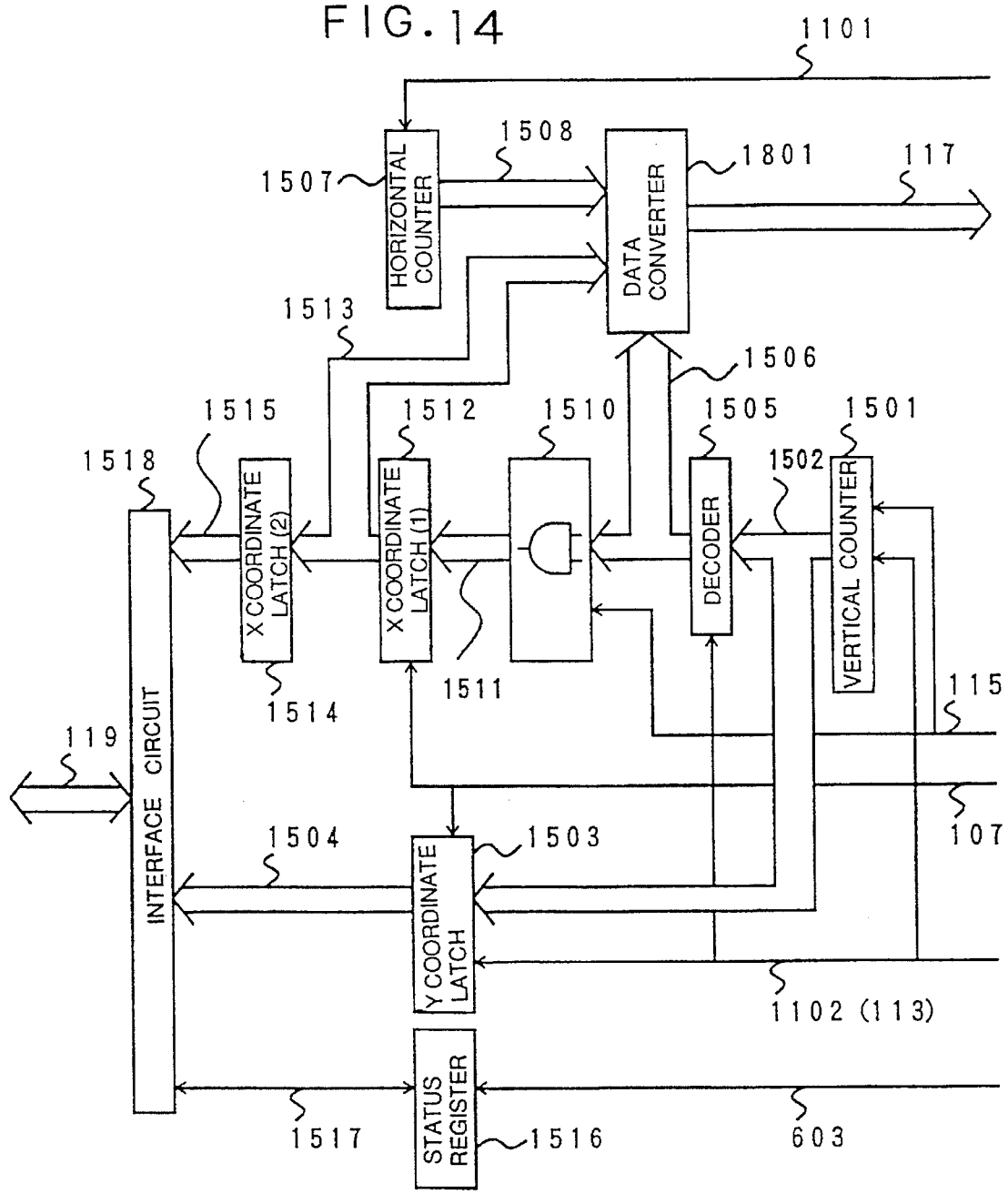
FIG. 14 is a block diagram showing the configuration of a coordinate detector according to a second embodiment of the invention.
Figure 15A:
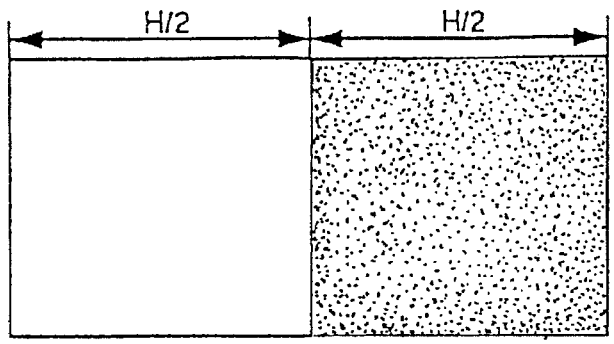
FIG. 15 is an illustration showing schematic selection voltage application patterns to X-electrodes in a display unit according to the second embodiment of the invention.
Figure 15B:
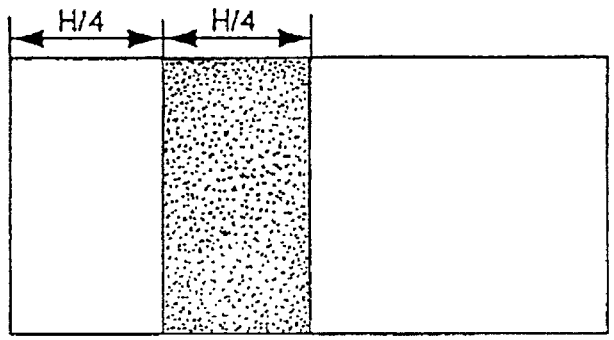
Figure 15C:
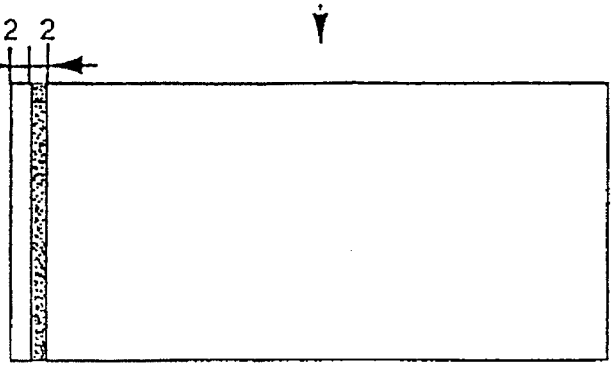
Figure 15D:
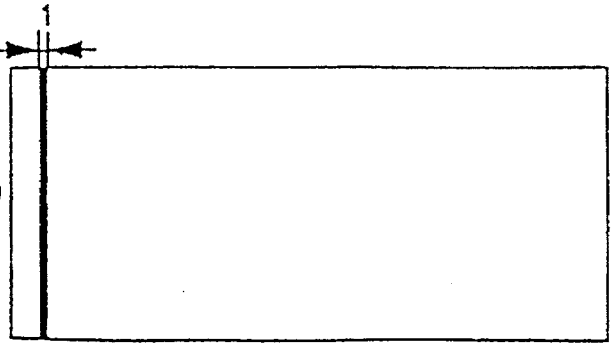

First, FIG. 14 shows the configuration of the coordinate detector 111 according to the second embodiment.

As shown here, the coordinate detector 111 according to the second embodiment comprises a data converter 1801 in place of the selector 1509 of the coordinate detector according to the first embodiment shown in FIG. 5.

The X coordinate detection operation of the coordinate detector 111 will be described.

In the second embodiment, the data converter 1801 transfers the most significant bit data of a horizontal counter 1507 to a coordinate detection data bus 117 so as to apply voltages to the X-electrodes xm/2 to xm-1 in the first line period, as shown schematically in FIG. 15, in the non-display period. Therefore, in the first line period, an X-electrode driver 103 generates voltages as in the first line period in the first embodiment (see FIG. 12).

Figure 16:
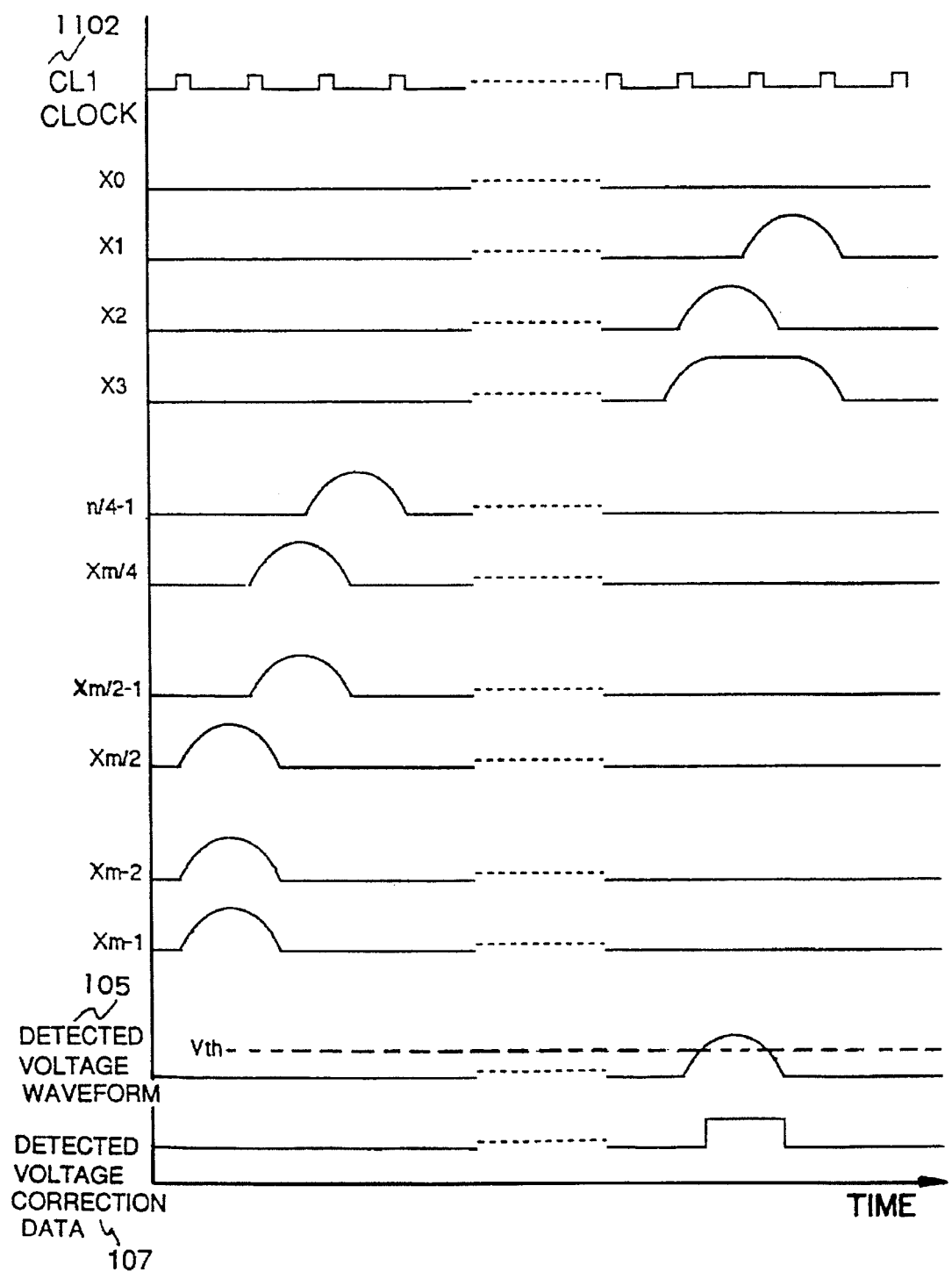
FIG. 16 is a timing chart showing the X-electrode voltage detection timing in the display unit according to the second embodiment of the invention.

Since the pen 104 cannot detect a voltage pulse from the voltage application pattern in the first line period, as shown in FIG. 16, a timing chart, a detected voltage correction circuit 106 transfers detected voltage correction data '0' via a signal line 1102, whereby '0' is stored in the most significant bit of an X coordinate latch (1) 1512 as described above in the first embodiment.

In the second line period, the data converter 1801 exclusive-ORs the most significant bit of the horizontal counter 1507 and the most significant bit of the X coordinate latch (1) 1512, ANDs the inversion value of the result and the second most significant bit of horizontal counter 1507, and outputs the result to the X-electrode driver 103 for applying voltages to the X-electrodes xm/4 to xm/2−1. If the pen exists at a position on or after the X-electrode xm/2, the detected voltage correction data '1' is output in the first line period, and voltages are applied to the X-electrodes xm/2 to xm/4−1 by the operation.

If the pen 104 cannot detect a voltage pulse in the second line period, '0' is also stored in the second most significant bit of the X coordinate latch (1) 1512.

In the third line period, the data converter 1801 ANDs the inversion value of the result of exclusive-ORing the most significant bit of the horizontal counter 1507 and the most significant bit of the X coordinate latch (1) 1512, the inversion value of the result of exclusive-ORing the second most significant bit of the horizontal counter 1507 and the second most significant bit of the X coordinate latch (1) 1512, and the third most significant bit of the horizontal counter 1507, and outputs the result to the X-electrode driver 103 for applying voltages to the X-electrodes xm/8 to xm/8−1.

Thus, the data converter 1801 repeats ANDing of the inversion value of the result of exclusive-ORing each of the bits of the X coordinate latch (1) 1512 having been detected and its corresponding bit of the horizontal counter 1507 and the bit of the horizontal counter 1507 to be used for detection, and outputs the result in each line period until the Nth line period shown in FIG. 15, thereby providing the voltage application patterns shown in FIG. 15 and storing the X coordinate in the X coordinate latch (1) 1512.

When the X coordinate has been stored in the X coordinate latch (1) 1512, the latch contents are moved to an X coordinate latch (2) 1514.

Then, an external system can access the detected X and Y coordinates via an interface circuit 1518 and a data bus 119 as in the first embodiment.

Next, a display unit according to a third embodiment of the invention will be discussed.

The third embodiment assumes that the penpoint of a pen 104 is broad and that the pen 104 also erroneously detects voltage pulses applied to the electrodes near the electrode with which the pen 104 is in actual contact. In the third embodiment, coordinates are detected accurately even if the penpoint is broad.

In the description of the third embodiment to follow, it is assumed that the penpoint of the pen 104 is broad and that the pen 104 also erroneously detects voltage pulses applied to the electrodes contiguous to the electrode with which the pen 104 is in contact.

The display unit according to the third embodiment differs from the display unit according to the first embodiment in the configuration of a coordinate detector 111, Y coordinate detection operation, or the X coordinate detection operation.

Figure 17:
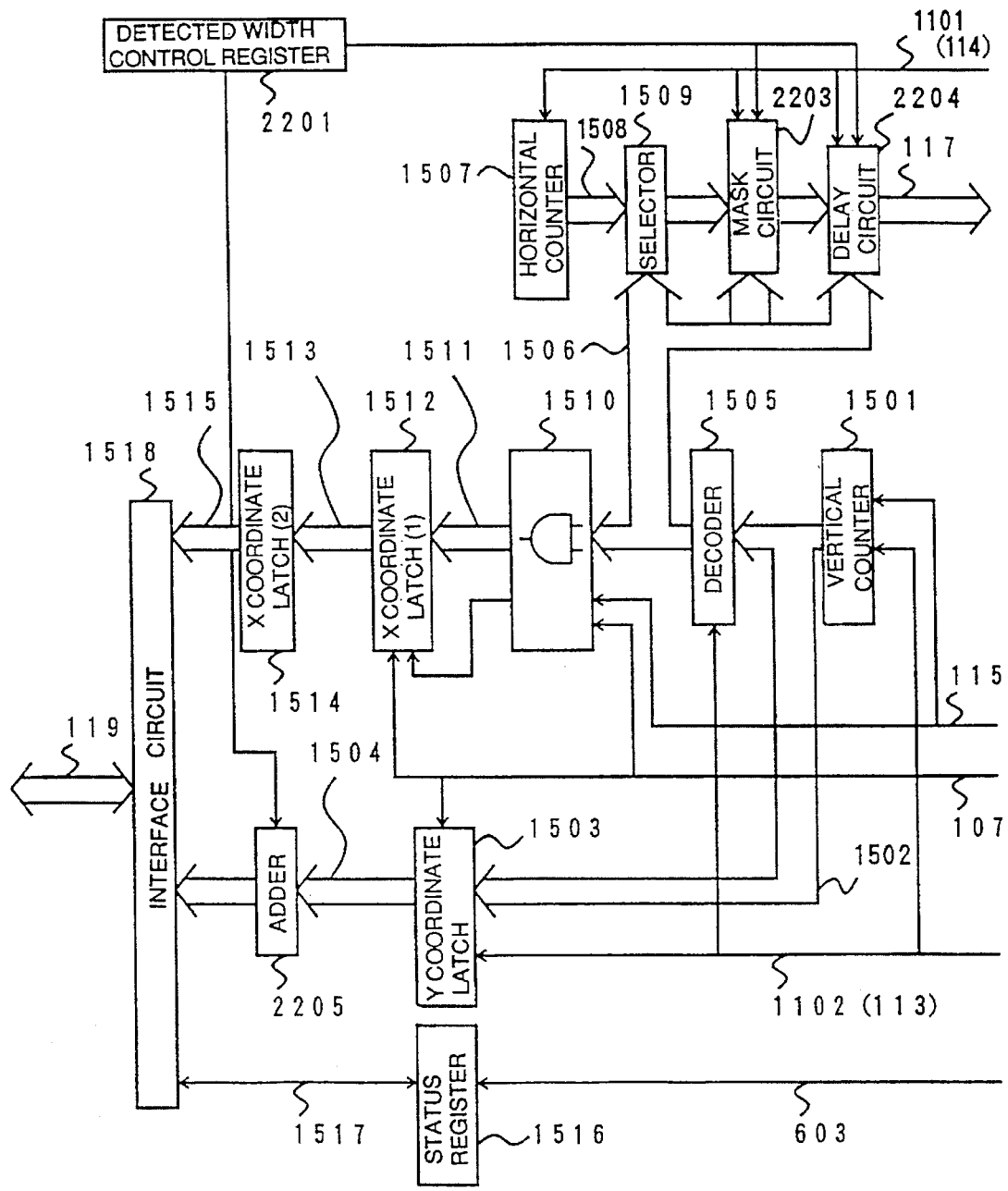
FIG. 17 is a block diagram showing the configuration of a coordinate detector according to a third embodiment of the invention.
Figure 18A:
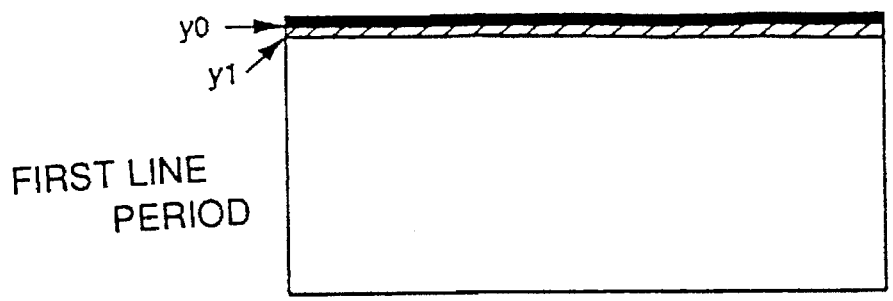
FIG. 18 is an illustration showing schematic selection voltage application patterns to Y-electrodes in a display unit according to the third embodiment of the invention.
Figure 18B:
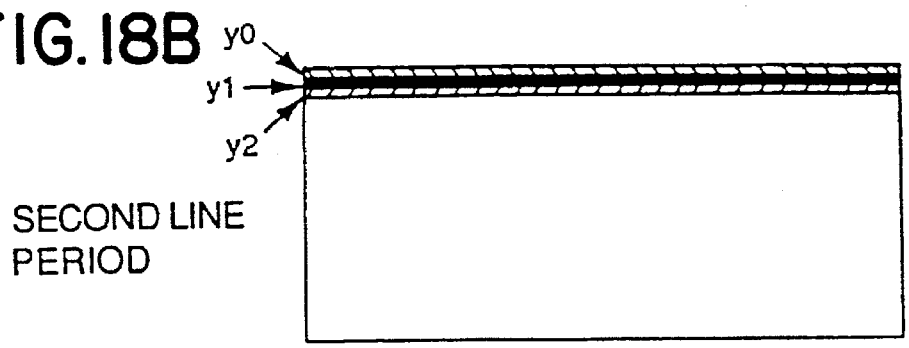
Figure 18C:
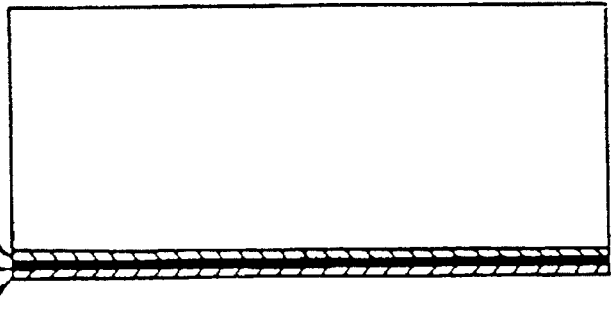
Figure 18D:
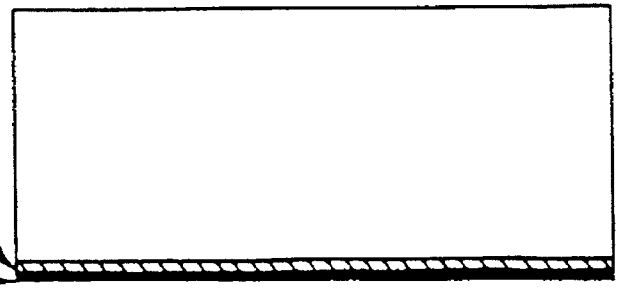

First, FIG. 17 shows the configuration of the coordinate detector 111 according to the third embodiment.

As shown here, the coordinate detector 111 according to the third embodiment is provided by adding a detected width control register 2201, a mask circuit 2203, a delay circuit 2204, and an adder 2205 to the coordinate detector 111 according to the first embodiment shown in FIG. 5.

The operation of the Y coordinate detection operation according to the third embodiment will be discussed.

FIG. 18 shows schematically the relationships between voltage application patterns to Y-electrodes and the erroneous detection ranges of the pen 104.

FIG. 18 represents a condition in which even if the pen 104 is in contact with the Y-electrode y2 in the second line period, for example, when voltage is applied to the Y-electrode y1, the pen 104 determines that effective voltage has been applied.

In the third embodiment, voltage is applied to the Y-electrodes y0 to yn-1 in order in the display period as in the first embodiment; however, when the pen 104 is broad, if voltage is applied to the Y-electrode above or below the current Y-electrode with which the pen 104 is in contact, the pen 104 will also detect the voltage.

Figure 19:
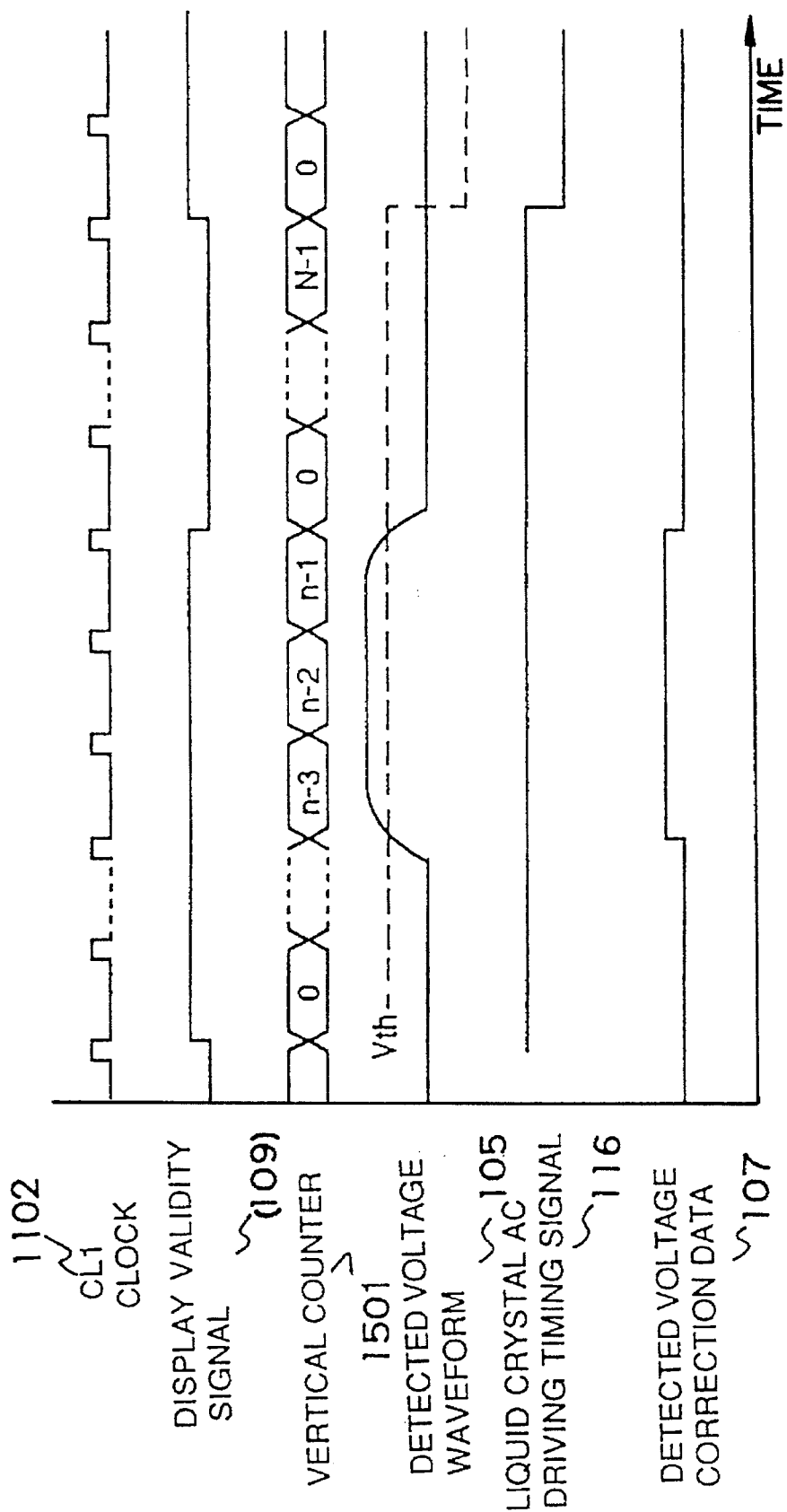
FIG. 19 is a timing chart showing the Y-electrode voltage detection timing in the display unit according to the third embodiment of the invention.
Figure 20A:
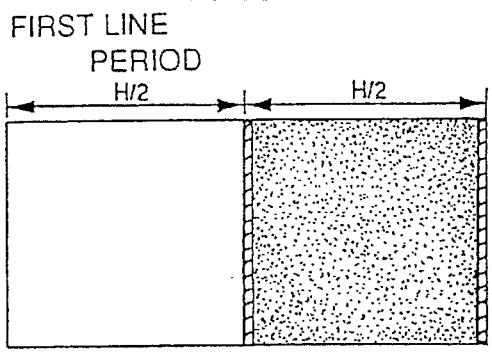
FIG. 20 is an illustration showing schematic selection voltage application patterns to X-electrodes in the display unit according to the third embodiment of the invention.
Figure 20B:
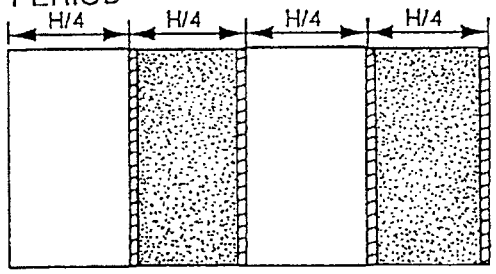
Figure 20C:
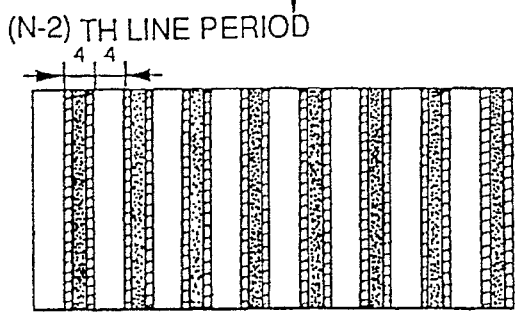
Figure 20D:
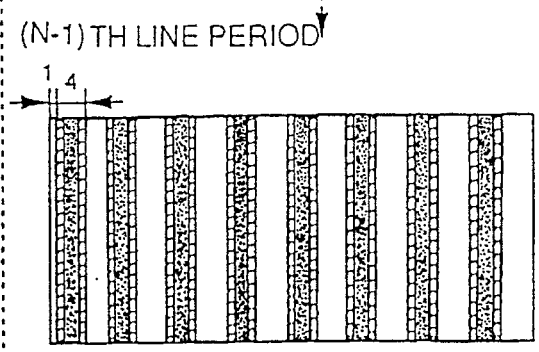
Figure 20E:
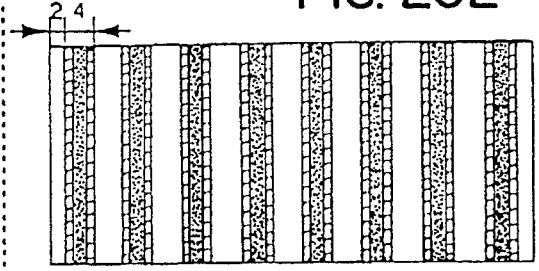
Figure 20F:
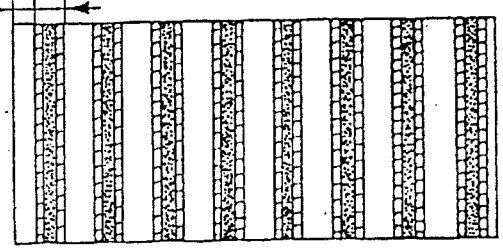
Figure 21A:
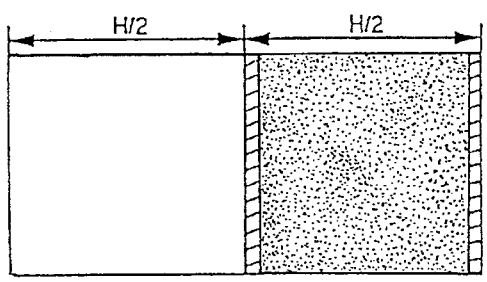
FIG. 21 is an illustration showing schematic selection voltage application patterns to X-electrodes different from those shown in FIG. 20 in the display unit according to the third embodiment of the invention.
Figure 21D:
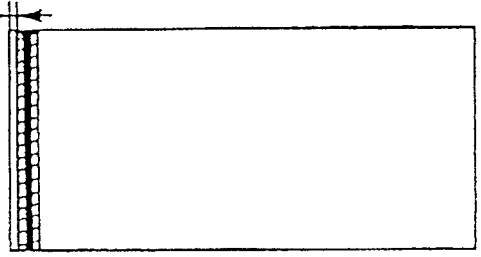
Figure 21B:
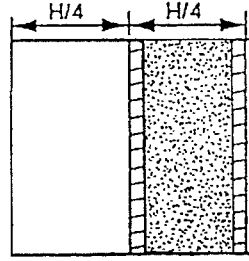
Figure 21E:
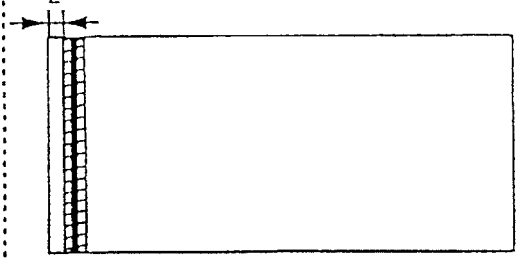
Figure 21C:
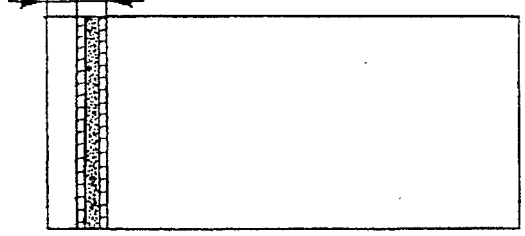
Figure 21F:

The situation is explained with reference to FIG. 19. Assume that the pen 104 is in contact with the Y-electrode yn-2. Since with voltage applied to the Y-electrode yn-3, the voltage pulse detected by the pen 104 is higher than the threshold voltage (Vth), the pen 104 detects it. Detected voltage correction data is set to '1' for transfer to the coordinate detector 111.

Thus, the coordinate detector 111 inputs the detected voltage correction data set to '1' when the Y-electrode preceding the Y-electrode with which the pen 104 is in contact is activated, and stores the data in a Y coordinate latch 1503. Then, in the third embodiment, the coordinate detector 111 is provided with the adder 2205 for adding the value of the detected width control register 2201 to the data output by the Y coordinate latch 1503. The value '1' prestored in the detected width control register 2201 is added to the value stored in the Y coordinate latch 1503 and the result is output. Thus, the actual Y coordinate to be detected is output.

If the pen 104 erroneously detects the Y-electrode voltage in a wider range, the data value set in the detected width control register 2201 may be increased conforming to the erroneous detection range. When the pen detects the Y-electrode voltage correctly as in the first embodiment, the data value '0' may be set in the detected width control register 2201.

Next, the X coordinate detection operation will be described.

FIG. 20 shows schematically the relationships between voltage application patterns to X-electrodes and the erroneous detection ranges of the pen 104. As shown here, the pen 104 detects voltages for three electrodes at the same time, and thus detects voltage for one electrode in the left or right direction. That is, if voltage is applied to the X-electrode at the left or right of the X-electrode with which the pen 104 is in actual contact, the voltage is detected. Then, in the third embodiment, voltage is not applied to the left or right electrode in the range of applying voltages in each voltage application pattern shown in the first embodiment. If voltage is not applied to the left or right electrode, the pen in contact with the X-electrodes xm/2 to xm-1 can detect voltage applied to the X-electrodes xm/2+1 to xm-2.

The mask circuit 2203 suppresses voltage application to the left electrode and right electrode in the range of applying voltages in each voltage application pattern shown in the first embodiment.

The mask circuit 2203 masks as many '1's as the value set in the detected width control register 2201 at both ends of each continuous '1' string of a data string input from a selector 1509 with '0'. The length of the continuous '1' string of the data string input from a selector 1509 is determined in response to the output value of a decoder 1505. Therefore, if the mask circuit 2203 detects the first '1' in the continuous '1' string of the data string input from the selector 1509, it can perform the mask operation from the output value of the decoder 1505 and the value set in the detected width control register 2201.

When the operation is performed in order, as in the first embodiment, while the number of the X-electrodes to which voltage is applied is thus reduced, positions where the pen 104 can and cannot detect voltage occur every four X-electrodes, as shown in FIG. 20, in the (N–2)th line period.

Therefore, the X coordinate bits, except the low-order two bits, can be detected by the operation performed so far.

However, the low-order two bits (coordinates for four electrodes) cannot be detected by the technique of reducing the number of X-electrodes to which voltage is applied, because voltage needs to be applied every two X-electrodes or every X-electrode. Then, in the third embodiment, the voltage application pattern in the (N–2)th line period in FIG. 20 is shifted one electrode at a time in the lateral direction as shown in the (N–1)th line period, (N)th line period, and (N+1)th line period, whereby the low-order two coordinate bits can be detected.

The selector 1509 selects the (N–2)th most significant bit of the horizontal counter 1507 from the (N–1)th line period to the (N+1)th line period and the delay circuit 2204 delays the data to be output to an X-electrode driver 103 by the time interval as long as five bits in the (N–1)th line period, by the time interval as long as six bits in the (N)th line period, and by the time interval as long as seven bits in the (N+1)th line period.

On the other hand, an AND gate circuit 1510 according to the third embodiment sets the least significant bit and the second least significant bit of an X coordinate latch (1) 1512 in response to a string of the detected voltage correction data detected from the (N–2)th line period to the (N+1)th line period. Table 1 lists the correspondence between the strings of the detected voltage correction data detected from the (N–2)th line period to the (N+1)th line period and the values of the least significant bit and the second least significant bit of the X coordinate latch (1) 1512 to be set.

TABLE 1

| N – 2 | N – 1 | N | N + 1 | Second least significant bit | Least significant bit |
|---|---|---|---|---|---|
| 0 | 0 | 0 | 0 | 0 | 0 |
| 0 | 1 | 0 | 0 | 0 | 1 |
| 0 | 1 | 1 | 0 | 1 | 0 |
| 0 | 1 | 1 | 1 | 1 | 1 |
| 1 | 1 | 1 | 1 | 0 | 0 |
| 1 | 0 | 1 | 1 | 0 | 1 |
| 1 | 0 | 0 | 1 | 1 | 0 |
| 1 | 0 | 0 | 0 | 1 | 1 |

Such storage of the least and second least significant bits is enabled by the AND gate circuit 1510, which performs the following operation:

If the detected voltage correction data detected in the (N–2)th line period is '0', the detected voltage correction data detected in the (N–1)th line period is stored in the least significant bit of the X coordinate latch (1) 1512 and the detected voltage correction data detected in the Nth line period is stored in the second least significant bit of the X coordinate latch (1) 1512. If the detected voltage correction data detected in the Nth line period is '1,' further the detected voltage correction data detected in the (N+1)th line period is stored in the least significant bit of the X coordinate latch (1) 1512. If the detected voltage correction data detected in the Nth line period is '0,' the detected voltage correction data detected in the (N+1)th line period is not stored in the X coordinate latch (1) 1512.

On the other hand, if the detected voltage correction data detected in the (N–2)th line period is '1,' the value provided by inverting the detected voltage correction data detected in the (N–1)th line period is stored in the least significant bit of the X coordinate latch (1) 1512 and the value provided by inverting the detected voltage correction data detected in the Nth line period is stored in the second least significant bit of the X coordinate latch (1) 1512. If the detected voltage correction data detected in the Nth line period is '0', further the value provided by inverting the detected voltage correction data detected in the (N+1)th line period is stored in the least significant bit of the X coordinate latch (1) 1512. If the detected voltage correction data detected in the Nth line period is '1', the detected voltage correction data detected in the (N+1)th line period is not stored in the X coordinate latch (1) 1512.

The detection of all bits of X coordinate is now complete.

If the voltage application patterns to the X-electrodes shown in FIG. 15 are used in the X coordinate detection operation of the display unit according to the second embodiment, a pen with a broad penpoint can also be used, as shown in FIG. 21, as in the third embodiment. In this case, the data converter explained in the second embodiment (1801 in FIG. 14) may be provided, in place of the selector 1509 of the coordinate detector 111 shown in FIG. 17 according to the third embodiment, for performing the same conversion from the (N–1)th line period to the (N+1)th line period.

Next, a display unit according to a fourth embodiment of the invention will be discussed.

Figure 22:
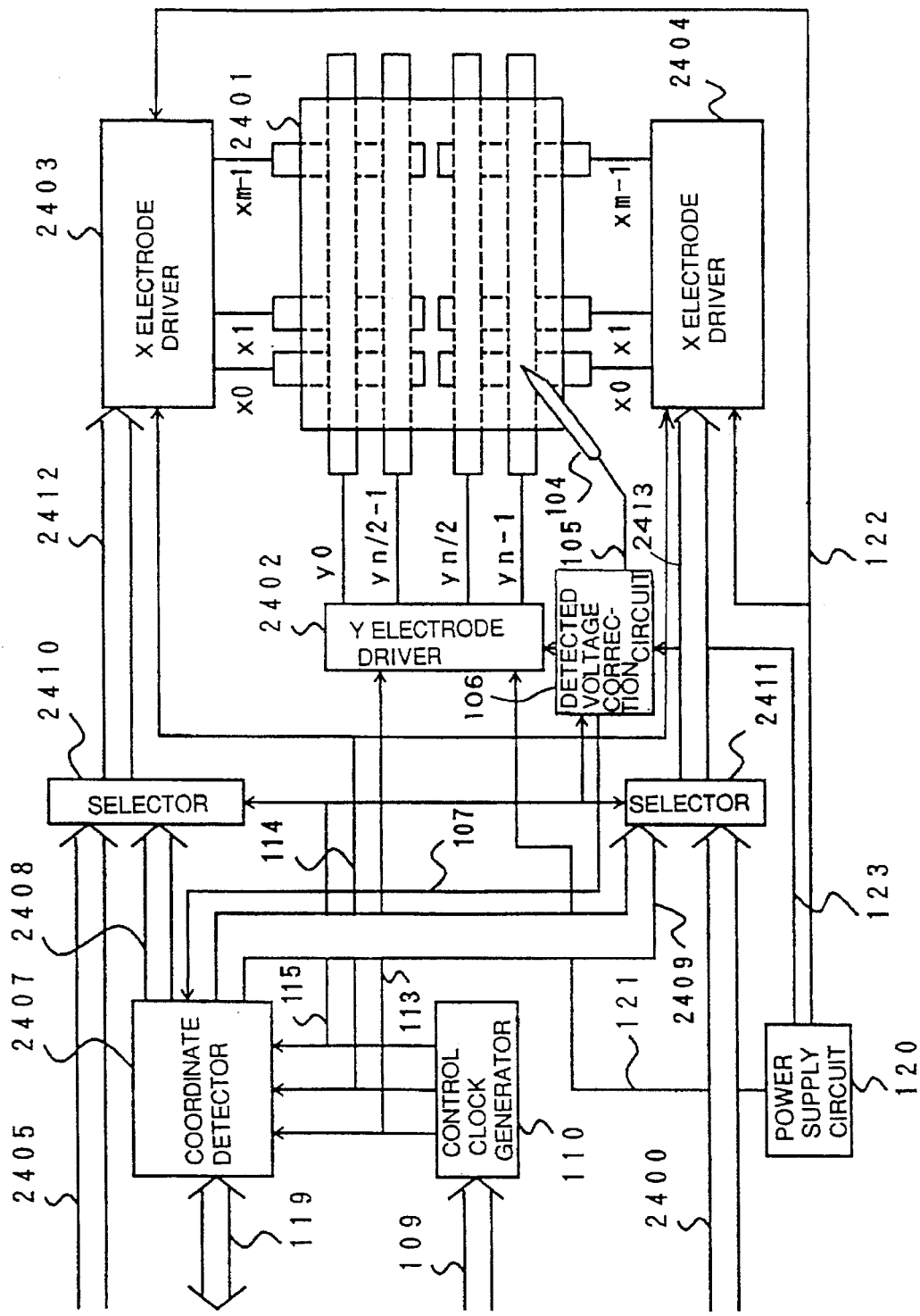
FIG. 22 is a block diagram showing the configuration of a display unit according to a fourth embodiment of the invention.

FIG. 22 shows the configuration of the display unit according to the fourth embodiment of the invention.

In the figure, numeral 2401 is a liquid crystal panel which consists of upper and lower separate sections where X-electrodes x0, x1, . . . , xm-1 are divided into upper and lower parts. Numeral 2402 is a Y-electrode driver of Y-electrodes y0 to yn/2–1 for driving the upper screen of the liquid crystal panel 2401 and Y-electrodes yn/2 to yn-1 for driving the lower screen of the liquid crystal panel 2401. Thus, voltage is applied to the Y-electrodes y0 and yn/2 at the same time for displaying. Numeral 2403 is an X-electrode driver for the upper screen of the liquid crystal panel 2401 and numeral 2404 is an X-electrode driver for the lower screen of the liquid crystal panel 2401.

Numeral 2405 is a display data bus for transferring display data for the upper screen of the liquid crystal panel 2401 and numeral 2400 is a display data bus for transferring display data for the lower screen of the liquid crystal panel 2401. Numeral 2407 is a coordinate detector and numerals 2408 and 2409 are data buses for transferring coordinate detection data. Numerals 2410 and 2411 are selectors. Numeral 2412 is a liquid crystal display data bus for transferring data for the upper screen and numeral 2413 is a liquid crystal display data bus for transferring data for the lower screen.

Figure 23:
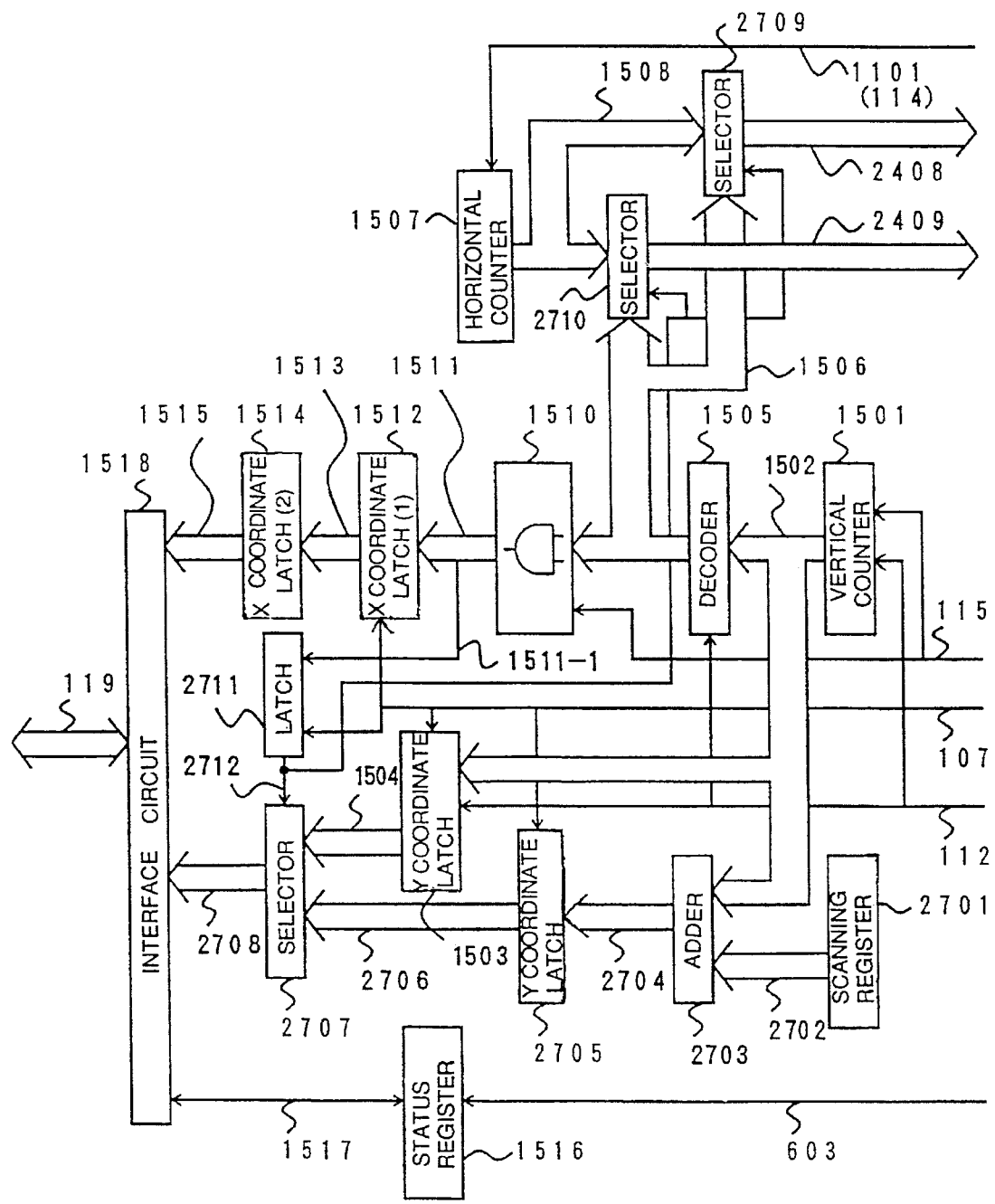
FIG. 23 is a block diagram showing the configuration of a coordinate detector according to the fourth embodiment of the invention.
Figure 24A:
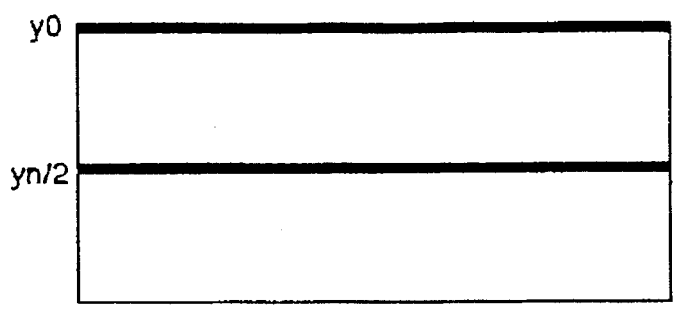
FIG. 24 is an illustration showing schematic selection voltage application patterns to Y-electrodes in the display unit according to the fourth embodiment of the invention.
Figure 24B:
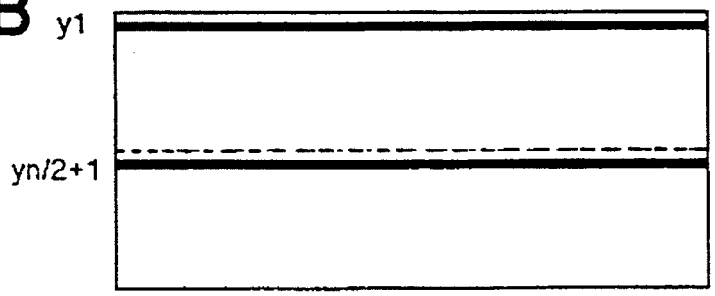
Figure 24C:
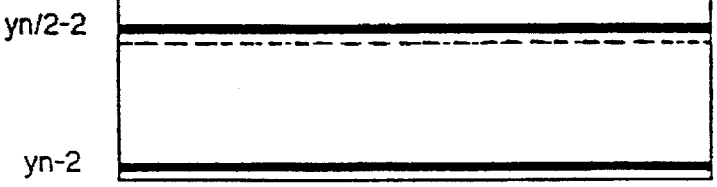
Figure 24D:
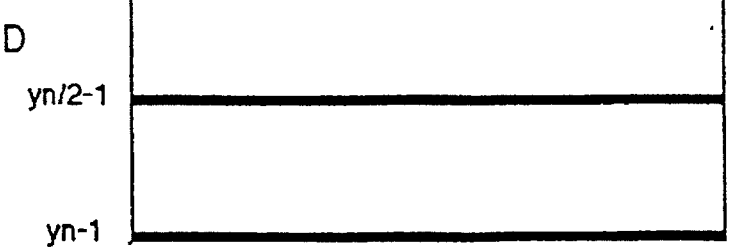
Figure 25A:
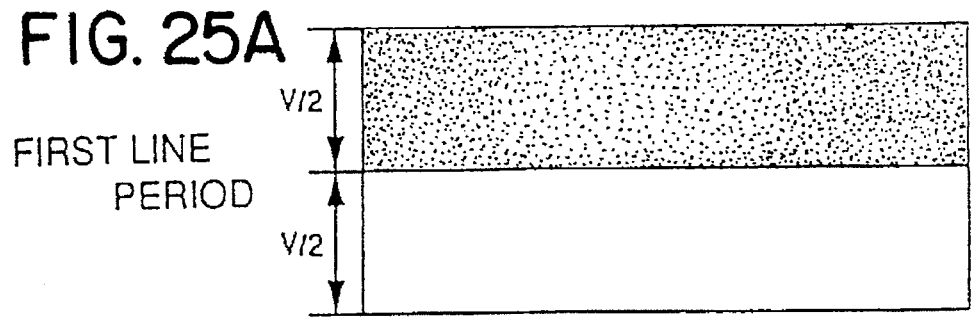
FIG. 25 is an illustration showing schematic selection voltage application patterns to X-electrodes in the display unit according to the fourth embodiment of the invention.
Figure 25B:
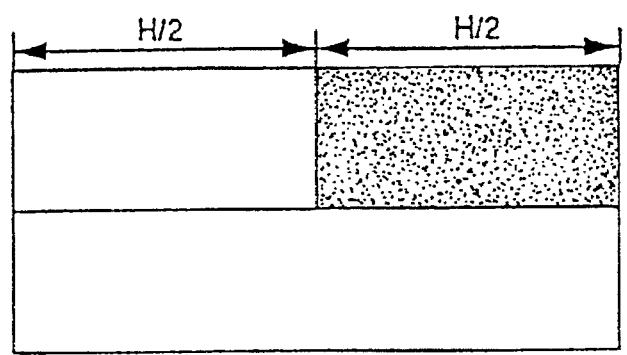
Figure 25C:
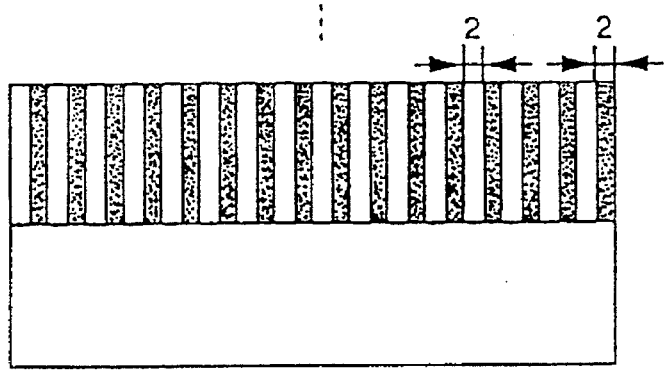
Figure 25D:
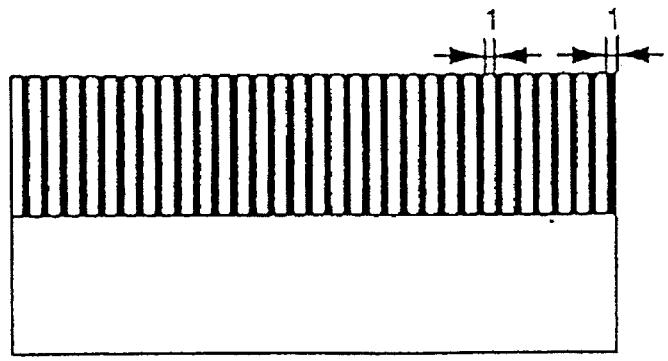

Next, FIG. 23 shows the configuration of the coordinate detector 2407.

In the figure, numeral 2701 is a scanning register for storing a half value of the number of vertical scanning lines of the liquid crystal panel 2401. Since the number of vertical scanning lines is n in the fourth embodiment, n/2 is stored in the scanning register 2701. Numeral 2702 is a data bus for transferring data output by the scanning register 2701. Numeral 2703 is an adder and numeral 2704 is a data bus for transferring the addition result of the adder 2703. Numeral 2705 is a Y coordinate latch and numeral 2706 is a data bus for transferring the data latched in the Y coordinate latch 2705. Numeral 2707 is a selector and numeral 2708 is a data bus for transferring the Y coordinate selected by the selector 2707. Numerals 2709 and 2710 are selectors for selecting data for detecting an X coordinate sent to the X-electrode drivers 2403 and 2404 respectively.

Other circuit parts identical with those of the coordinate detector 111 according to the first embodiment previously described with reference to FIG. 5 are denoted by the same reference numerals in FIG. 23 and will not be discussed again.

Unlike the first to third embodiments, the fourth embodiment uses the liquid crystal panel 2401 consisting of the upper and lower screens driven by separate X-electrode drivers 2403 and 2404, as shown in FIG. 23.

To use such a liquid crystal panel, the Y-electrode driver 2402 applies a voltage to a Y-electrode for the upper screen and to the corresponding Y-electrode for the lower screen at the same time to drive the upper and lower screens at the same time. Since a voltage is applied to the two Y-electrodes at the same time, as shown schematically in FIG. 24, when a voltage is detected by a pen 104 in the Y coordinate detection operation, it is necessary to determine which line, corresponding to one of the two electrodes to which the current voltage is applied the pen 104 is in contact.

Then, in the fourth embodiment, first a voltage is applied to all X-electrodes for the upper screen of the liquid crystal panel 2401 in the first line period in the X coordinate detection operation. Thus, if the pen 104 is on the upper screen, it can detect the voltage and therefore it can be determined that the pen 104 is in contact with the upper screen. If the pen 104 is on the lower screen, it cannot detect the voltage, indicating that the pen 104 is in contact with the lower screen.

The second most significant bit and less significant bits of the Y coordinate are found by the Y coordinate detection operation in the display period and the most significant bit of the Y coordinate is found in the first line period of the non-display period for detecting the Y coordinate. An X coordinate is detected by applying a voltage to the X-electrodes for the upper or lower screen with which the pen 104 is in contact according to patterns similar to those described in the first to third embodiments, as shown in FIG. 25, and detecting it. FIG. 25 shows voltage application with patterns similar to those used in the first embodiment.

A voltage is applied to the Y-electrodes y0 and yn/2 in the first line period of the non-display period, to the Y-electrodes y1 and yn/2+1 in the second line period, ..., to the Y-electrodes yn/2−2 and yn−2 in the (n/2−1)th line period, and to the Y-electrodes yn/2−1 and yn−1 in the (n/2)th line period.

Voltage application with such patterns, and Y coordinate detection, are performed by the coordinate detector 2407 (see FIG. 23).

When detected voltage correction data '1' is detected during the Y coordinate detection operation, the Y coordinate is latched in the Y coordinate latches 1503 and 2705 of the coordinate detector 2407. The value of a vertical counter 1501 is stored in the Y coordinate latch 1503. The value resulting from adding the half value of the vertical resolution of the liquid crystal panel 2401 set in the scanning register 2701 to the count value of the vertical counter 1501 by the adder 2703 is stored in the Y coordinate latch 2705.

Thus, of the two Y-electrodes to which voltage is applied when the pen 104 detects voltage, the value of the Y-electrode for the upper screen is stored in the Y coordinate latch 1503 and the value of the Y-electrode for the lower screen is stored in the Y coordinate latch 2705.

When the Y coordinate detection operation terminates and the X coordinate detection operation is started, the selector 2709 outputs value '1' and the selector 2710 outputs value '0' in response to an output of the decoder 1505 in the first line period, thereby providing the voltage application pattern in the first line period shown in FIG. 25.

The detected voltage correction data provided in the first line period is stored in the latch 2711. If the detected voltage correction data has the value '1,' it indicates that the pen 104 is in contact with the upper screen; if the detected voltage correction data has the value '0,' it indicates that the pen 104 is in contact with the lower screen.

In the second line period and later, one of the selectors 2709 and 2710 which corresponds to the screen with which the pen is out of contact outputs value '0' in response to an output of the latch 2711; the other selector operates as in the first line period and later in the first embodiment, whereby the detected X coordinate is stored in an X coordinate latch (2) as described in the first embodiment.

In response to an output of the latch 2711, the selector 2707 selects an output of the Y coordinate latch 1503 if the pen 104 is in contact with the upper screen or selects an output of the Y coordinate latch 2705 if the pen 104 is in contact with the lower screen.

Therefore, even if the liquid crystal panel 2401 is of type consisting of upper and lower separate screens, an external system can access via an interface circuit 1518 the X and Y coordinates of the position with which the pen 104 is in contact.

For the X coordinates of the X-electrodes to which voltage for which detected voltage correction data '1' should be detected is applied consecutively in line periods on the X-electrode voltage application patterns shown in FIG. 12 discussed in the first and fourth embodiments, the peak of the voltage input to the detected voltage correction circuit 106 may drop, as on the (N−3)th line and later shown in FIG. 26, with a decrease in the number of X-electrodes contained in each of the regions to which selection voltage is applied and the regions to which non-selection voltage is applied.

In this case, the detected voltage falls below the threshold voltage Vth in the line periods in which voltage application patterns each having a small number of X-electrodes in each region are applied, thus the detected voltage correction data which should be set to '1' is set to '0' and the correct X coordinate cannot be detected. When the number of X-electrodes in each region of a voltage application pattern lessens, X coordinate detection voltage may be easily affected by voltage in the contiguous regions. In this case, assuming that the pen 104 is in contact with the X-electrode x4 (X coordinate 0 ... 0100 in binary representation), as on the (N−1)th line and later shown in FIG. 27, non-selection voltage detection voltage is affected by selection voltage in the contiguous region and becomes higher than the threshold voltage Vth in the line periods in which voltage application patterns each having a small number of X-electrodes in each region are applied. Thus, the second least and least significant bits of the detected voltage correction data which should be set to '0' are set to '1', and the correct X coordinate value cannot be detected.

A display unit that can solve such a problem will be discussed as a fifth embodiment of the invention.

In the description that follows, the minimum value of the number of X-electrodes in each region to enable detection of the correct X coordinate is Xmin.

In the fifth embodiment, voltage application patterns applied after the line period in which the voltage application pattern having the minimum number of X-electrodes is applied are made different from those in the preceding embodiments for improving detection accuracy. That is, after the line period in which the voltage application pattern having the minimum number of X-electrodes, Xmin, is applied, (Xmin−1) voltage application patterns provided by shifting the voltage application pattern having the minimum number of X-electrodes, Xmin, by any value from 1 to (Xmin−1) are applied in order every line period for detecting applied voltage. Operations are performed on the detected value to determine the X coordinate (low-order bits of the X coordinate) within the region having the width corresponding to the minimum number of X-electrodes, Xmin, whereby the correct value of the low-order bits of the X coordinate of the position with which a pen 104 is in contact can be found according to the combination of '1' and '0' of the detected voltage correction data, as described below in detail:

The display unit according to the fifth embodiment of the invention differs from the display unit of the first embodiment in configuration of the coordinate detector 111 or X coordinate detection operation.

In the description to follow, the resolution of the liquid crystal panel 101 is 640 dots×480 lines and the minimum number of X-electrodes in each region of a voltage application pattern to enable detection of the correct X coordinate, Xmin, is 4.

Figure 28:
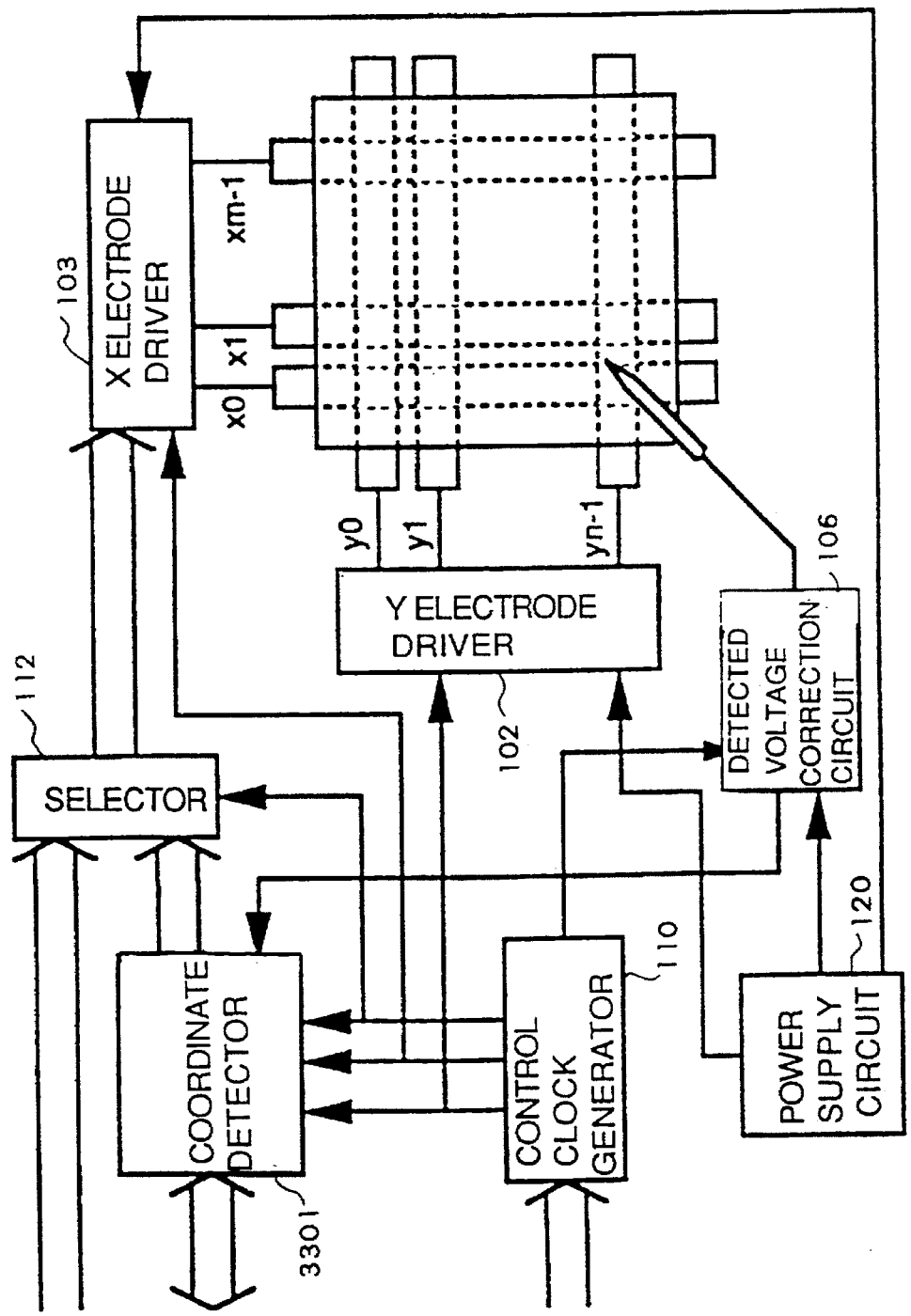
FIG. 28 is a block diagram showing the configuration of a display unit according to a fifth embodiment of the invention.

FIG. 28 shows the configuration of the display unit according to the fifth embodiment.

In the figure, numeral 3301 is a coordinate detector according to the fifth embodiment.

Figure 29:
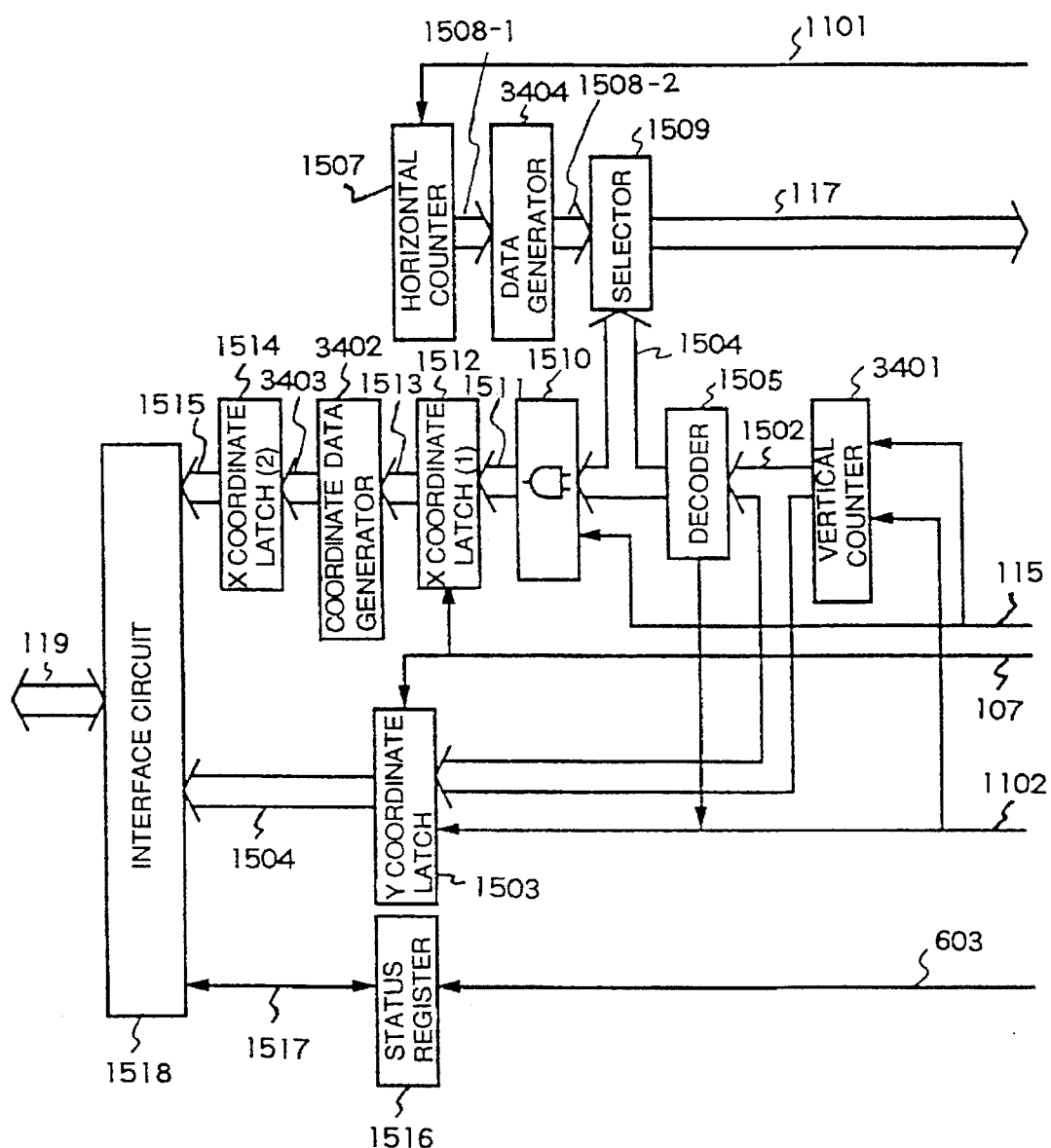
FIG. 29 is a block diagram showing the configuration of a coordinate detector according to the fifth embodiment of the invention.

FIG. 29 shows the configuration of the coordinate detector 3301 of the fifth embodiment.

In FIG. 29, numeral 3401 is a 9-bit vertical counter, numeral 3402 is a coordinate data generator which generates coordinate data from data stored in an X coordinate latch (1) 1512, and numeral 3403 is a data bus for transferring coordinate data output by the coordinate data generator 3402. Numeral 3404 is a data generator which generates data specifying voltage patterns applied to X-electrodes from an output signal of a horizontal counter 1507, which will be hereinafter referred to as "scan data". Other circuit parts identical with those previously described with reference to FIG. 5 are denoted by the same reference numerals in FIG. 29.

The data generator 3404, which consists of logical operation elements, transfers an output signal of the most significant bit (in the example, first bit) output Dh1 to eighth bit output Dh8 of the 10-bit horizontal counter 1507 transferred via a data bus 1508-1, to a selector 1509 via the signal bus 1508-2 without conversion as the scan data used in the first to eighth line periods. Therefore, the scan data for applying voltage application patterns to the X-electrodes in the first line period in the first embodiment shown in FIG. 12 to the eighth line period in which the number of X-electrodes contained in one region becomes 4, Xmin, is transferred to the selector 1509.

Figure 30:
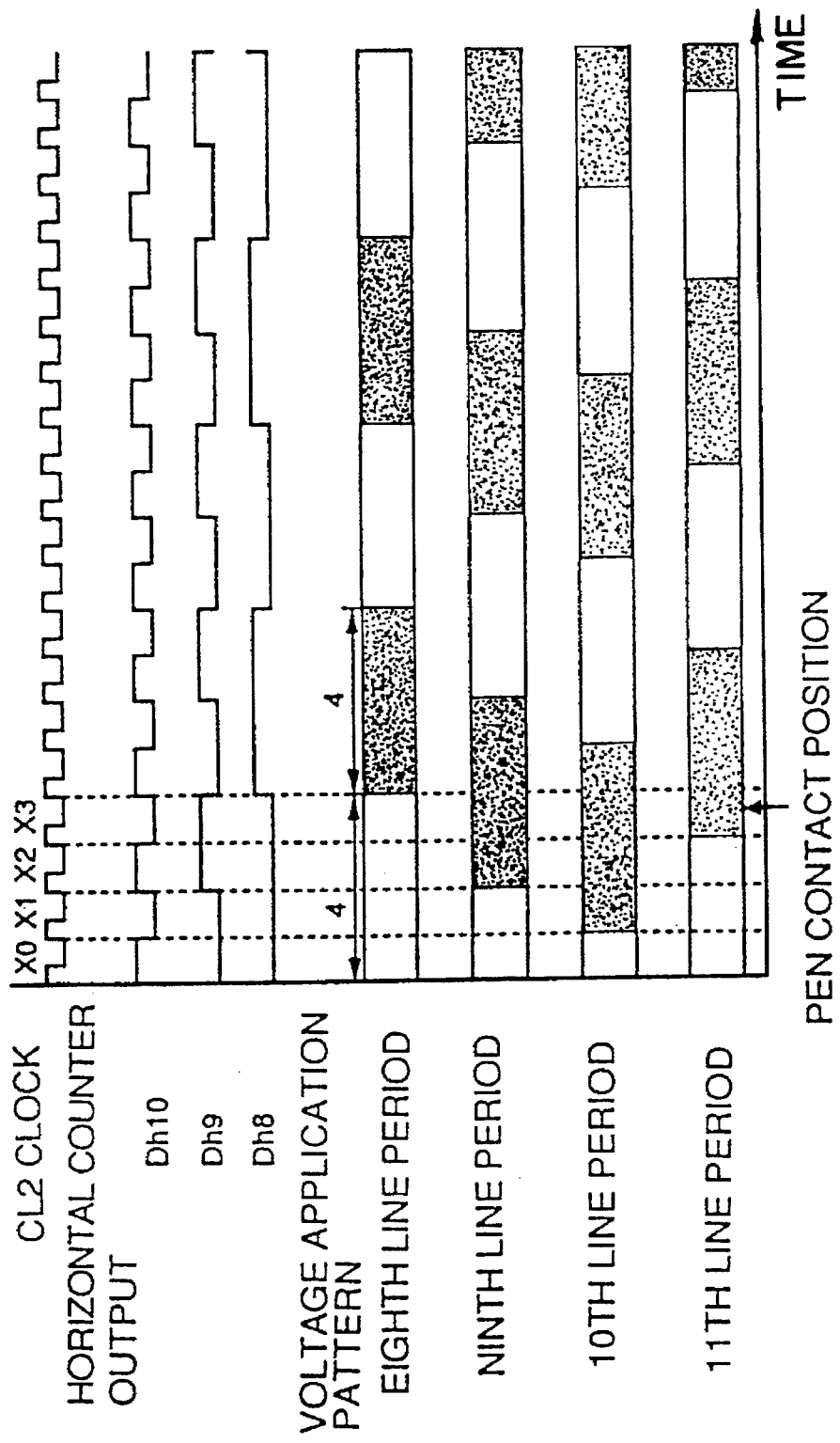
FIG. 30 is an illustration showing schematic selection voltage application patterns to X-electrodes in the display unit according to the fifth embodiment of the invention.

The data generator 3404 generates scan data shown in FIG. 30 in the line periods after the line period in which the number of X-electrodes contained in one region becomes 4, Xmin, and transfers the scan data to the selector 1509.

In FIG. 30, Dh10, Dh9, and Dh8 denote the least significant bit (tenth bit), ninth bit, and eighth bit of an output signal of the horizontal counter 1507 respectively.

As shown here, in the ninth line period, the data generator 3404 performs an operation on Dh8 and ninth bit output Dh9 and generates scan data so as to apply a voltage application pattern having four electrodes in each region shifted by two electrodes from the voltage application pattern having four electrodes in each region applied in the eighth line period. In the fifth embodiment, the voltage application pattern is shifted by right two electrodes. Likewise, in the tenth and eleventh line periods, the data generator 3404 performs an operation on Dh8, Dh9, and tenth bit output Dh10 and generates scan data so as to apply voltage application patterns each having four electrodes in each region shifted left or right one electrode from the voltage application pattern in the ninth line period. In the fifth embodiment, the voltage application pattern in the ninth line period is shifted right and left by one electrode in the tenth and eleventh line periods respectively. When Xmin=k, a shift amount S is expressed by $1 \leq P \leq S$, $-S \geq P \geq -1$ if it is assumed that $\log_2 k = H$ and $$\sum_{i=0}^{H+1} 2^i = P.$$

On the other hand, a decoder 1503, when the vertical counter 3401 is '0,' controls the selector 1509 so as to output the scan data in the first line period output by the data generator 3404 to an X-electrode drive via a data bus 117; when the vertical counter 3401 is '1,' the decoder 1503 controls the selector 1509 so as to output the scan data in the second line period. Likewise, the decoder 1503 controls the selector 1509 so as to output the scan data in the third to eleventh line periods to the X-electrode driver 103 in order.

Next, an example in which the pen 104 is in contact with X-electrode x3 is given for describing the X coordinate detection operation. In the example, the X coordinate becomes '0000000011' in binary representation.

Figure 31:
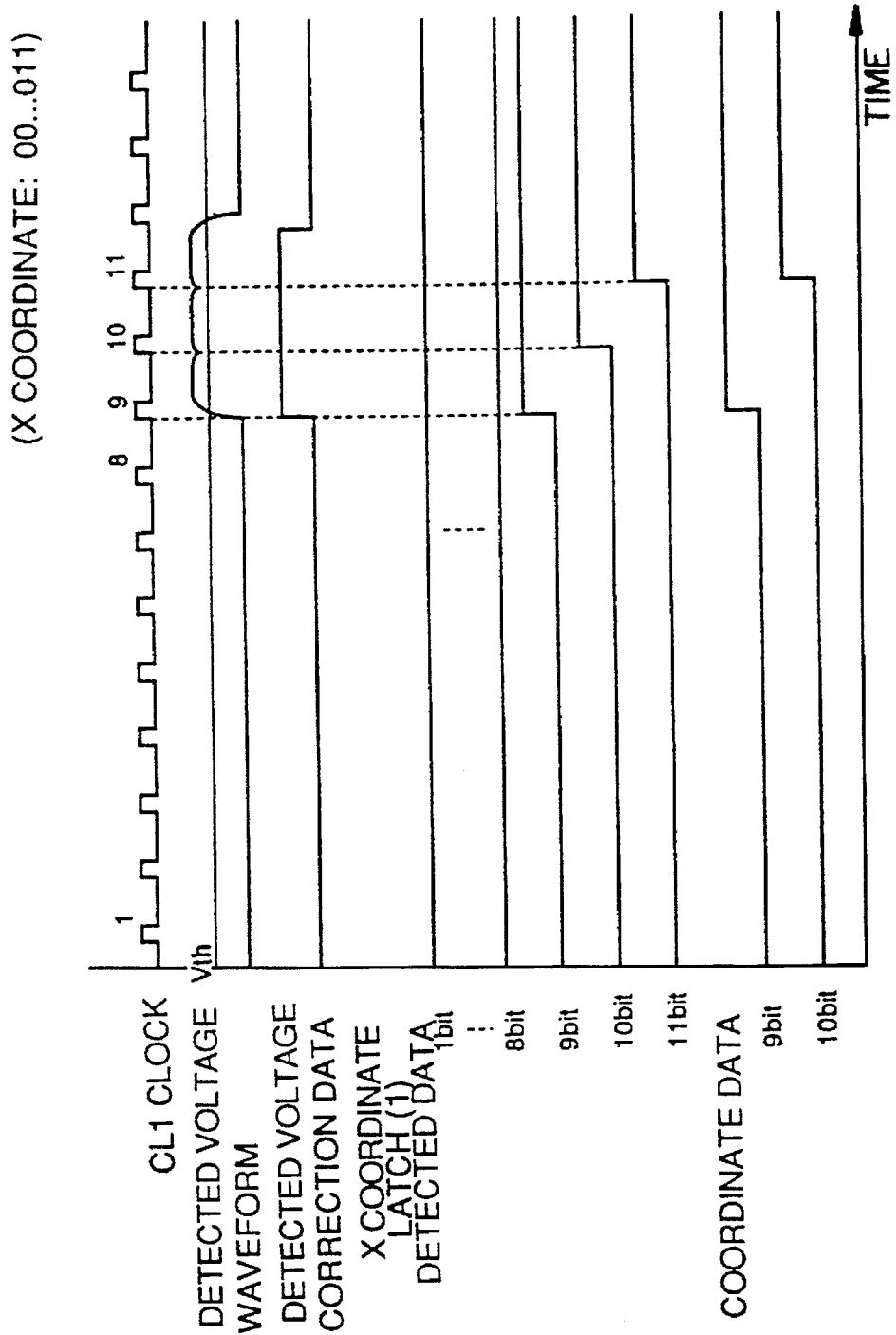
FIG. 31 is a timing chart showing the X-electrode voltage detection timing in the display unit according to the fifth embodiment of the invention.

FIG. 31 shows voltage waveform input to a detected voltage correction circuit 106, output values of the detected voltage correction circuit 106, detected voltage correction data stored in the X coordinate latch (1) 1512, and coordinate data output by the coordinate data generator 3402 when the pen 104 indicates the X-electrode x3 of the X coordinate 0 ... 011 in binary representation and voltages are applied with the patterns shown in FIG. 30.

As described above, the detected voltage correction data in the eleven line periods is input via the signal line 107 to the X coordinate latch (1) 1512 in order as in the first embodiment. As shown in FIG. 31, '0' is input to the most significant bit (first bit) to the eighth bit of the X coordinate latch (1) 1512 and '1' is input to the ninth bit to the eleventh bit. The detected voltage correction data latched in the X coordinate latch (1) 1512 is transferred via a signal bus 1513 to the coordinate data generator 3402.

The coordinate data generator 3402 transfers the detected voltage correction data transferred from the most significant bit to the eighth bit of the X coordinate latch (1) 1512 to the data bus 3403 intact as coordinate data. Also, the coordinate data generator 3402 performs an operation on the detected voltage correction data set in the eighth and ninth bits of the X coordinate latch (1) 1512 for generating the ninth bit of the coordinate data of the X coordinate. Likewise, it performs an operation on the detected voltage correction data in the tenth and eleventh bits of the X coordinate latch (1) 1512 and the ninth bit of the coordinate data of the X coordinate generated by the coordinate data generator 3402 for generating the tenth bit of the coordinate data of the X coordinate. In the fifth embodiment, the part of the coordinate data generator 3402 for performing such operations consists of exclusive-OR elements. That is, the result of exclusive-ORing the detected voltage correction data in the eighth and ninth bits of the X coordinate latch (1) 1512 is used as the value of the ninth bit of the coordinate data of the X coordinate. Any two bits of the ninth bit of the X coordinate and the tenth and eleventh bits of the X coordinate latch (1) 1512 are exclusive-ORed and further the result and the remaining one bit are exclusive-ORed. The final result is used as the value of the tenth bit of the coordinate data.

The ninth and tenth bits of the coordinate data of the X coordinate generated by the coordinate data generator 3402 are also output to the data bus 3403 like the first to eighth bits of the coordinate data of the X coordinate. As a result, the 10-bit coordinate data of the X coordinate is input to the X coordinate latch (2) 1514.

Other operation of the coordinate detector 3301 is the same as in the first embodiment.

Now, an external system can access the detected X and Y coordinates via an interface circuit 1518 and a data bus 119 as in the first embodiment.

If the X-electrode with which the pen 104 is in contact is any other than x3, the X coordinate can also be found by performing operations on the detected voltage correction data as described above. The coordinate detector 3301 of the fifth embodiment is configured so as to meet four as the minimum number of X-electrodes in each region to enable detection of the correct X coordinate, but the minimum number of X-electrodes can be set to any value from $2^0$ to the Nth power of 2 by modifying the configuration of the vertical counter 3401, decoder 1503, data generator 3404, selector 1509, AND gate circuit 1510, X coordinate latch (1) 1512, and coordinate data generator 3402 so as to meet the minimum value to be set.

In the fourth embodiment, the X coordinate can also be detected by using voltage application patterns each having the minimum number of X-electrodes greater than one, as described above.

Figure 32:
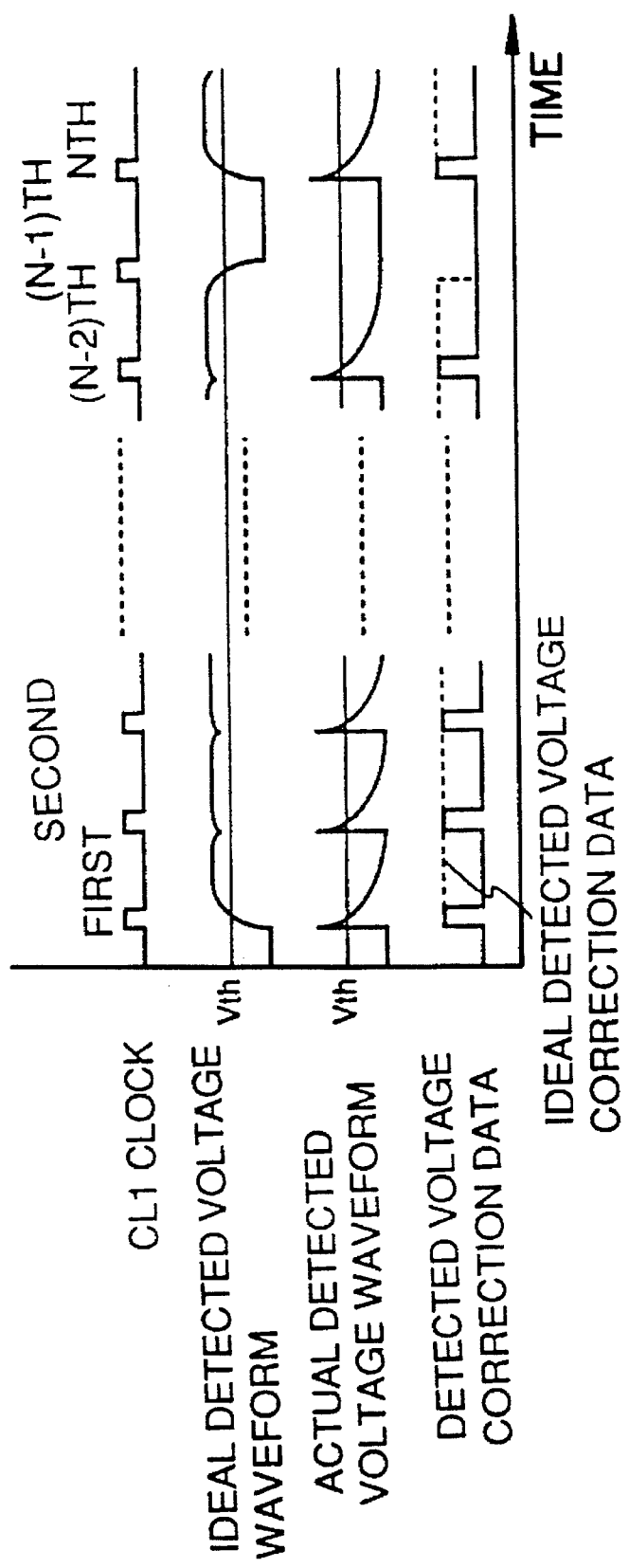
FIG. 32 is a chart showing an X coordinate detection error caused by a differential waveform of detected voltage.

By the way, in the embodiments discussed above, the detected voltage waveform of an X coordinate input to the detected voltage correction circuit 106 may become a differential waveform depending on the pen 104, the capacity of the liquid crystal panel 101, and the CL1 clock period, as shown in FIG. 32. In the first to fifth embodiments, the detected voltage correction data is input to the X coordinate latch (1) by using the CL1 clock. If the detected voltage waveform becomes a differential waveform, the '1' width of the correction data becomes narrow. Thus, if the number of X-electrodes contained in each of the regions to which selection voltage is applied and the regions to which non-selection voltage is applied lessens, the correct value may be unable to be detected. If the polarity of detected voltage becomes the same in performing frame alternating current, etc., when selection voltage consecutively set to '1' is detected, the voltage change is small, thus the voltage peak may drop and the voltage may fall below the threshold voltage Vth. In this case, the detected voltage correction data which is actually '1' becomes '0' and the correct X coordinate cannot be detected.

Then, a display unit that can solve such a problem will be discussed as a sixth embodiment of the invention.

In the sixth embodiment, the configuration of the coordinate detector 111 shown in FIG. 5 discussed in the first embodiment is modified so that correct data can be input even if the '1' width of correction data is narrow.

Also, to prevent voltage peak dropping of a detected voltage waveform described above, the six embodiment adopts a system of applying the voltage application patterns shown in FIG. 12 discussed in the first embodiment and a non-selection voltage application pattern to all X-electrodes in the horizontal direction alternately every line period, and the configuration of the coordinate detector 111 is modified so that the correct X coordinate can be input conforming to the system. Thus, even if the detected voltage polarity becomes constant, the voltage applied every line period becomes non-selection voltage, thereby making large voltage change for the correct coordinate detection.

The description to follow assumes that the minimum number of X-electrodes contained in each of the regions to which selection voltage is applied and the regions to which non-selection voltage is applied for enabling the correct X coordinate detection is eight or more.

Figure 33:
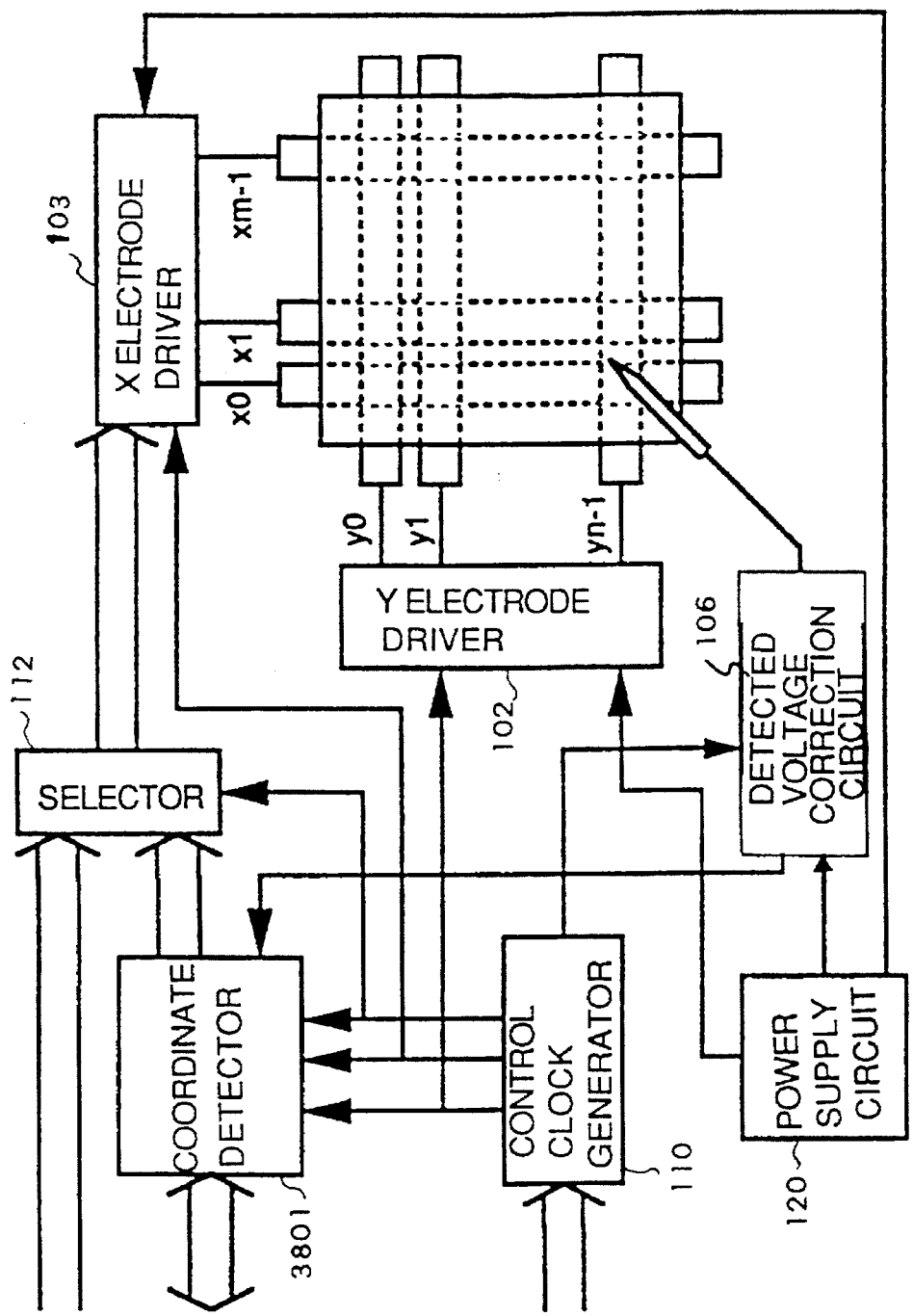
FIG. 33 is a block diagram showing the configuration of a display unit according to a sixth embodiment of the invention.

FIG. 33 is a block diagram of the display unit of the sixth embodiment, wherein numeral 3801 is the coordinate detector modified in the embodiment.

Figure 34:
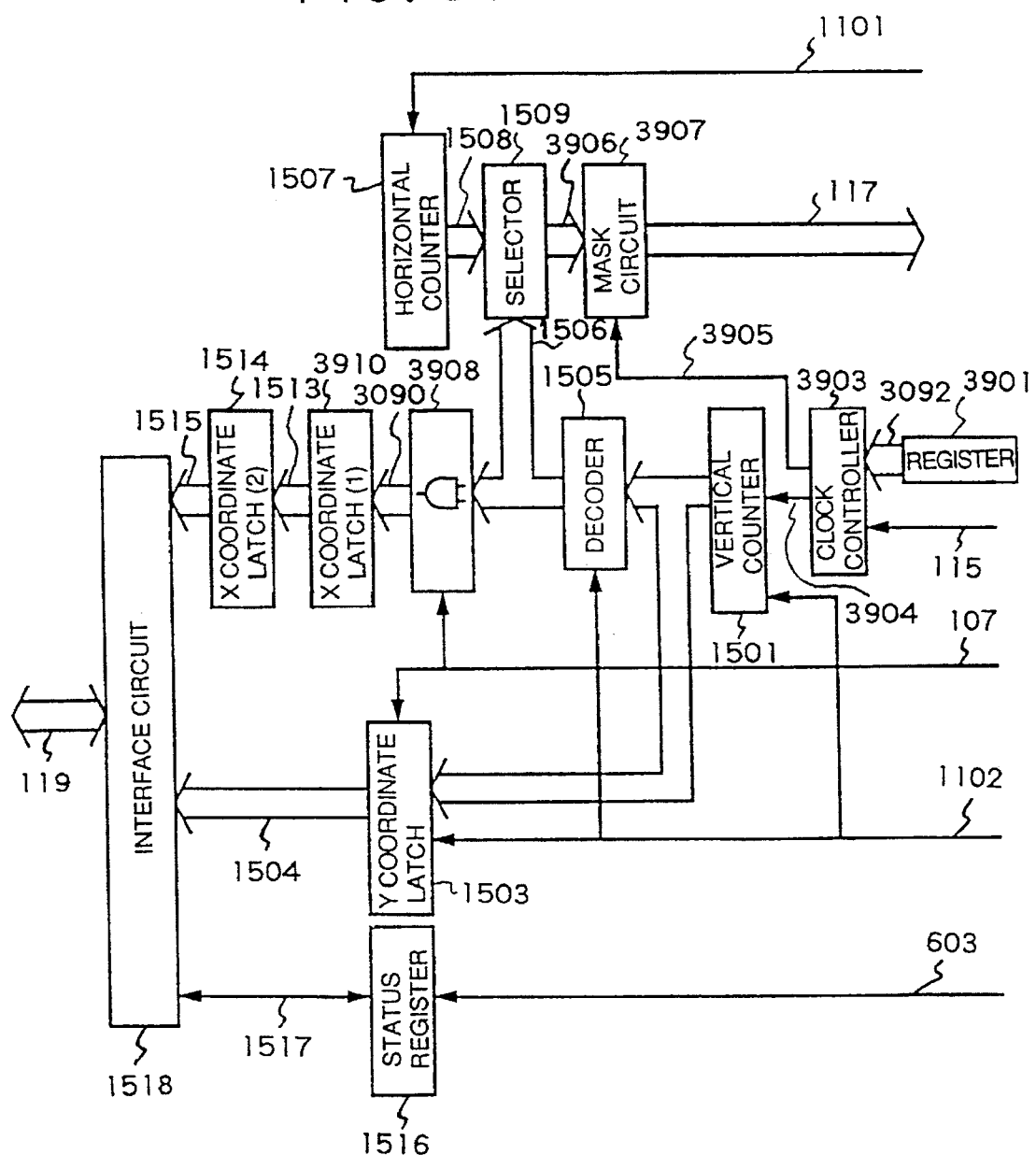
FIG. 34 is a block diagram showing the configuration of a coordinate detector according to the sixth embodiment of the invention.

FIG. 34 shows the configuration of the coordinate detector 3801 according to the sixth embodiment.

In the figure, numeral 3901 is a register which stores the timing of applying a voltage application pattern having the minimum number of X-electrodes in each region. Numeral 3902 is a signal bus for transferring a timing signal output by the register 3901. Numeral 3903 is a clock controller for generating a counter clock and mask signal from a CL1 clock and the timing signal output by the register 3901. Numerals 3904 and 3905 are signal lines for transferring the counter clock and mask signal, respectively, generated by the clock controller 3903. Numeral 3906 is a data bus for transferring scan data output by a selector 1509 and numeral 3907 is a mask circuit for masking the scan data in response to the mask signal output by the clock controller 3903. Numeral 3908 is an AND gate circuit consisting of AND elements for generating a latch clock from detected voltage correction data transferred via a signal line 107 and a decode signal generated by a decoder 1505. Numeral 3909 is a signal bus for transferring the latch clock. Numeral 3910 is an X coordinate latch (1) for latching data in response to the latch clock generated by the AND gate circuit 3908.

Figure 35:
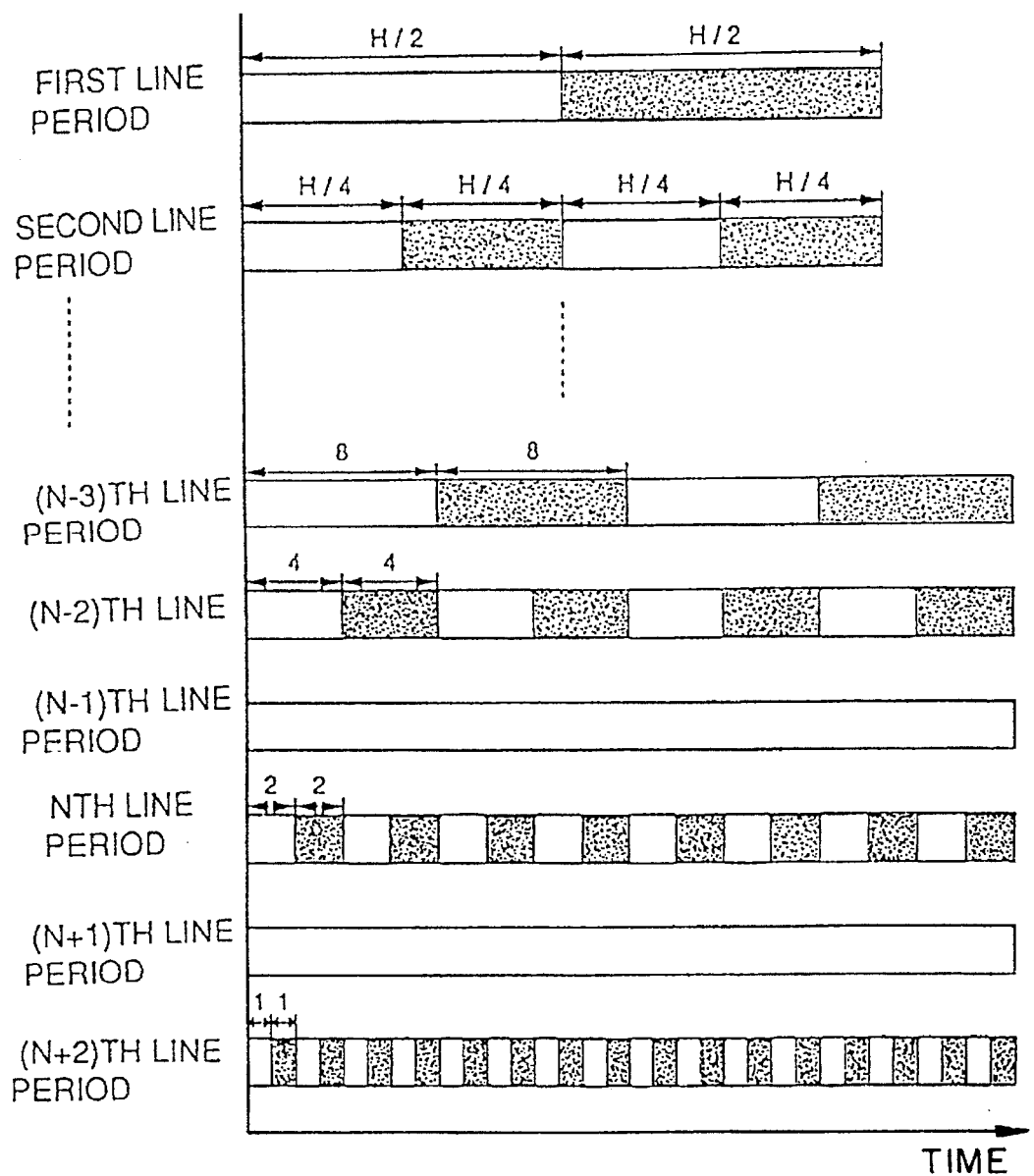
FIG. 35 is an illustration showing schematic selection voltage application patterns to X-electrodes in the display unit according to the sixth embodiment of the invention.

Since the minimum number of X-electrodes in each region of a voltage application pattern to enable the correct X coordinate to be detected is eight in the sixth embodiment, the coordinate detector 3801 outputs scan data so that voltage application patterns similar to those in the first embodiment are applied in the first line period to the (N–3)th line period in which the number of X-electrodes in each region becomes eight, and then generates scan data so that voltage application patterns having four X-electrodes, two X-electrodes, and one X-electrode similar to those in the first embodiment and an application pattern of non-selection voltage only (white line display pattern) are displayed alternately for each line period in the (N–2)th line period to the (N+2)th line period, as shown in FIG. 35.

The operation of the coordinate detector 3801 will be described.

Figure 36:
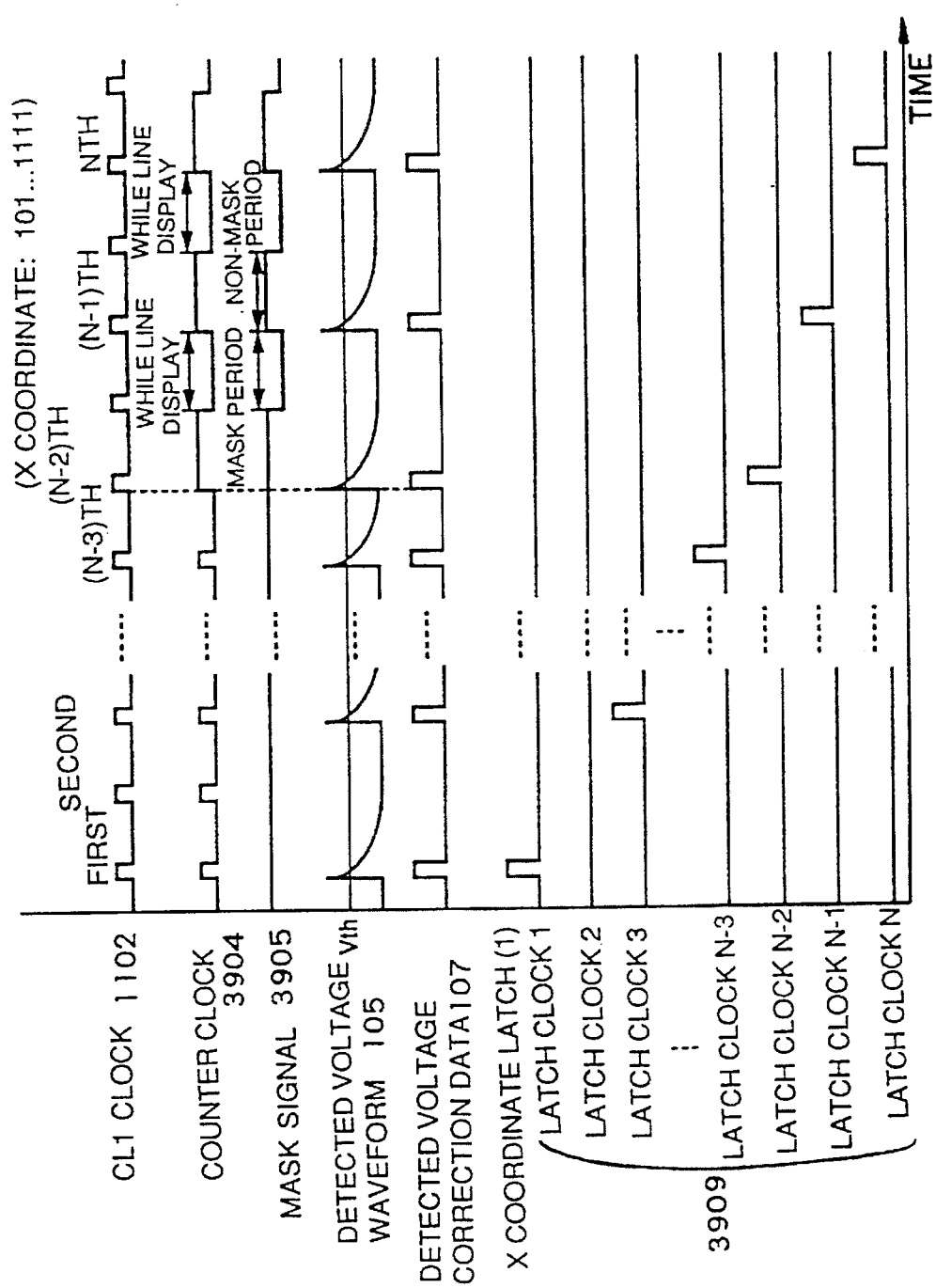
FIG. 36 is a timing chart showing the X-electrode voltage detection timing in the display unit according to the sixth embodiment of the invention.

FIG. 36 shows the operation timing of the coordinate detector 3801.

A value for specifying the timing corresponding to the (N–2)th line period in which the number of X-electrodes in each region of the voltage application pattern becomes four is preset in the register 3901. The clock controller 3903 outputs a CL1 clock before the timing setup value and divides and outputs the CL1 clock when the timing setup value is reached in response to the timing signal output by the register 3901, as shown in FIG. 36, as a counter clock transferred to a vertical counter 1501. Therefore, the vertical counter 1501 counts every horizontal period before the timing setup value and counts every two horizontal periods on and after the setup value. This means that the scan data specifying the voltage application pattern in each line period is output every two horizontal periods on and after the timing corresponding to the setup value set in the register 3901. Thus, the decoder 1503 controls the selector 1509 so as to select an output of the horizontal counter 1507 starting at the most significant bit in order every horizontal period before the timing setup value and change the bit output by the horizontal counter 1507 every two horizontal periods on and after the timing setup value.

The mask circuit 3907 outputs the scan data output by the selector 1509 when the mask signal is '1' and outputs '0' when the mask signal is '0.' The mask signal is generated by the clock controller 3903 so that it is set to '1' before the timing setup value in the register 3901 and becomes a CL1 division clock on and after the setup value, as shown in FIG. 36. Thus, on and after the timing setup value, the scan data output by the selector 1509 is output in the first one horizontal period in which the CL1 division clock is '1,' of two horizontal line periods in which the scan data is selected by the selector 1509, and '0' is output in the remaining one horizontal period in which the CL1 division clock is '0.' Therefore, as shown in FIG. 35, voltage application patterns having four X-electrodes, two X-electrodes, and one X-electrode and a white line corresponding to '0' are displayed alternately every line period.

Next, the X coordinate detection operation when the coordinate of the X-electrode with which the pen 104 is in contact is '101 . . . 11' in binary representation will be discussed.

The AND gate circuit 3908 performs an operation on the decode signal output by the decoder 1505 and the detected voltage correction data transferred via the signal line 107, generates latch clocks 1 to N set to '1' only when the decode signal is active and the detected voltage correction data is '1,' and outputs the latch clocks to the X coordinate latch (1) 3910 via the signal bus 3909. As shown in FIG. 36, the detected voltage correction data is set to '1' in the first line period and the third to Nth line periods, thus latch clock 1 and latch clocks 3 to N are set to 1 in the corresponding line periods; the detected voltage correction data is set to '0' in the second line period, thus latch clock 2 is not set to '1.'

All data latched in the X coordinate latch (1) 3910 is cleared to '0' in the display period. In the non-display period, '1' is given as data. When the latch clock is set to '1,' the given '1' is input to the bit corresponding to the vertical counter 1501. Therefore, '1' is input to the most significant bit and the third to Nth bits for which the latch clocks are set to '1' and the second bit for which the latch clock is not set to '1' remains '0,' whereby the coordinate data '101 . . . 1' corresponding to the X coordinate of the X-electrode with which the pen 104 is in contact is stored in the X coordinate latch (1) 3910. When all coordinate data is input to the X coordinate latch (1) 3910, all the data latched in the X coordinate latch (1) 3910 is input to the corresponding bits of an X coordinate latch (2) 1514 via a data bus 1513.

Other operation of the coordinate detector 3801 is the same as in the first embodiment.

Now, an external system can access the detected X and Y coordinates via an interface circuit 1518 and a data bus 119 as in the first embodiment.

If the X coordinate of the X-electrode with which the pen 104 is in contact is any other than in the sixth embodiment, the X coordinate can also be detected as described above. Although the minimum number of X-electrodes in each region to enable detection of the correct X coordinate is assumed to be eight in the description of the sixth embodiment, it can be set to any value from $2^0$ to the Nth power of 2 by changing the value set in the register 3901.

Coordinates can be detected by applying the sixth embodiment to the second to fifth embodiments.

Figure 37:
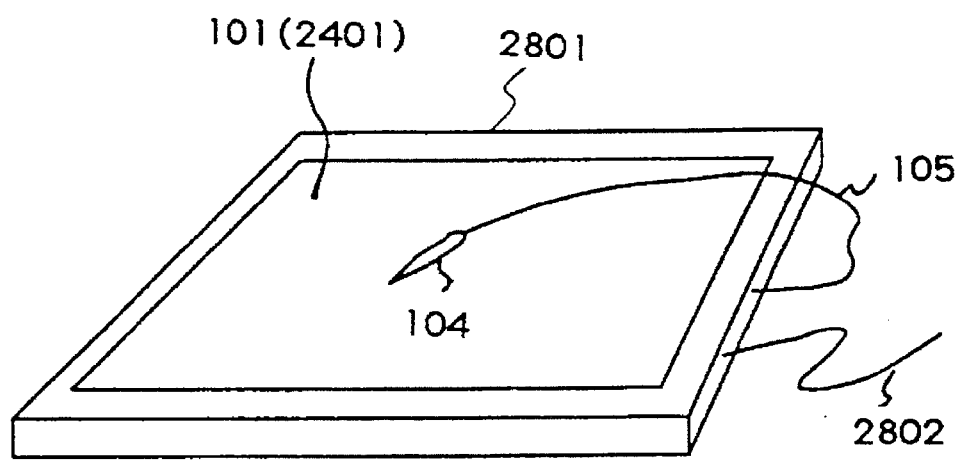
FIG. 37 is an illustration showing an external view of the display unit according to the embodiments of the invention.

The display unit discussed in the embodiments can be used with a unit as shown in FIG. 37, for example.

In the figure, numeral 104 is a pen and numeral 2801 is a box which contains the above-described X- and Y-electrode drivers, coordinate detector, etc., in addition to the liquid crystal panel 101 (2401). Numeral 2802 is an interface signal cable containing the data bus 108 (2400, 2405) for inputting display data, the signal bus 109 for inputting synchronizing signals, and the data bus 119 for outputting coordinate data. The unit shown in FIG. 37 is connected to an external system such as a personal computer by the interface signal cable 2802. Display is made on the liquid crystal panel 101 (2401) in response to the display data transferred from the personal computer, etc. As described above, the external system such as the personal computer reads the coordinates of the position with which the pen 104 is in contact via the data bus 119 from the display unit.

The display unit according to the embodiments and an external system may be integrated into one system.

Then, a pen input type computer into which the display unit according to the embodiments and an external system are integrated will be discussed.

Figure 38:
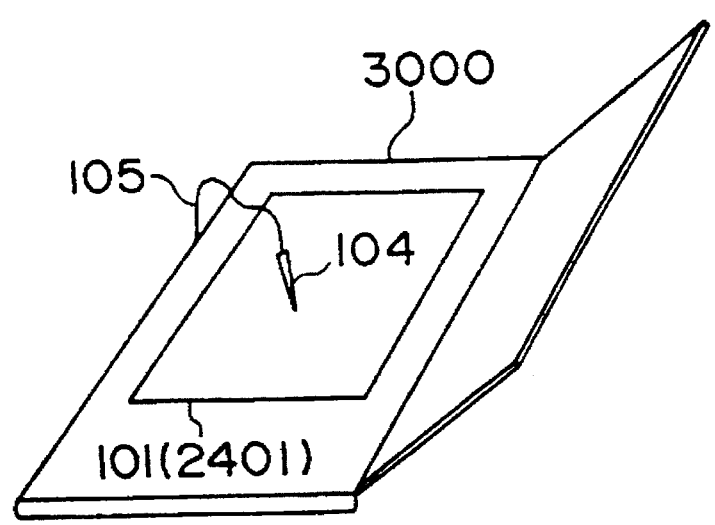
FIG. 38 is an illustration showing an external view of a pen input type computer comprising the display unit according to the embodiments of the invention.
Figure 39:
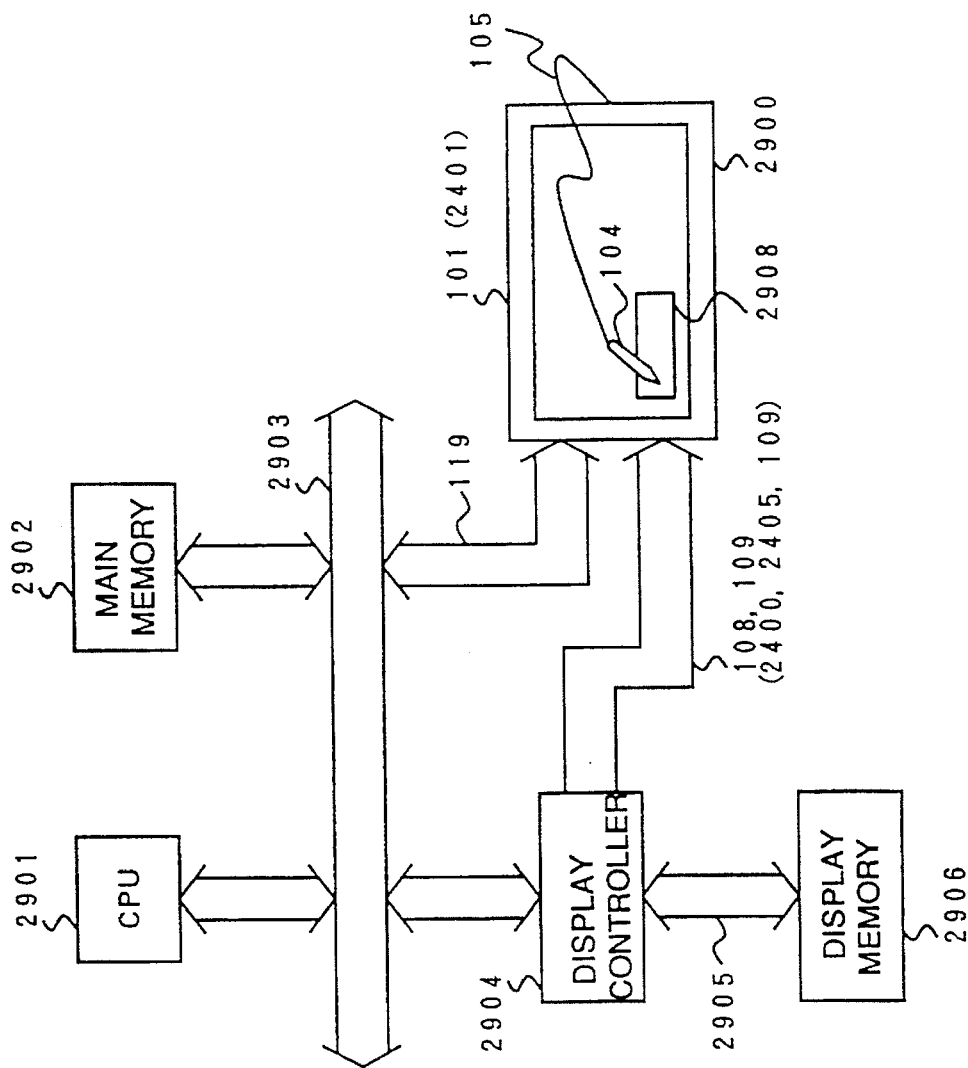
FIG. 39 is a block diagram showing the configuration of the pen input type computer comprising the display unit according to the embodiments of the invention.
Figure 40:
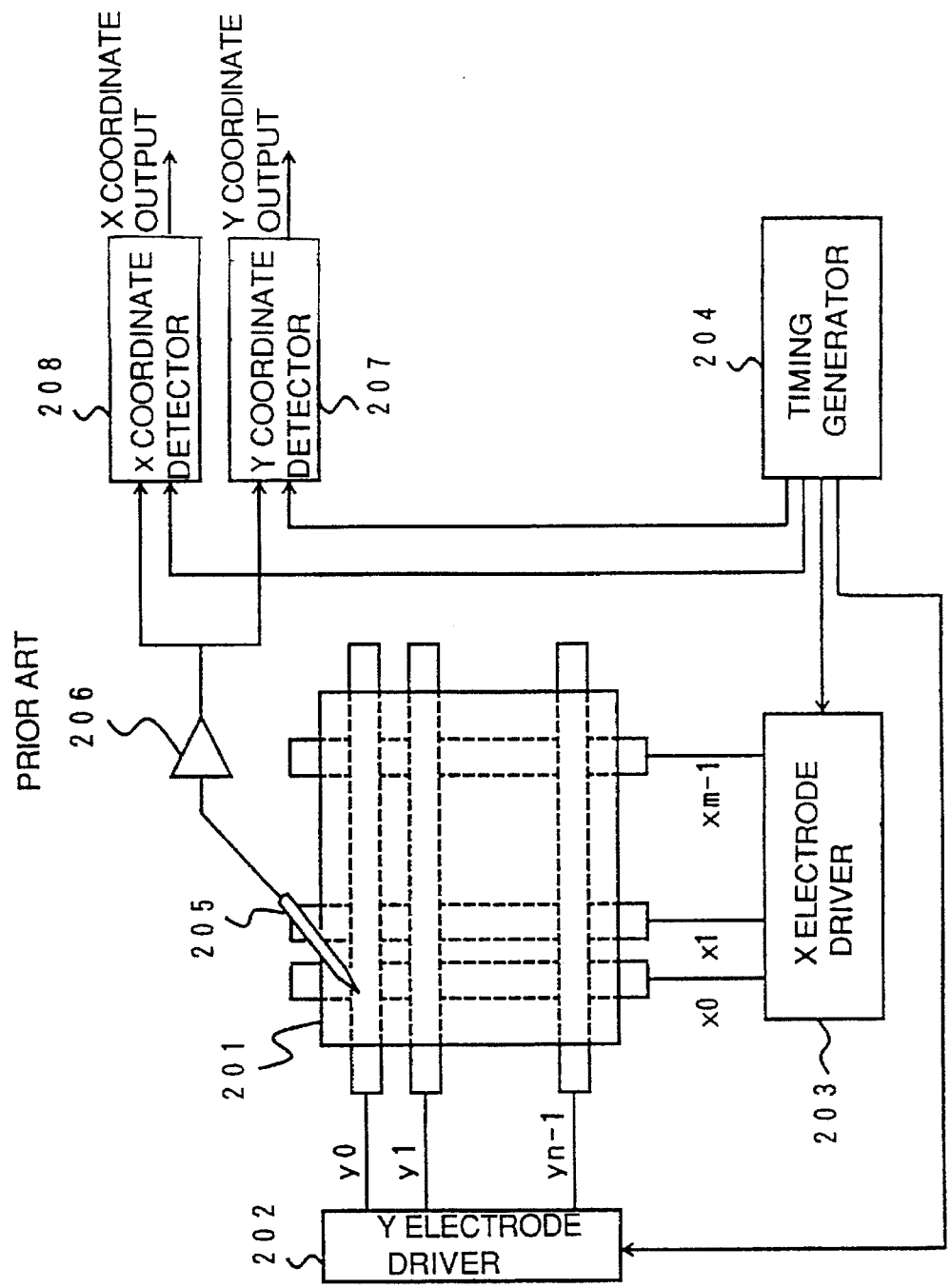
FIG. 40 is an illustration showing the configuration of a conventional display unit.

FIG. 38 shows an external view of such a pen input type computer. FIG. 39 shows the configuration of the pen input type computer.

As shown in FIG. 38, the computer comprises the liquid crystal panel 101 (2401) built in a box 3000 shaped like a notebook. The box 3000 also contains components such as a CPU for executing programs in addition to the above-mentioned X- and Y-electrode drivers, coordinate detector, etc. That is, as shown in FIG. 39, the computer contains the CPU 2901, a main memory 2902, a display controller 2904, a display memory 2906, etc., in addition to the display unit 2900 according to the embodiments.

The CPU 2901 executes a program stored in the main memory 2902, and writes display data into the display memory 2906 through the display controller 2904. The display controller 2904 reads the display data written into the display memory 2906 and sends it via the data bus 108 (2400, 2405) to the display unit 2900. The display controller 2904 also sends synchronizing signals via the signal bus 109 to the display unit 2900.

The display unit 2900 uses the received display data and synchronizing signals to display graphics, characters, etc., specified by the display data on the liquid crystal panel 101 (2401).

For example, with an icon 2908 displayed on the liquid crystal panel 101 in response to the display data, the CPU 2901 reads the X and Y coordinates via the data bus 119 periodically for monitoring the position with which the pen 104 is in contact. If the position with which the pen 104 is in contact overlaps the icon, the CPU 2901 performs processing corresponding to the icon.

Up to now, we have discussed the embodiments of the display units according to the invention. In the embodiments, the liquid crystal display of the simple matrix type having no switching elements in the pixels is used as the liquid crystal panel for example. However, a liquid crystal display of the active matrix type having switching elements in pixels, such as STN, GH, or ferroelectric, can also be used. Alternatively, a flat display of the EL (electroluminescence) or PDP (plasma display panel) type can also be used. If the display unit comprises a matrix of elements each entering the display state only when selection voltage is applied to both the X- and Y-electrodes corresponding to the element at the same time, the embodiments of the invention can be applied.

According to the embodiments of the invention, the drive electrodes of the liquid crystal panel can be used to easily detect the coordinates of the position on the display screen with which the pen is in contact, so that an additional device such as a tablet for coordinate detection is not required and a new X-electrode driver need not be developed. Therefore, the display unit can be provided at low costs.

Since sufficient time for applying voltage to the X-electrodes can be taken in the X coordinate detection operation, high speed operation is not required, leading to low power consumption.

Further, the display unit can see whether or not the pen is in contact with the display screen, so that the system will not detect erroneous coordinates.

The coordinates can be reliably detected regardless of how broad the pen is.

Various liquid crystal displays can also be used as tablets.

The voltage application patterns for X coordinate detection and the coordinate detector configuration are changed in the X coordinate detection operation, thereby preventing the voltage peak of a detected voltage waveform from dropping for detecting the correct coordinates.

Even if the detected voltage waveform becomes a differential waveform in the X coordinate detection operation, the voltage peak of the detected voltage waveform can be prevented from dropping and detected voltage correction data can be read normally, so that the correct coordinates can be detected.

Thus, according to the invention, there can be provided a display unit which can detect the X coordinate of the position with which the pen is in contact more efficiently.

What is claimed is:

1. A display unit comprising:

a flat display comprising M×N display elements in a matrix consisting of M rows and N columns, M pieces of Y-electrodes each connected to each of the rows of the display elements, respectively, and N pieces of X-electrodes each connected to each of the columns of the display elements, respectively;

a detector for detecting, through an electrostatic capacity coupling, a voltage pulse applied to the column and row corresponding to a position on a display surface of said flat display with which said detector is in contact;

each of said display elements of said flat display being adopted to enter a display state when predetermined voltages are applied to both the Y- and X-electrodes connected to the display element;

a Y-electrode driver for applying a voltage pulse to the Y-electrodes in a row arrangement order in a display period;

an X-electrode driver for applying voltage pulses to the N pieces of X-electrodes with a voltage pulse application pattern specified in a given data string;

means for supplying to said X-electrode driver a data string for specifying a voltage pulse application pattern corresponding to a display pattern to be displayed on the N display elements on a row to which a voltage pulse is applied in a display period;

means for supplying L data strings for specifying L different voltage pulse application patterns to said X-electrode driver in order in a non-display period;

Y coordinate detection means for determining a Y coordinate of a position with which said detector is in contact in response to a Y-electrode to which a voltage pulse is applied at a point in time said detector detects the voltage pulse in a display period;

X coordinate detection means for determining an X coordinate of a position with which said detector is in contact in response to L detection values each indicating whether or not said detector detects a voltage pulse for each of the L voltage pulse application patterns applied to the N pieces of X-electrodes in response to L data strings in a non-display period; and said L voltage pulse application patterns containing H voltage application patterns each for applying a voltage pulse to X-electrodes belonging to every other region in an X-electrode arrangement direction in 2×k equal regions into which the N pieces of X-electrodes are grouped according to the X-electrode arrangement with respect to H different arbitrary values k in the range of 1 to H (where H≦L).

2. The display unit as claimed in claim 1 wherein H=L=$\log_2 N$, and wherein said L voltage pulse application patterns contain $\log_2 N$ voltage application patterns each for applying a voltage pulse to X-electrodes belonging to every other region in an X-electrode arrangement direction in 2×k equal regions into which the N pieces of X-electrodes are grouped according to the X-electrode arrangement with respect to $\log_2 N$ different arbitrary values k in the range of 1 to $\log_2 N$.

3. A display unit comprising:

a flat display comprising M×N display elements in a matrix consisting of M rows and N columns, M pieces of Y-electrodes each connected to each of the rows of the display elements, respectively, and N pieces of X-electrodes each connected to each of the columns of the display elements, respectively;

a detector, through an electrostatic capacity coupling, for detecting a voltage pulse applied to the column and row corresponding to a position on a display surface of said flat display with which said detector is in contact;

each of said display elements of said flat display being adopted to enter a display state when predetermined voltages are applied to both the Y- and X-electrodes connected to the display element;

a Y-electrode driver for applying a voltage pulse to the Y-electrodes in a row arrangement order in a display period;

an X-electrode driver for applying voltage pulses to the N pieces of X-electrodes with a voltage pulse application pattern specified in a given data string;

means for supplying to said X-electrode driver a data string for specifying a voltage pulse application pattern corresponding to a display pattern to be displayed on the N display elements on a row to which a voltage pulse is applied in a display period;

means for supplying L data strings for specifying L different voltage pulse application patterns to said X-electrode driver in order in a non-display period;

Y coordinate detection means for determining a Y coordinate of a position with which said detector is in contact in response to a Y-electrode to which a voltage pulse is applied at a point in time said detector detects the voltage pulse in a display period;

X coordinate detection means for determining an X coordinate of a position with which said detector is in contact by judging an X-electrode range with which said detector is in contact in order in response to whether or not said detector detects a voltage pulse for each of the L voltage pulse application patterns applied to the N pieces of X-electrodes in response to L data strings in a non-display period; and said L voltage pulse application patterns containing H voltage application patterns consisting of:

one voltage application pattern for applying a voltage pulse to X-electrodes belonging to one of two equal regions into which the N pieces of X-electrodes are grouped according to X-electrode arrangement; and H-1 voltage application patterns each for applying a voltage pulse to X-electrodes belonging to one of two equal regions into which the range judged to be in contact with said detector in detection for the preceding voltage application pattern is divided according to X-electrode arrangement while value k is incremented by one from 2 to H (where $H \leq L$) in order.

4. The display unit as claimed in claim 3 wherein $H=L=\log_2 N$, and wherein said L voltage pulse application patterns contain H voltage application patterns consisting of:

one voltage application pattern for applying a voltage pulse to X-electrodes belonging to one of two equal regions into which the N pieces of X-electrodes are grouped according to X-electrode arrangement; and said H-1 voltage pulse application patterns is $\log_2 N$ voltage application patterns consisting of one voltage application pattern for applying a voltage pulse to X-electrodes belonging to one of two equal regions into which the N pieces of X-electrodes are grouped according to X-electrode arrangement, and $\log_2 N-1$ voltage application patterns each for applying a voltage pulse to X-electrodes belonging to one of two equal regions into which the range judged to be in contact with said detector in detection for the preceding voltage application pattern is divided according to X-electrode arrangement while value k is incremented by one from 2 to $\log_2 N$ in order.

5. A display unit comprising:

a flat display comprising M×N display elements in a matrix consisting of M rows and N columns, M pieces of Y-electrodes each connected to each of the rows of the display elements, respectively, and N pieces of X-electrodes each connected to each of the columns of the display elements, respectively;

a detector for detecting a voltage pulse applied to the column and row corresponding to a position on a display surface of said flat display with which said detector is in contact through an electrostatic capacity coupling;

each of said display elements of said flat display being adopted to enter a display state when predetermined voltages are applied to both the Y- and X-electrodes connected to the display element and an X coordinate represented by an A-bit value in binary notation is given to each of the columns;

a Y-electrode driver for applying a voltage pulse to the Y-electrodes in a row arrangement order in a display period;

an X-electrode driver for applying voltage pulses to the N pieces of X-electrodes with a voltage pulse application pattern specified in a given data string;

means for supplying to said X-electrode driver a data string for specifying a voltage pulse application pattern corresponding to a display pattern to be displayed on the N display elements on a row to which a voltage pulse is applied in a display period;

means for supplying to said X-electrode driver, data strings for specifying L voltage pulse application patterns containing H voltage pulse application patterns for applying a voltage pulse only to either of an X-electrode having a given X coordinate whose jth most significant bit has value '1' and an X-electrode having a given X coordinate whose jth most significant bit has value '0' in order with respect to H different arbitrary values j in the range of 1 to H (where $H \leq A$) in a non-display period;

Y coordinate detection means for determining a Y coordinate of a position with which said detector is in contact in response to a Y-electrode to which a voltage pulse is applied at a point in time said detector detects the voltage pulse in a display period; and X coordinate detection means for determining the bit value of the jth most significant bit of the X coordinate of a position with which said detector is in contact in response to whether or not said detector detects a voltage pulse for the voltage pulse application pattern corresponding to the value of the j for each of the H values j in a non-display period.

6. A display unit comprising:

a flat display comprising M×N display elements in a matrix consisting of M rows and N columns, M pieces of Y-electrodes each connected to each of the rows of the display elements, respectively, and N pieces of X-electrodes each connected to each of the columns of the display elements, respectively;

a detector for detecting a voltage pulse applied to the column and row corresponding to a position on a display surface of said flat display with which said detector is in contact through an electrostatic capacity coupling;

each of said display elements of said flat display being adopted to enter a display state when predetermined voltages are applied to both the Y- and X-electrodes connected to the display element and an X coordinate represented by an A-bit value in binary notation is given to each of the columns;

a Y-electrode driver for applying a voltage pulse to the Y-electrodes in a row arrangement order in a display period;

an X-electrode driver for applying voltage pulses to the N pieces of X-electrodes with a voltage pulse application pattern specified in a given data string;

means for supplying to said X-electrode driver a data string for specifying a voltage pulse application pattern corresponding to a display pattern to be displayed on the N display elements on a row to which a voltage pulse is applied in a display period;

means for supplying to said X-electrode driver, data strings for specifying L voltage pulse application patterns containing H voltage pulse application patterns each corresponding to each of H values j incremented by one in the range of 1 to H (where H≦A) in a non-display period;

Y coordinate detection means for determining a Y coordinate of a position with which said detector is in contact in response to a Y-electrode to which a voltage pulse is applied at a point in time said detector detects the voltage pulse in a display period;

X coordinate detection means for determining the bit value of the jth most significant bit of the X coordinate of a position with which said detector is in contact in response to whether or not said detector detects a voltage pulse for the voltage pulse application pattern corresponding to the value of the j for each of the H values j incremented by one in a non-display period;

the voltage pulse application pattern corresponding to j which is 1 is a pattern for applying a voltage pulse to either of an X-electrode having a given X coordinate whose most significant bit has value '1' and an X-electrode having a given X coordinate whose most significant bit has value '0'; and said voltage pulse application patterns corresponding to j of 2 to H being each a pattern, with respect to the corresponding j, for applying a voltage pulse to an X-electrode which is either of an X-electrode having a given X coordinate whose jth most significant bit has value '1' and an X-electrode having a given X coordinate whose jth most significant bit has value '0', with the value of the most significant bit to the (j-1)th most significant bit of the given X coordinate being equal to the value determined as the bit value of the most significant bit to the (j-1)th most significant bit of the X coordinate of the position with which the detector is in contact.

7. A display unit comprising:

two flat displays each comprising M×N display elements in a matrix consisting of M rows and N columns, M pieces of Y-electrodes each connected to each of the rows of the display elements, respectively, and N pieces of X-electrodes each connected to each of the columns of the display elements, respectively;

a detector for detecting a voltage pulse applied to the column and row corresponding to a position on a display surface of said flat display with which said detector is in contact through an electrostatic capacity coupling;

said two flat displays being placed so as to make up one screen;

each of said display elements of said flat display being adopted to enter a display state when predetermined voltages are applied to both the Y- and X-electrodes connected to the display element and an X coordinate represented by an A-bit value in binary notation is given to each of the columns;

a Y-electrode driver for applying a voltage pulse to the Y-electrodes for corresponding rows of said two flat displays in parallel in a row arrangement order in a display period;

two X-electrode drivers being disposed corresponding to said two flat displays, said two X-electrode drivers each for applying voltage pulses to the N pieces of X-electrodes of the corresponding flat display with a voltage pulse application pattern specified in a given data string;

means for supplying to each of said two X-electrode drivers a data string for specifying a voltage pulse application pattern corresponding to a display pattern to be displayed on the N display elements on a row of the corresponding flat display to which a voltage pulse is applied in a display period;

means for supplying to one of said two X-electrode drivers a data string for applying voltage pulses to all X-electrodes of the corresponding flat display, and supplying to the other X-electrode driver a data string for suppressing voltage pulse application to all X-electrodes of the corresponding flat display in a non-display period; and Y coordinate detection means for determining a position in the flat display with which said detector is in contact in response to a Y-electrode to which a voltage pulse is applied at a point in time said detector detects the voltage pulse in a display period, and determining a Y coordinate on said screen with which said detector is in contact by judging that the flat display having all X-electrodes to which voltage pulses are applied, at a point in time said detector detects voltage pulse in a non-display period, is the flat display with which said detector is in contact.

8. The display unit as claimed in claim 7 further including:

means for supplying to said X-electrode driver corresponding to the flat display that said Y coordinate detection means judges said detector to be in contact with, data strings for specifying L voltage pulse application patterns containing H voltage pulse application patterns for applying a voltage pulse only to either of an X-electrode having a given X coordinate whose jth most significant bit has value '1' and an X-electrode having a given X coordinate whose jth most significant bit has value '0' in order with respect to H different arbitrary values j in the range of 1 to H (where H≦A) in a non-display period; and X coordinate detection means for determining the bit value of the jth most significant bit of the X coordinate of a position with which said detector is in contact in response to whether or not said detector detects a voltage pulse for the voltage pulse application pattern corresponding to the value of the j for each of the H values j in a non-display period.

9. The display unit as claimed in claim 7 further including:

means for supplying to said X-electrode driver corresponding to the flat display that said Y coordinate detection means judges said detector to be in contact with, data strings for specifying L voltage pulse application patterns containing H voltage pulse application patterns each corresponding to each of H values j incremented by one in the range of 1 to H (where H≦A) in a non-display period; and X coordinate detection means for determining the bit value of the jth most significant bit of the X coordinate of a position with which said detector is in contact in response to whether or not said detector detects a voltage pulse for the voltage pulse application pattern corresponding to the value of the j for each of the H values j incremented by one in a non-display period, wherein the voltage pulse application pattern corresponding to j which is 1 is a pattern for applying a voltage pulse to either of an X-electrode having a given X coordinate whose most significant bit has value '1' and an X-electrode having a given X coordinate whose most significant bit has value '0,' and the voltage pulse application patterns corresponding to j of 2 to H are each a pattern, with respect to the corresponding j, for applying a voltage pulse to an X-electrode which is either of an X-electrode having a given X coordinate whose jth most significant bit has value '1' and an X-electrode having a given X coordinate whose jth most significant bit has value '0,' with the value of the most significant bit to the (j-1)th most significant bit of the given X coordinate being equal to the value determined as the bit value of the most significant bit to the (j-1)th most significant bit of the X coordinate of the position with which the detector is in contact.

10. The display unit as claimed in claim 1 wherein H<L, and wherein said L voltage pulse application patterns contain:

said H voltage pulse application patterns; and

P voltage application patterns each provided by shifting the voltage application pattern when k=H in the display element row direction by a mutually different shift amount S with respect to X-electrodes.

11. The display unit as claimed in claim 3 wherein H<L, and wherein said L voltage pulse application patterns contain:

said H voltage pulse application patterns; and

P voltage application patterns each provided by shifting the voltage application pattern when k=H in the display element row direction by a mutually different shift amount S with respect to X-electrodes.

12. The display unit as claimed in claim 5 wherein H<A, and wherein said L voltage pulse application patterns contain:

said H voltage pulse application patterns; and

P voltage application patterns each provided by shifting the voltage application pattern when j=H in the display element row direction by a mutually different shift amount S with respect to X-electrodes.

13. The display unit as claimed in claim 6 wherein H<A, and wherein said L voltage pulse application patterns contain:

said H voltage pulse application patterns; and

P voltage application patterns each provided by shifting the voltage application pattern when j=H in the display element row direction by a mutually different shift amount S with respect to X-electrodes.

14. The display unit as claimed in claim 8 wherein H<A, and wherein said L voltage pulse application patterns contain:

said H voltage pulse application patterns; and

P voltage application patterns each provided by shifting the voltage application pattern when j=H in the display element row direction by a mutually different shift amount S with respect to X-electrodes.

15. The display unit as claimed in claim 7 further including:

means for supplying L data strings for specifying L different voltage pulse application patterns to said X-electrode driver in order in a non-display period;

X coordinate detection means for determining an X coordinate of a position with which said detector is in contact in response to L detection values each indicating whether or not said detector detects a voltage pulse for each of the L voltage pulse application patterns applied to the N pieces of X-electrodes in response to L data strings in a non-display period, wherein said L voltage pulse application patterns contain:

H voltage application patterns each for applying a voltage pulse to X-electrodes belonging to every other region in an X-electrode arrangement direction in 2×k equal regions into which the N pieces of X-electrodes are grouped according to the X-electrode arrangement with respect to H different arbitrary values k in the range of 1 to H (where H<L); and P voltage application patterns each provided by shifting the voltage application pattern when k=H in the display element row direction by a mutually different shift amount S with respect to X-electrodes.

16. The display unit as claimed in claim 10 wherein $$P = \sum_{i=0}^{L-H-1} 2^i$$

and said shift amount S is $1 \leq S \leq P$ or $-P \leq S \leq -1$, and wherein said X coordinate detection means determines the X coordinate represented by $\log_2 N$ bits, of the position with which said detector is in contact in response to the L detection values.

17. The display unit as claimed in claim 11 wherein $$P = \sum_{i=0}^{L-H-1} 2^i$$

and said shift amount S is $1 \leq S \leq P$ or $-P \leq S \leq -1$, and wherein said X coordinate detection means determines the X coordinate represented by $\log_2 N$ bits, of the position with which said detector is in contact in response to the L detection values.

18. The display unit as claimed in claim 1 wherein said L voltage pulse application patterns contain:

said H voltage pulse application patterns; and voltage pulse application patterns for applying no voltage pulses to the N pieces of X-electrodes, and wherein the data strings for specifying Q voltage application patterns of said H voltage pulse application patterns with respect to k corresponding to values of 1 to Q (where Q<H) are supplied to said X-electrode driver in the ascending order of the k values, and one of the data strings for specifying H–Q voltage application patterns of said H voltage pulse application patterns with respect to k corresponding to values of Q+1 to H and one of the voltage pulse application patterns for applying no voltage pulses are alternately supplied to said X-electrode driver in the ascending order of the k values.

19. The display unit as claimed in claim 3 wherein said L voltage pulse application patterns contain:

said H voltage pulse application patterns; and voltage pulse application patterns for applying no voltage pulses to the N pieces of X-electrodes, and wherein the data strings for specifying Q voltage application patterns of said H voltage pulse application patterns with respect to k corresponding to values of 1 to Q (where Q<H) are supplied to said X-electrode driver in the ascending order of the k values, and one of the data strings for specifying H–Q voltage application patterns of said H voltage pulse application patterns with respect to k corresponding to values of Q+1 to H and one of the voltage pulse application patterns for applying no voltage pulses are alternately supplied to said X-electrode driver in the ascending order of the k values.

20. The display unit as claimed in claim 5 wherein said L voltage pulse application patterns contain:

said H voltage pulse application patterns; and voltage pulse application patterns for applying no voltage pulses to the N pieces of X-electrodes, and wherein the data strings for specifying Q voltage application patterns of said H voltage pulse application patterns with respect to j corresponding to values of 1 to Q (where Q<H) are supplied to said X-electrode driver in the ascending order of the j values, and one of the data strings for specifying H–Q voltage application patterns of said H voltage pulse application patterns with respect to j corresponding to values of Q+1 to H and one of the voltage pulse application patterns for applying no voltage pulses are alternately supplied to said X-electrode driver in the ascending order of the j values.

21. The display unit as claimed in claim 6 wherein said L voltage pulse application patterns contain:

said H voltage pulse application patterns; and voltage pulse application patterns for applying no voltage pulses to the N pieces of X-electrodes, and wherein the data strings for specifying Q voltage application patterns of said H voltage pulse application patterns with respect to j corresponding to values of 1 to Q (where Q<H) are supplied to said X-electrode driver in the ascending order of the j values, and one of the data strings for specifying H–Q voltage application patterns of said H voltage pulse application patterns with respect to j corresponding to values of Q+1 to H and one of the voltage pulse application patterns for applying no voltage pulses are alternately supplied to said X-electrode driver in the ascending order of the j values.

22. The display unit as claimed in claim 8 wherein said L voltage pulse application patterns contain:

said H voltage pulse application patterns; and voltage pulse application patterns for applying no voltage pulses to the N pieces of X-electrodes, and wherein the data strings for specifying Q voltage application patterns of said H voltage pulse application patterns with respect to j corresponding to values of 1 to Q (where Q<H) are supplied to said X-electrode driver in the ascending order of the j values, and one of the data strings for specifying H–Q voltage application patterns of said H voltage pulse application patterns with respect to j corresponding to values of Q+1 to H and one of the voltage pulse application patterns for applying no voltage pulses are alternately supplied to said X-electrode driver in the ascending order of the j values.

23. The display unit as claimed in claim 7 further including:

means for supplying L data strings for specifying L different voltage pulse application patterns to said X-electrode driver in order in a non-display period;

X coordinate detection means for determining an X coordinate of a position with which said detector is in contact in response to L detection values each indicating whether or not said detector detects a voltage pulse for each of the L voltage pulse application patterns applied to the N pieces of X-electrodes in response to L data strings in a non-display period, wherein said L voltage pulse application patterns contain:

H voltage application patterns each for applying a voltage pulse to X-electrodes belonging to every other region in an X-electrode arrangement direction in 2×k equal regions into which the N pieces of X-electrodes are grouped according to the X-electrode arrangement with respect to H different arbitrary values k in the range of 1 to H (where H<L); and voltage pulse application patterns for applying no voltage pulses to the N pieces of X-electrodes, and wherein the data strings for specifying Q voltage application patterns of said H voltage pulse application patterns with respect to k corresponding to values of 1 to Q (where Q<H) are supplied to said X-electrode driver in the ascending order of the k values, and one of the data strings for specifying H–Q voltage application patterns of said H voltage pulse application patterns with respect to k corresponding to values of Q+1 to H and one of the voltage pulse application patterns for applying no voltage pulses are alternately supplied to said X-electrode driver in the ascending order of the k values.

24. The display unit as claimed in claim 18 wherein said X coordinate detection means determines the X coordinate represented by $\log_2 N$ bits, of the position with which said detector is in contact in response to only the detection values corresponding to the H voltage pulse application patterns, of the L detection values.

25. The display unit as claimed in claim 19 wherein said X coordinate detection means determines the X coordinate represented by $\log_2 N$ bits, of the position with which said detector is in contact in response to only the detection values corresponding to the H voltage pulse application patterns, of the L detection values.

26. The display unit as claimed in claim 1 wherein said Y coordinate detection means has means for correcting the determined Y coordinate by adding a predetermined value thereto.

27. The display unit as claimed in claim 3 wherein said Y coordinate detection means has means for correcting the determined Y coordinate by adding a predetermined value thereto.

28. The display unit as claimed in claim 1 further including means for correcting each of the data strings to a data string for specifying a voltage pulse application pattern provided by changing the voltage pulse application pattern specified in the data string so as not to apply a voltage pulse to a predetermined number of X-electrodes from both ends of each X-electrode region to which a voltage pulse is applied, and supplying it to said X-electrode driver.

29. The display unit as claimed in claim 3 further including means for correcting each of the data strings to a data string for specifying a voltage pulse application pattern provided by changing the voltage pulse application pattern specified in the data string so as not to apply a voltage pulse to a predetermined number of X-electrodes from both ends of each X-electrode region to which a voltage pulse is applied, and supplying it to said X-electrode driver.

30. The display unit as claimed in claim 1 further including means for canceling the detection result of said detector if the voltage level of the voltage pulse detected by said detector does not satisfy a predetermined voltage level condition.

31. The display unit as claimed in claim 3 further including means for canceling the detection result of said detector if the voltage level of the voltage pulse detected by said detector does not satisfy a predetermined voltage level condition.

32. The display unit as claimed in claim 1 further including means for detecting said detector being in or out of contact with the display surface of said flat display and supplying the detection result.

33. The display unit as claimed in claim 3 further including means for detecting said detector being in or out of contact with the display surface of said flat display and supplying the detection result.

34. An information processing system comprising:

the display unit as claimed in claim 1; and a processor which supplies data for specifying contents displayed on said flat display to said display unit, reads X and Y coordinates determined by said X and Y coordinate detection means of said display unit, and performs processing in response to the read X and Y coordinates.

35. An information processing system comprising:

the display unit as claimed in claim 3; and a processor which supplies data for specifying contents displayed on said flat display to said display unit, reads X and Y coordinates determined by said X and Y coordinate detection means of said display unit, and performs processing in response to the read X and Y coordinates.

* * * * *